(12) United States Patent  (10) Patent No.: US 7,852,567 B1
Kanazashi  (45) Date of Patent: Dec. 14, 2010

(54) ZOOM LENS SYSTEM

(75) Inventor: Yasuo Kanazashi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/780,008

(22) Filed: May 14, 2010

(30) Foreign Application Priority Data

May 20, 2009 (JP) .............................. 2009-122023

(51) Int. Cl.
G02B 15/14 (2006.01)

(52) U.S. Cl. ...................................... 359/687

(58) Field of Classification Search ................. 359/683, 359/687
See application file for complete search history.

(56) References Cited

U.S. PATENT DOCUMENTS

| | | | |
|---|---|---|---|
| 7,339,748 B2 * | 3/2008 | Terada et al. ................. | 359/687 |
| 2008/0231969 A1 | 9/2008 | Satori | |
| 2008/0266673 A1 | 10/2008 | Hoshi | |
| 2008/0297914 A1 | 12/2008 | Enomoto | |
| 2009/0244719 A1 | 10/2009 | Nakamura et al. | |
| 2009/0257132 A1 | 10/2009 | Hayakawa et al. | |
| 2010/0033838 A1 | 2/2010 | Saori | |
| 2010/0128364 A1 | 5/2010 | Agatsuma | |

FOREIGN PATENT DOCUMENTS

| | | |
|---|---|---|
| JP | 2006-171615 | 6/2006 |
| JP | 2008-225328 | 9/2008 |
| JP | 2008-268787 | 11/2008 |

* cited by examiner

Primary Examiner—Scott J Sugarman
(74) Attorney, Agent, or Firm—Greenblum & Bernstein P.L.C.

(57) ABSTRACT

A zoom lens system includes a positive first lens group, a negative second lens group, a positive third lens group, and a positive fourth lens group, in this order from the object; upon zooming from the short focal length extremity to the long focal length extremity, the first to the fourth lens groups move along the optical axis of the zoom lens system in a manner so that the distance between the first lens group and the second lens group increases, the distance between the second lens group and the third lens group decreases, and the distance between the third lens group and the fourth lens group increases; wherein the zoom lens system satisfies the following condition:

$$13.50 < f1/fw < 19.50 \qquad (1)$$

wherein f1 designates the focal length of the positive first lens group; and fw designates the focal length of the entire zoom lens system at the short focal length extremity.

13 Claims, 64 Drawing Sheets

Fno=4.5

SPHERICAL ABERRATION
CHROMATIC ABERRATION

Y=3.875

LATERAL CHROMATIC ABERRATION

Y=3.875

ASTIGMATISM

Y=3.875

DISTORTION

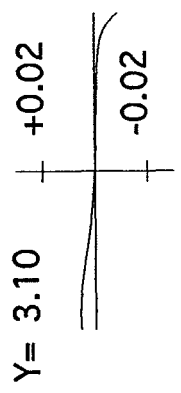 Fig. 3A  Y= 0.00
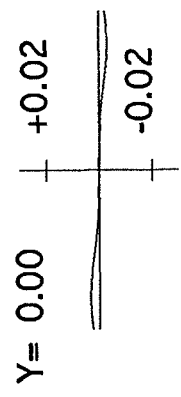 Fig. 3B  Y= 0.78
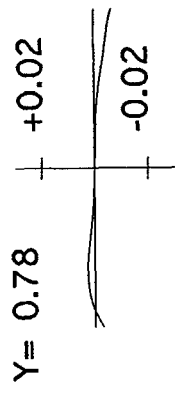 Fig. 3C  Y= 1.55
Fig. 3D  Y= 2.33
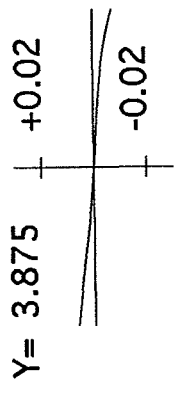 Fig. 3E  Y= 3.10
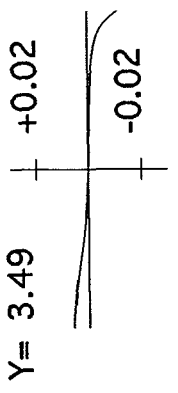 Fig. 3F  Y= 3.49
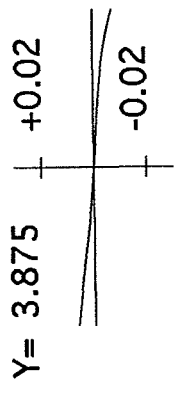 Fig. 3G  Y= 3.875
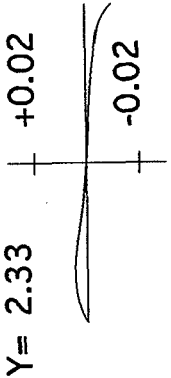 —— d Line

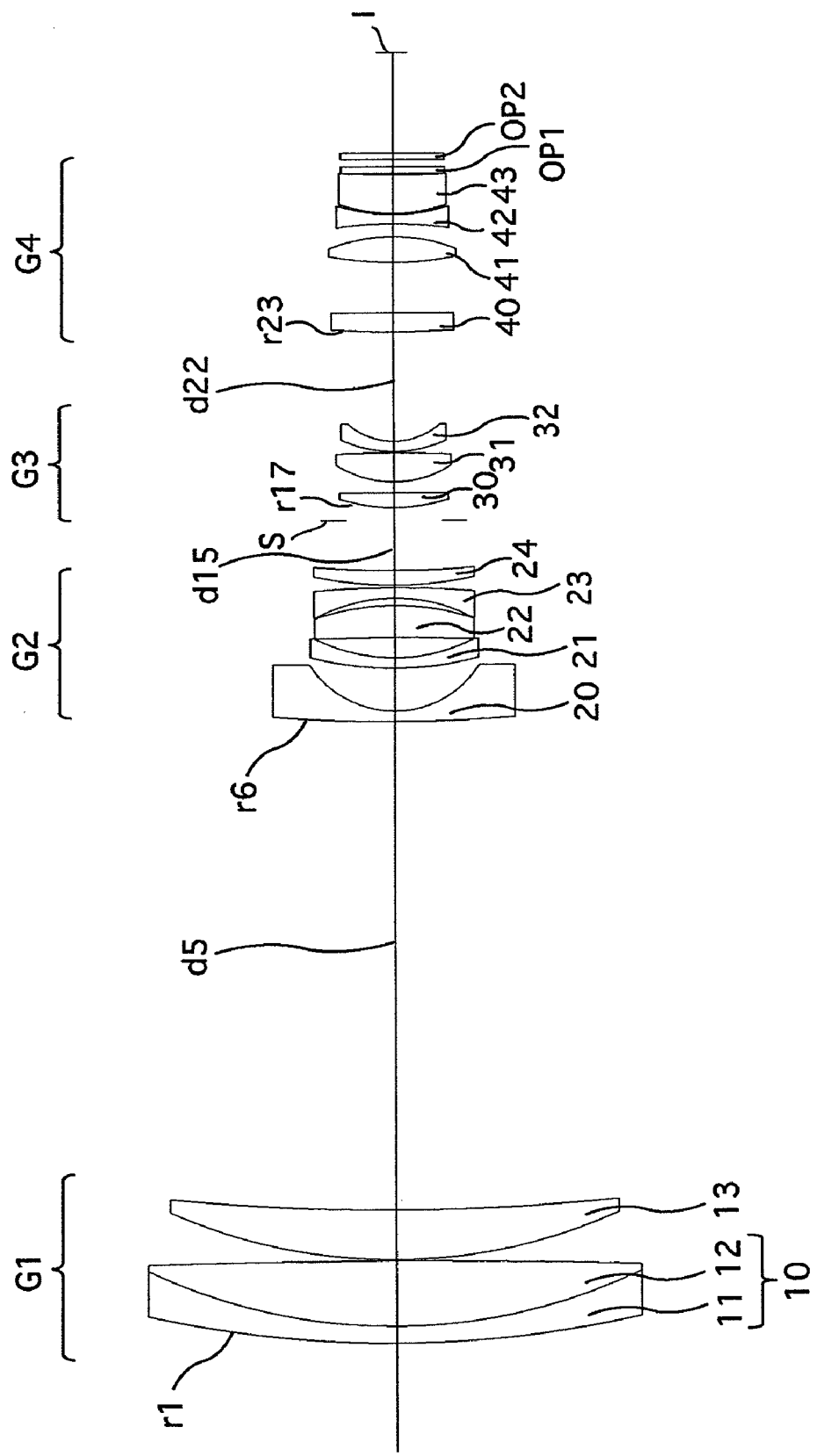

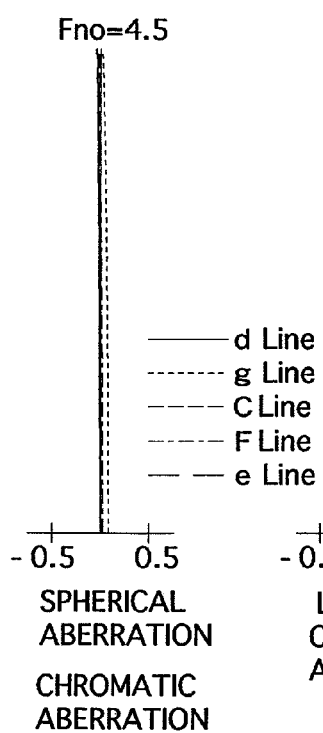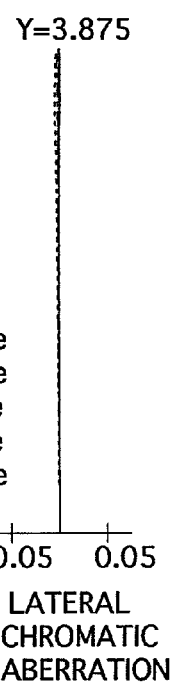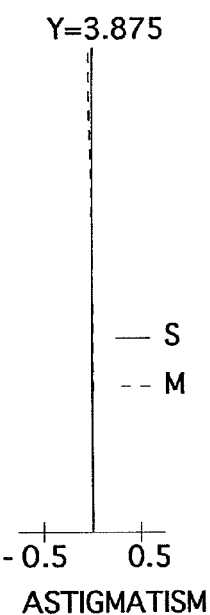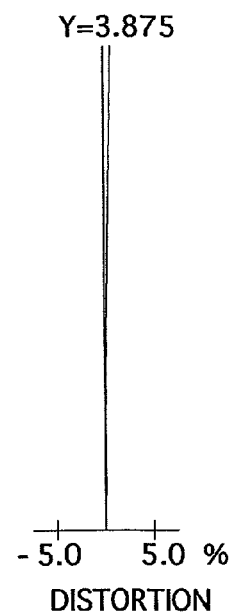

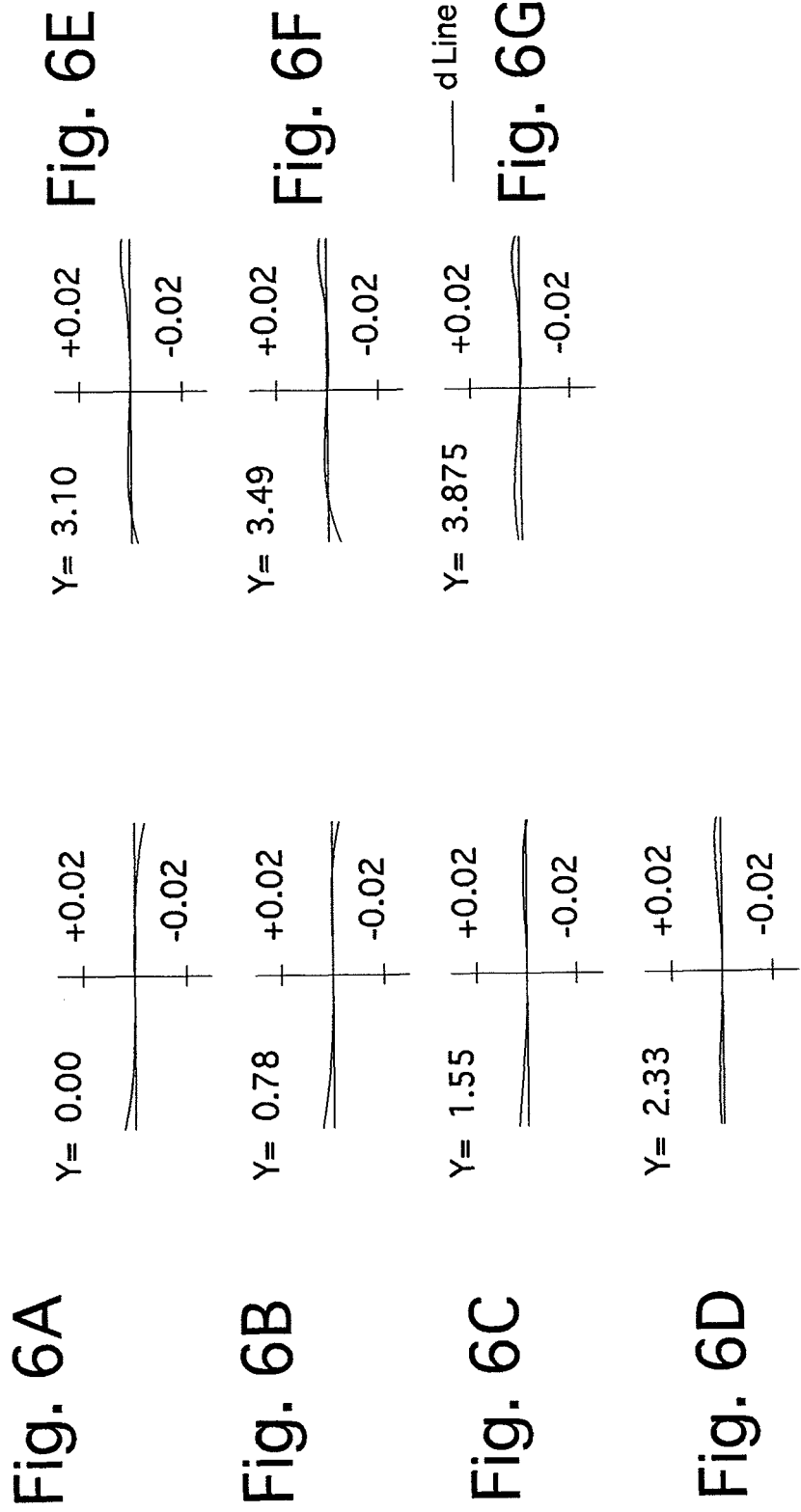

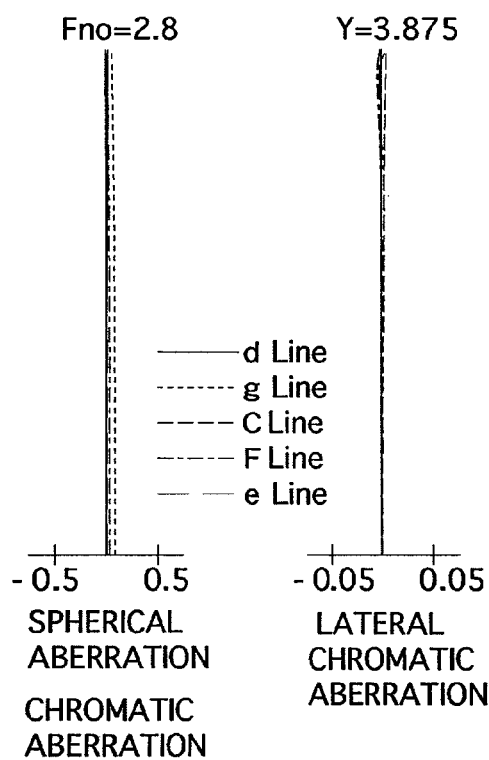
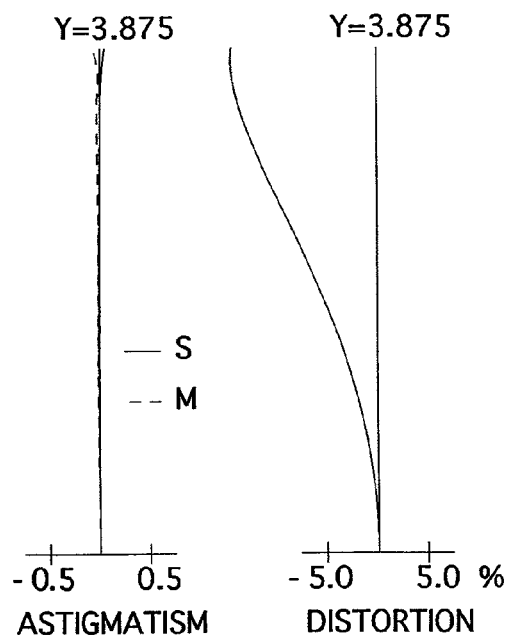
Fig. 8A Fno=2.8 — SPHERICAL ABERRATION CHROMATIC ABERRATION (−0.5, 0.5)
Fig. 8B Y=3.875 — LATERAL CHROMATIC ABERRATION (−0.05, 0.05)
Fig. 8C Y=3.875 — ASTIGMATISM (−0.5, 0.5)
Fig. 8D Y=3.875 — DISTORTION (−5.0, 5.0 %)
d Line
g Line
C Line
F Line
e Line
S
M

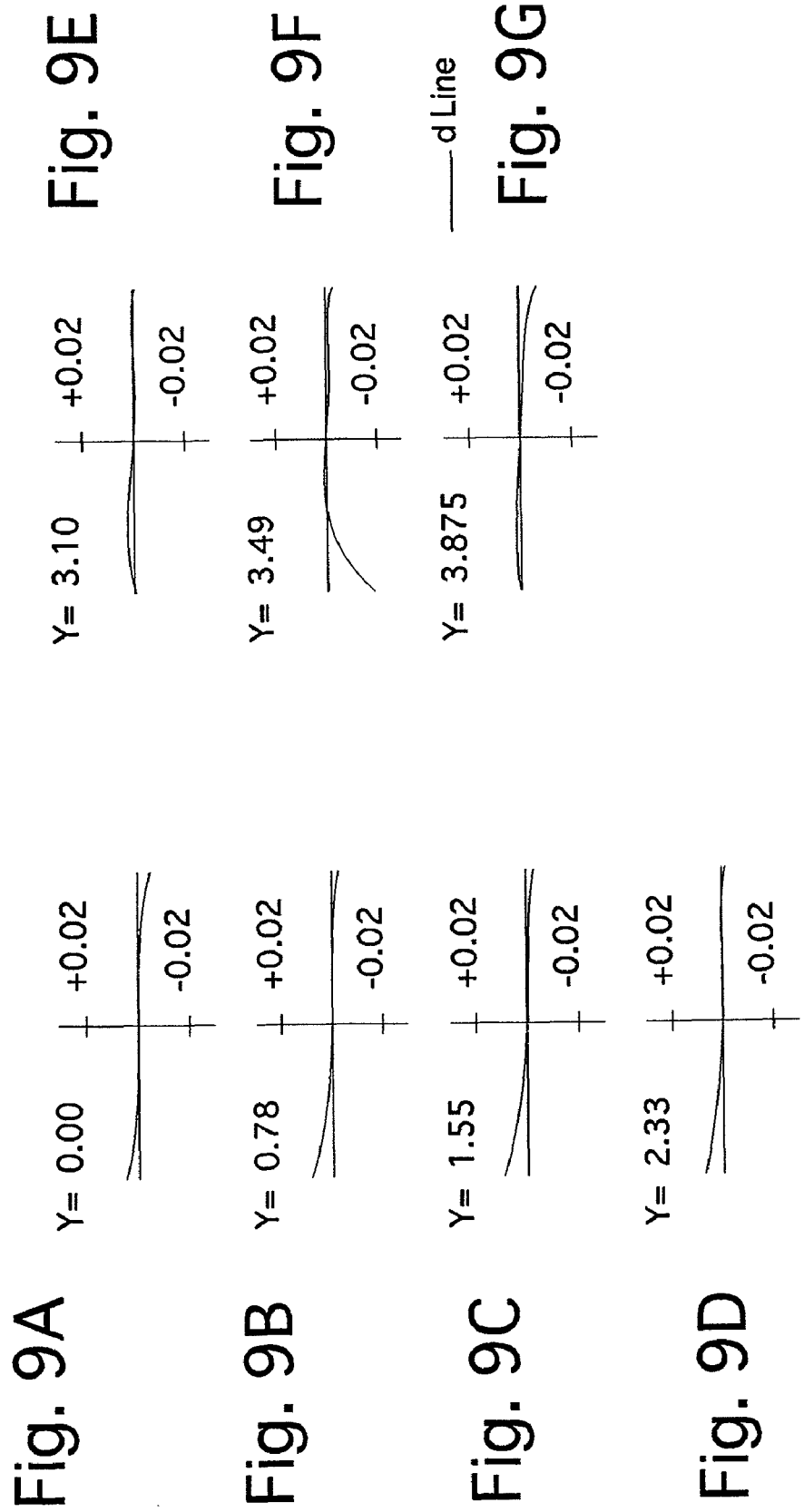

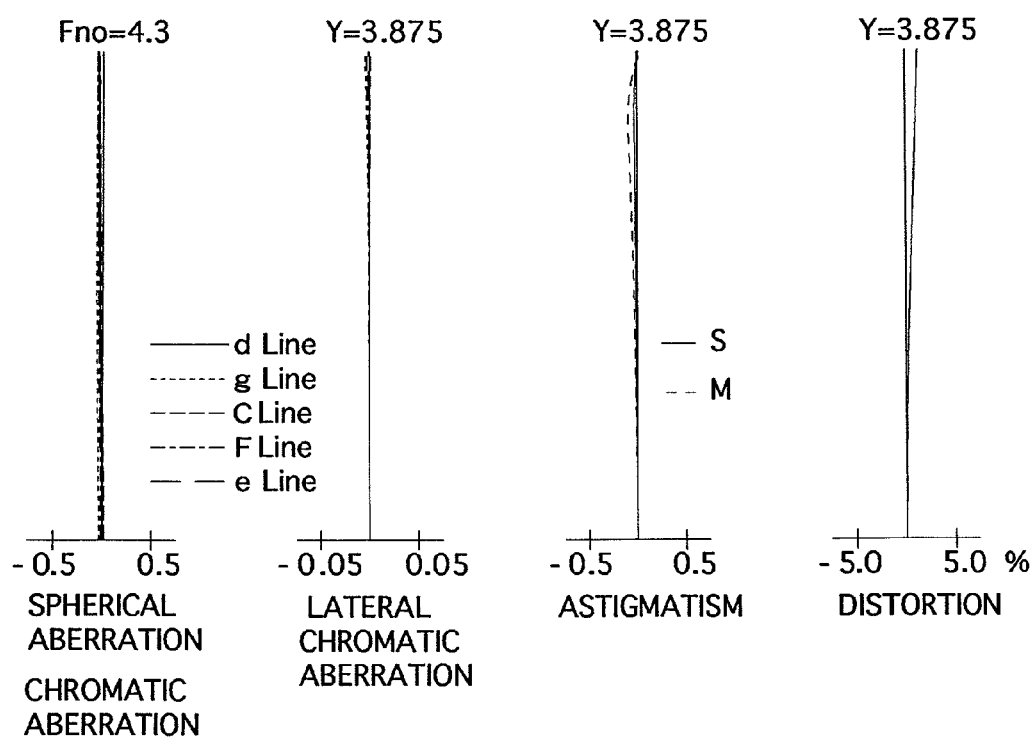

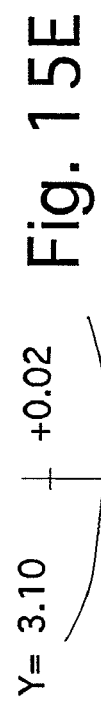
Fig. 15A Y= 0.00
Fig. 15B Y= 0.78
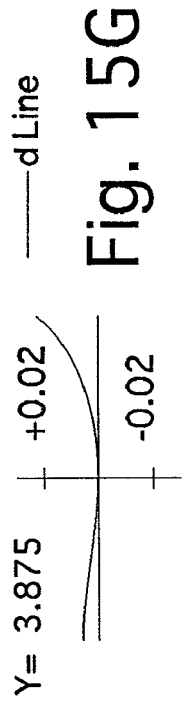
Fig. 15C Y= 1.55
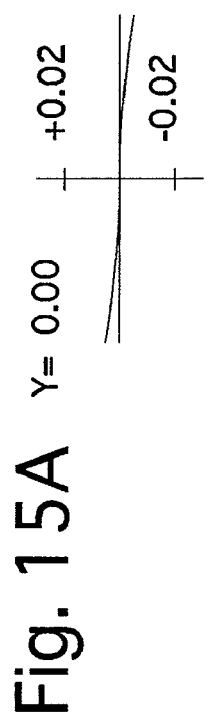
Fig. 15D Y= 2.32
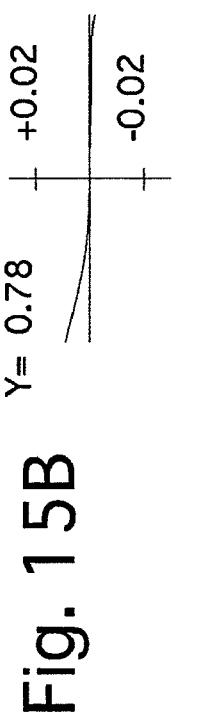
Fig. 15E Y= 3.10
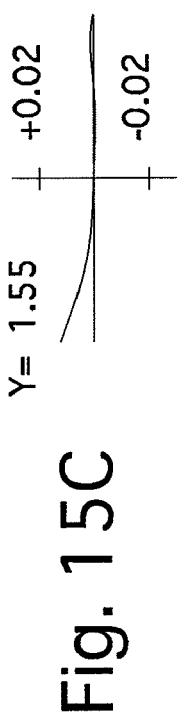
Fig. 15F Y= 3.49
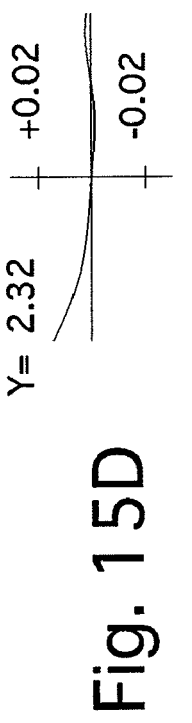
Fig. 15G Y= 3.875 —— d Line

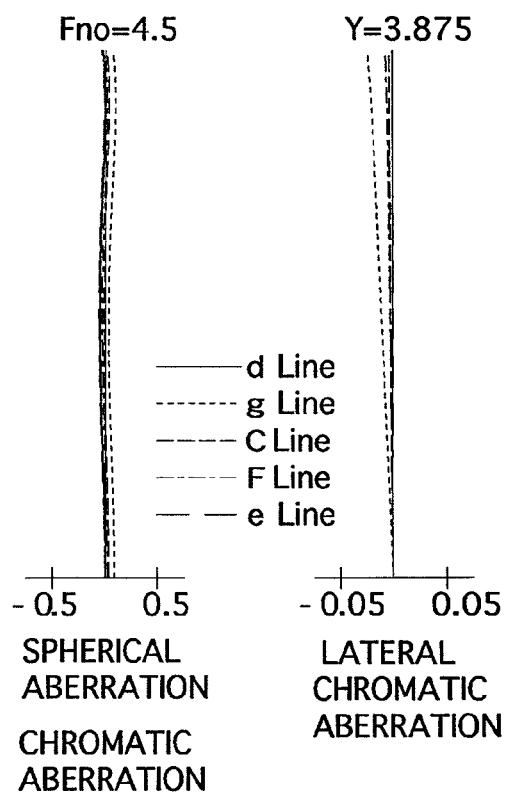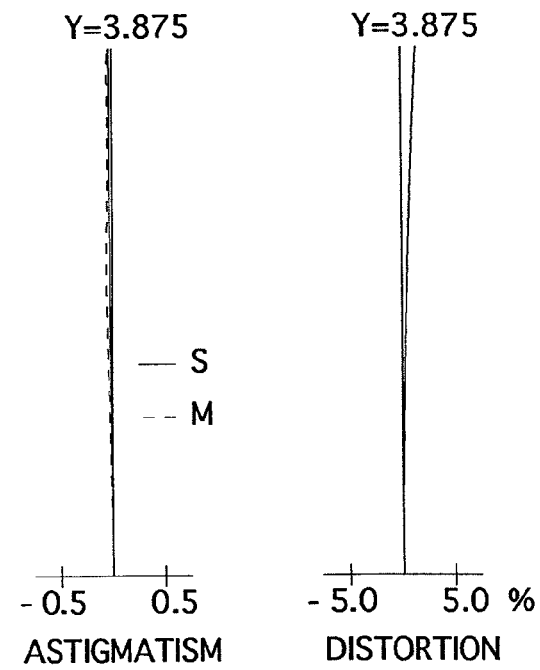

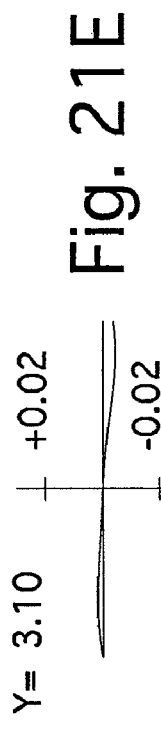
Fig. 21E  Y= 3.10
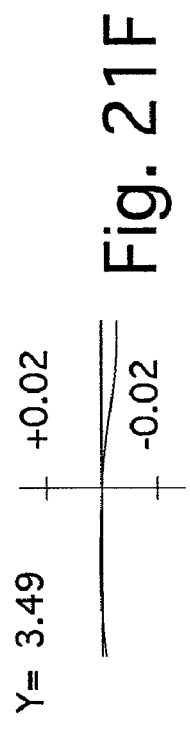
Fig. 21F  Y= 3.49  —— d Line
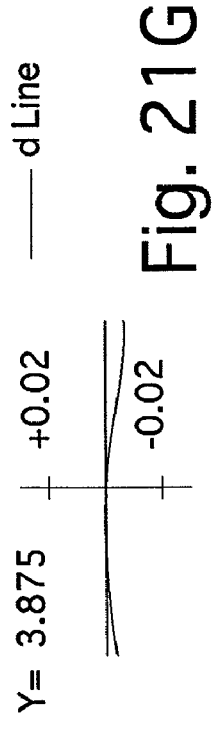
Fig. 21G  Y= 3.875
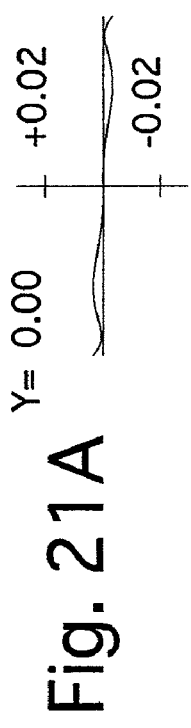
Fig. 21A  Y= 0.00
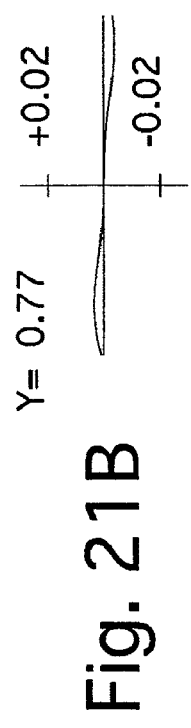
Fig. 21B  Y= 0.77
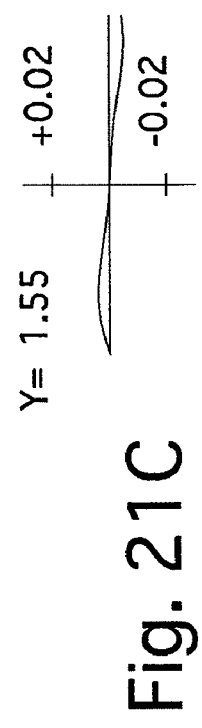
Fig. 21C  Y= 1.55
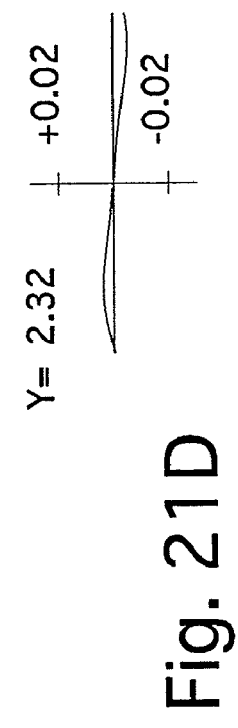
Fig. 21D  Y= 2.32

Fno=4.2

SPHERICAL
ABERRATION
CHROMATIC
ABERRATION

Y=3.875

LATERAL
CHROMATIC
ABERRATION

Y=3.875

ASTIGMATISM

Y=3.875

DISTORTION

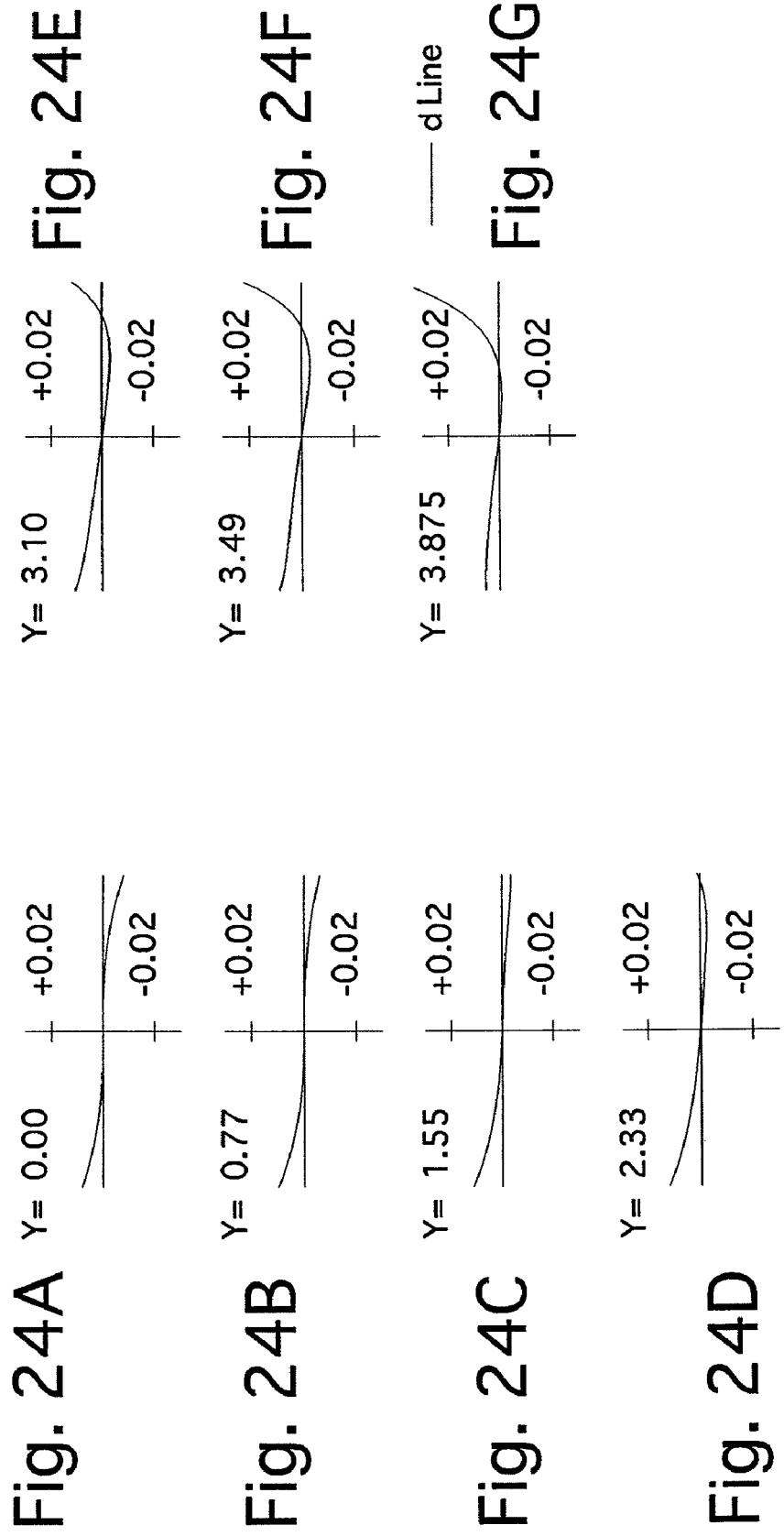

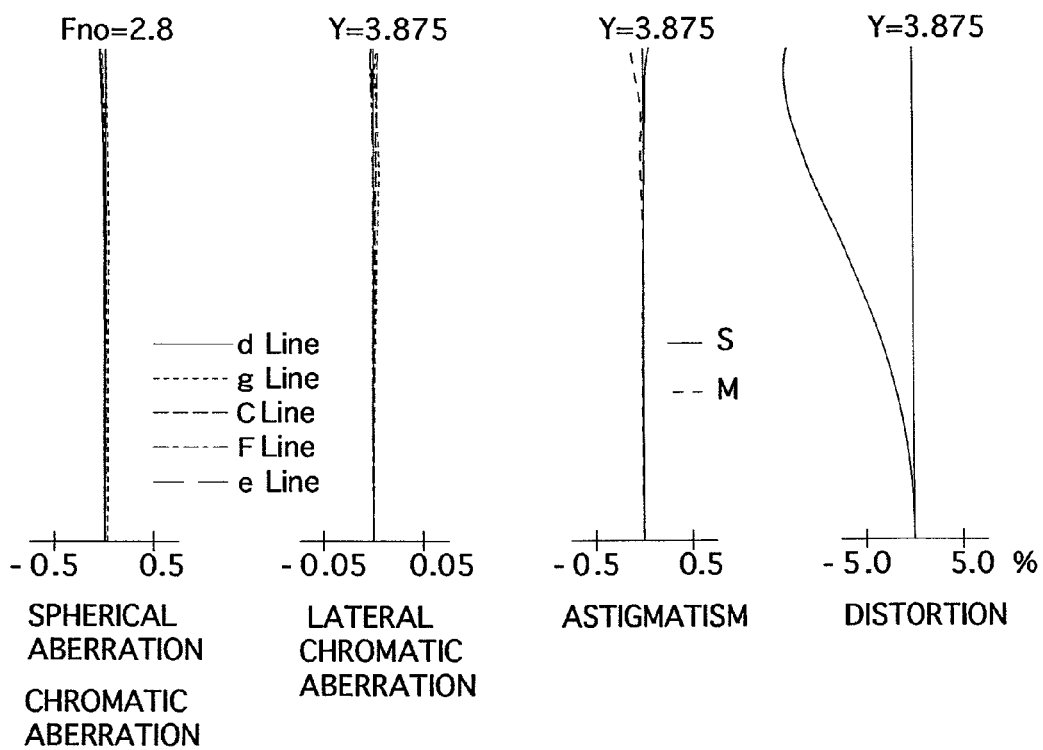

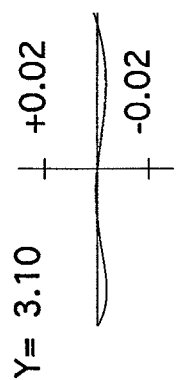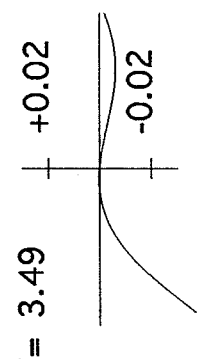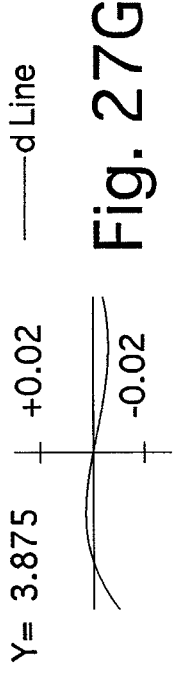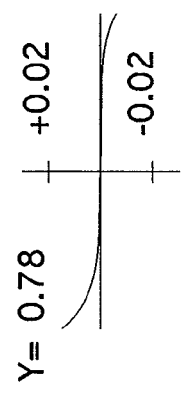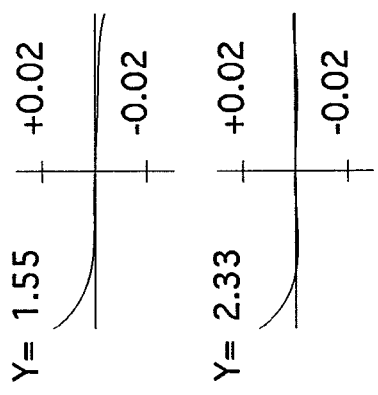

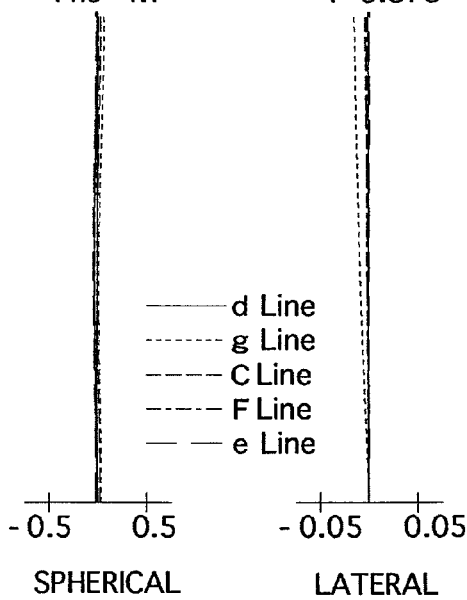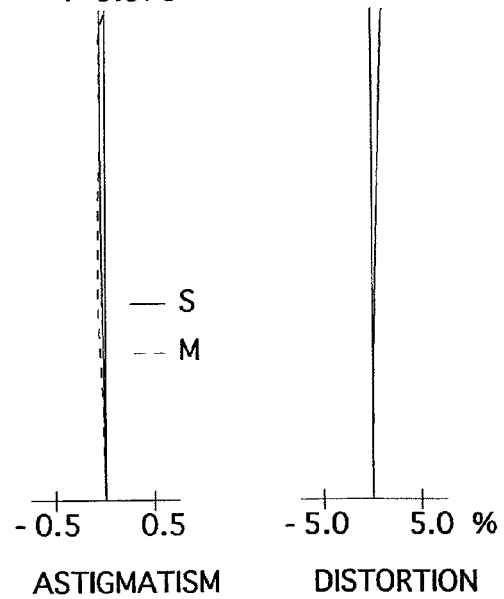
Fig. 29A Fno=4.7
Fig. 29B Y=3.875
Fig. 29C Y=3.875
Fig. 29D Y=3.875
—— d Line
······· g Line
– – – C Line
–·–·– F Line
— — e Line
— S
– – M
-0.5  0.5
SPHERICAL ABERRATION
CHROMATIC ABERRATION
-0.05  0.05
LATERAL CHROMATIC ABERRATION
-0.5  0.5
ASTIGMATISM
-5.0  5.0 %
DISTORTION

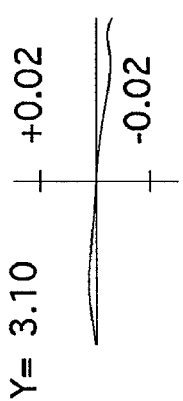
Fig. 30A  Y= 0.00
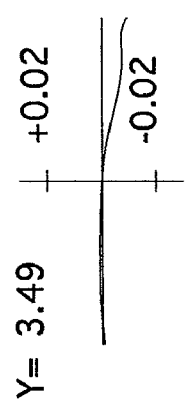
Fig. 30B  Y= 0.77
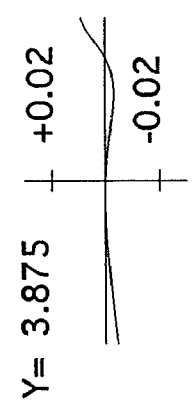
Fig. 30C  Y= 1.55
Fig. 30D  Y= 2.32
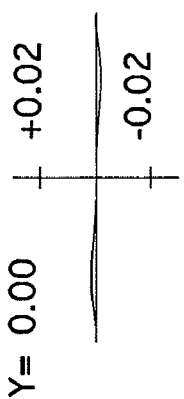
Fig. 30E  Y= 3.10
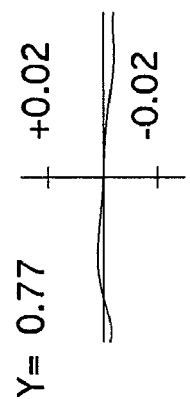
Fig. 30F  Y= 3.49
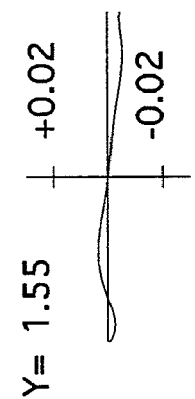
Fig. 30G  Y= 3.875
— d Line Fno=2.8

-0.5  0.5

SPHERICAL
ABERRATION
CHROMATIC
ABERRATION

Y=3.875

-0.05  0.05

LATERAL
CHROMATIC
ABERRATION

Y=3.875

-0.5  0.5

ASTIGMATISM

Y=3.875

-5.0  5.0 %

DISTORTION

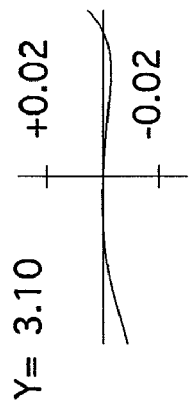 Fig. 36A  Y= 0.00
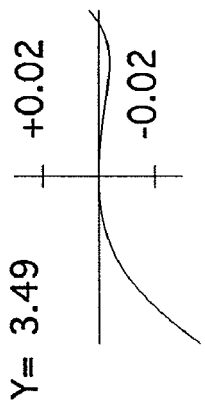 Fig. 36B  Y= 0.77
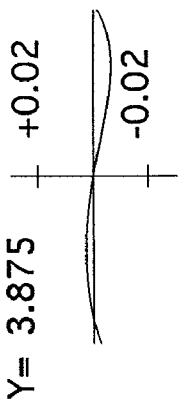 Fig. 36C  Y= 1.55
 Fig. 36D  Y= 2.33
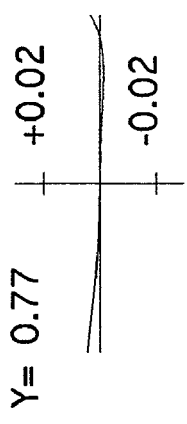 Fig. 36E  Y= 3.10
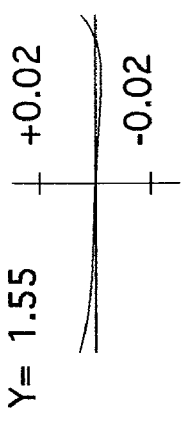 Fig. 36F  Y= 3.49
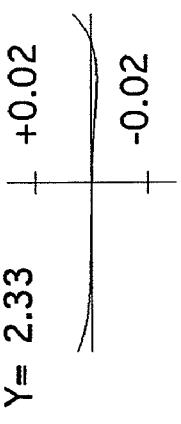 Fig. 36G  Y= 3.875  —— d Line

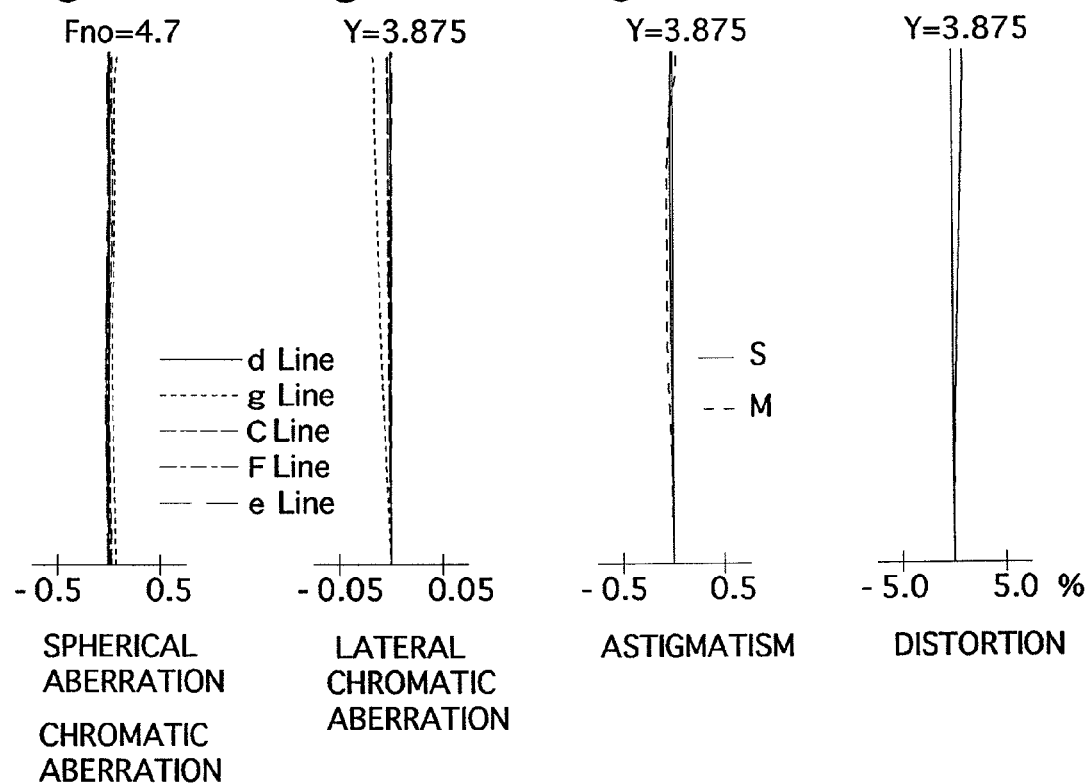

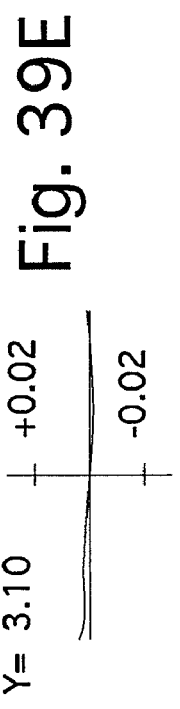
Fig. 39E  Y= 3.10
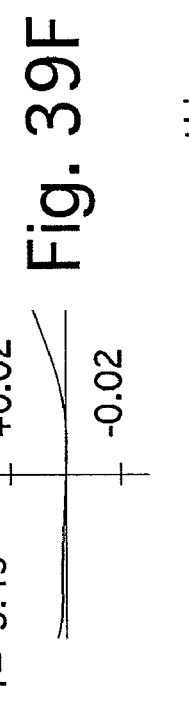
Fig. 39F  Y= 3.49
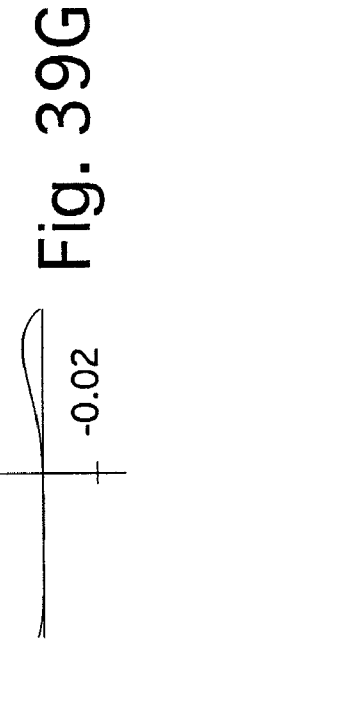
— d Line
Fig. 39G  Y= 3.875
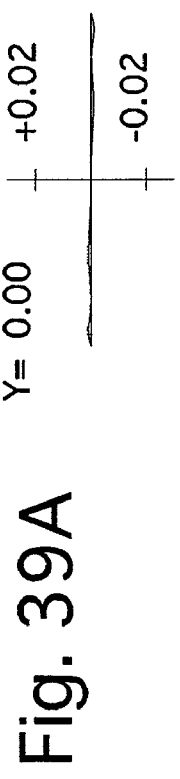
Fig. 39A  Y= 0.00
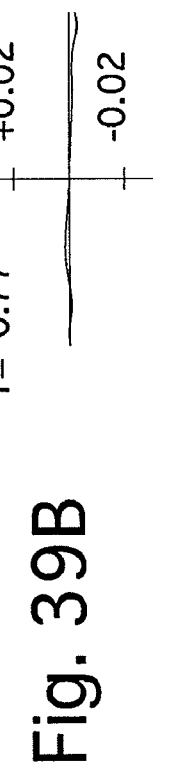
Fig. 39B  Y= 0.77
Fig. 39C  Y= 1.55
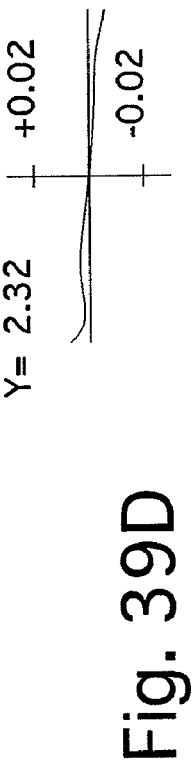
Fig. 39D  Y= 2.32

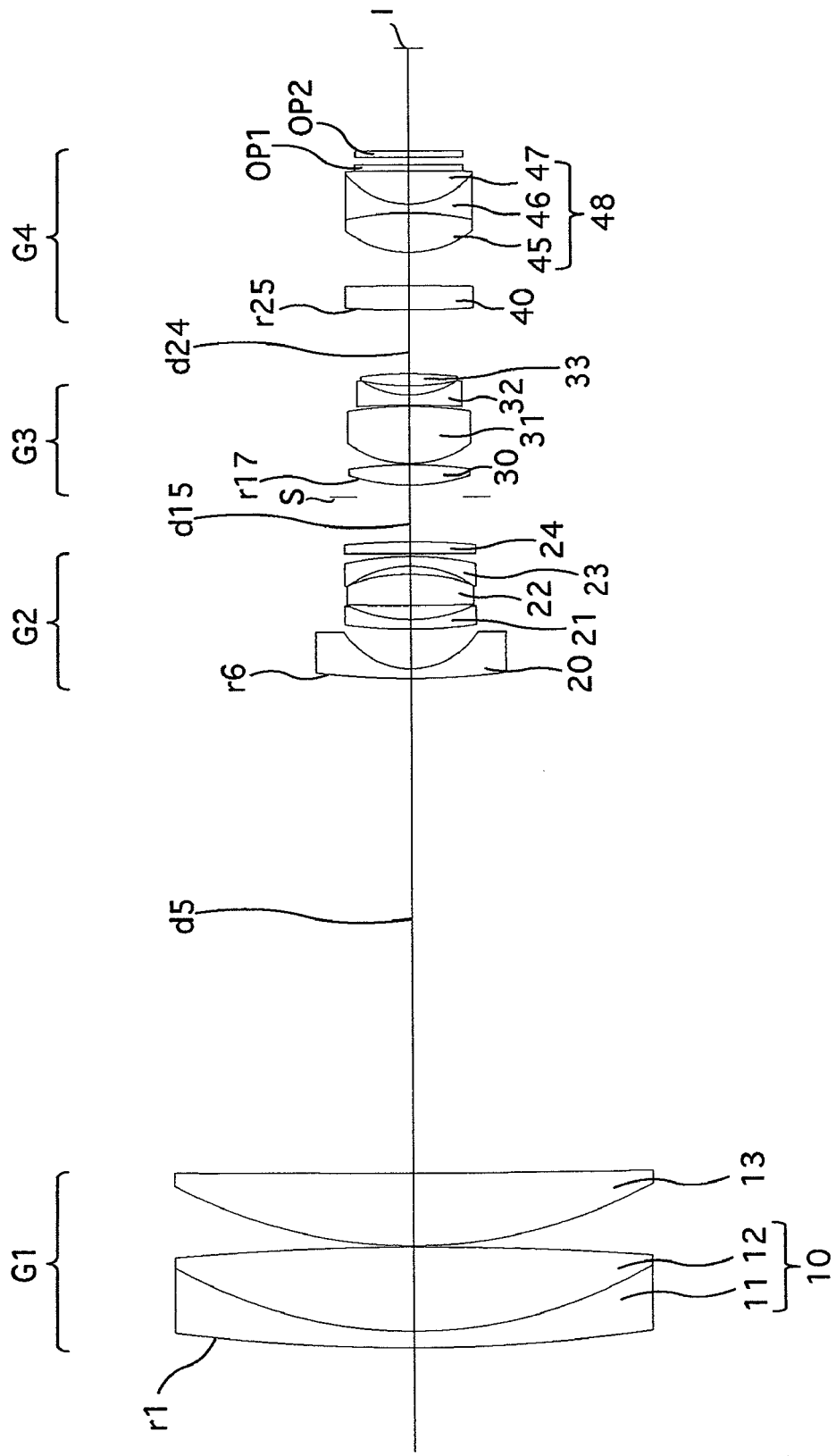

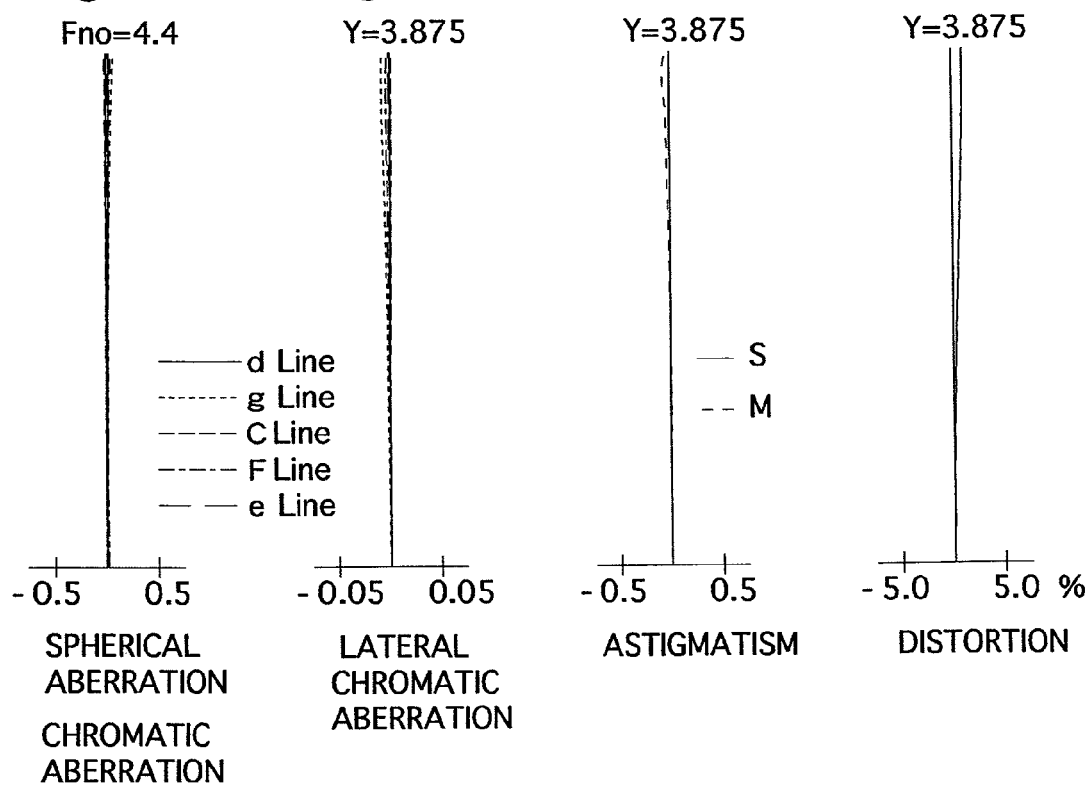

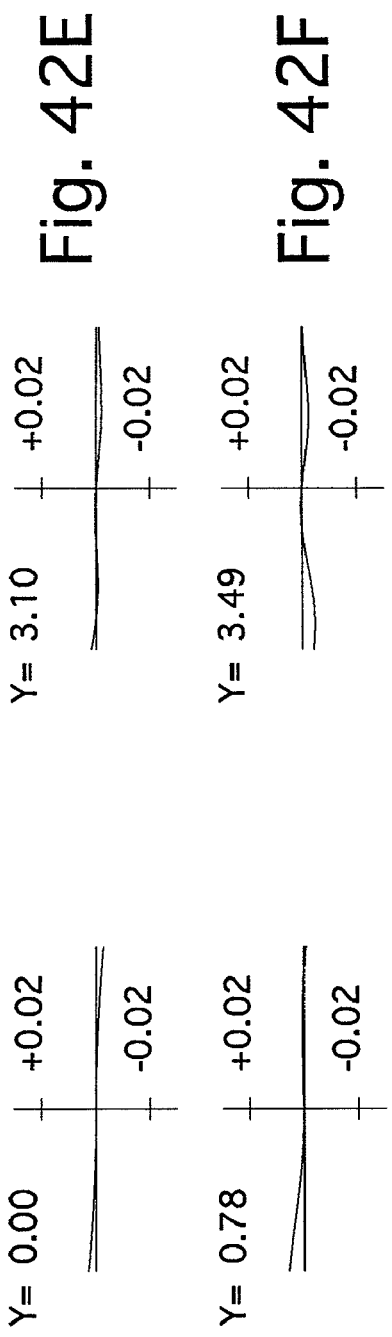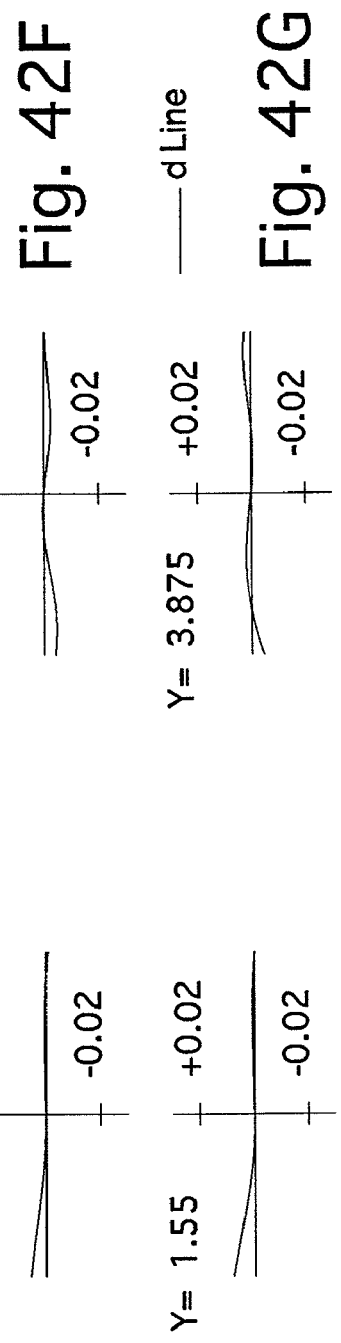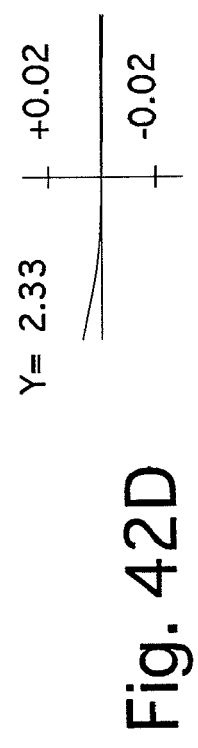

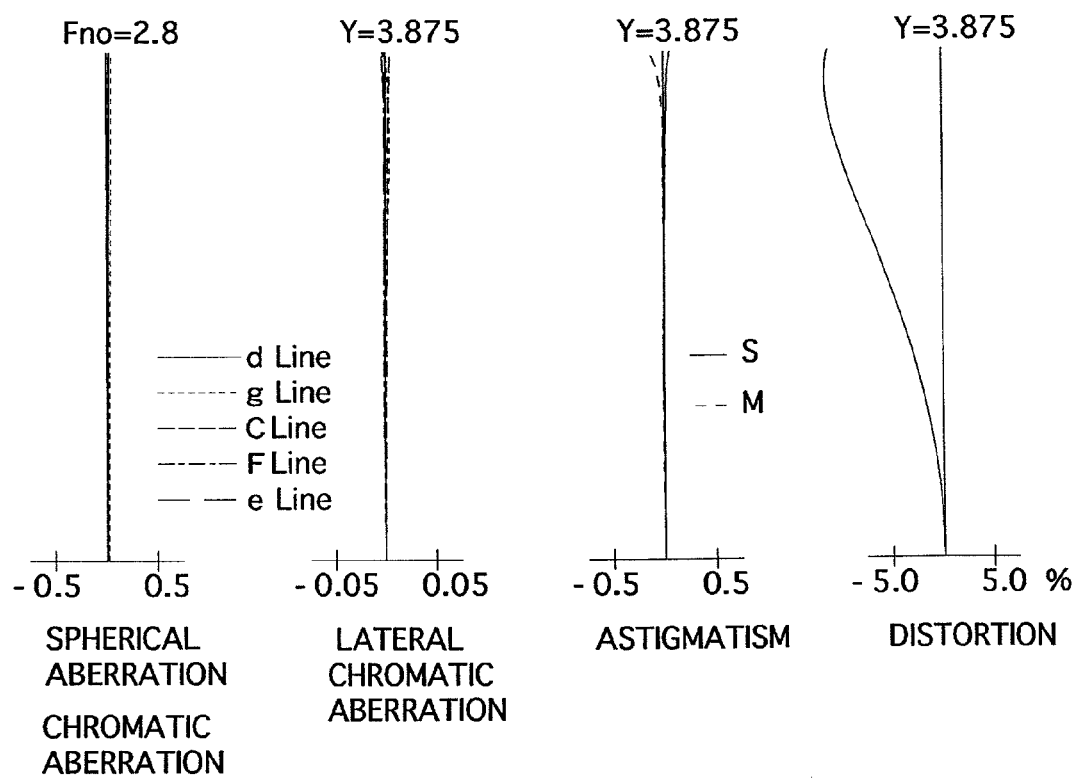

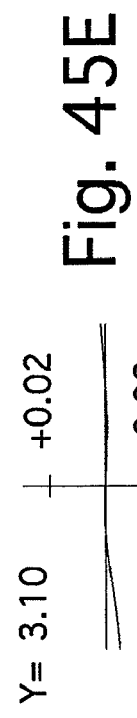
Fig. 45A  Y= 0.00
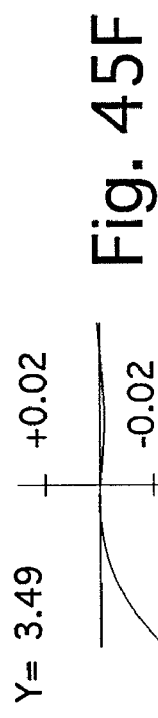
Fig. 45B  Y= 0.78
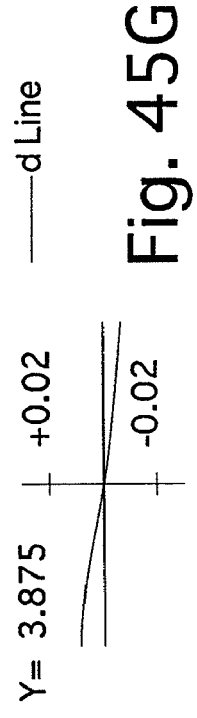
Fig. 45C  Y= 1.55
Fig. 45D  Y= 2.33
Fig. 45E  Y= 3.10
Fig. 45F  Y= 3.49
Fig. 45G  Y= 3.875  —— d Line
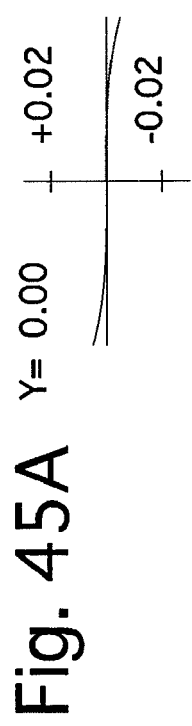
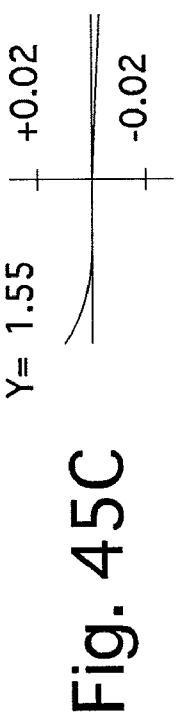
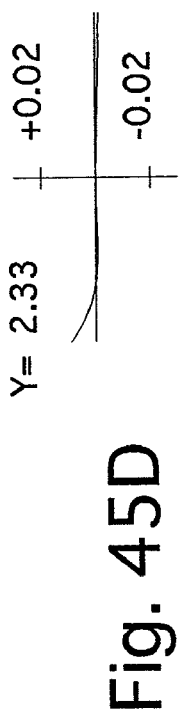

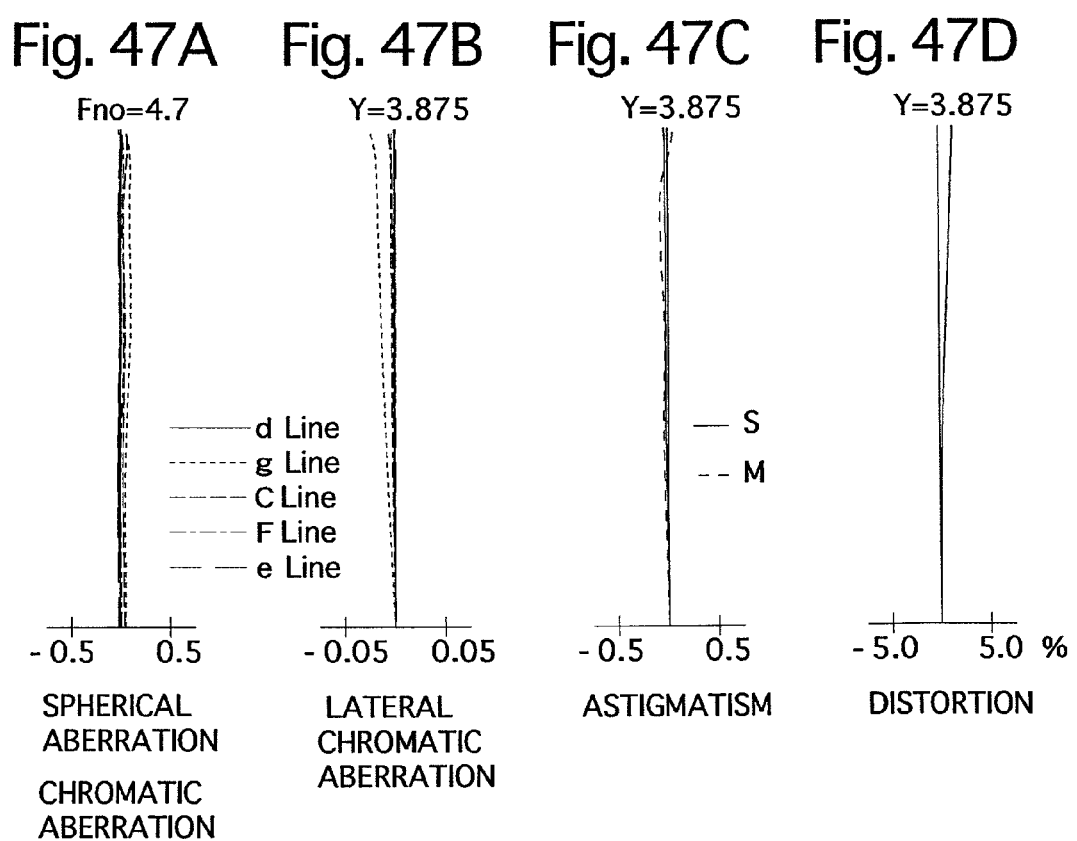

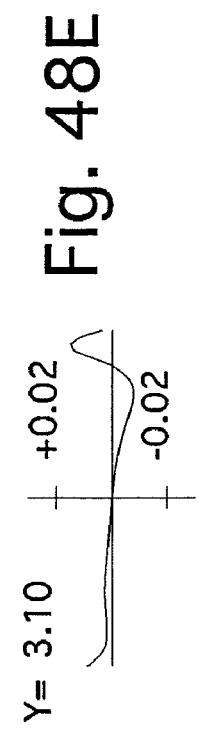
Fig. 48A  Y= 0.00
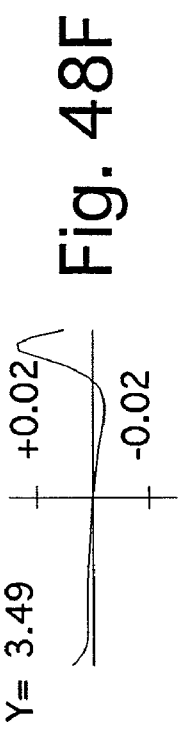
Fig. 48B  Y= 0.77
Fig. 48C  Y= 1.55
Fig. 48D  Y= 2.33
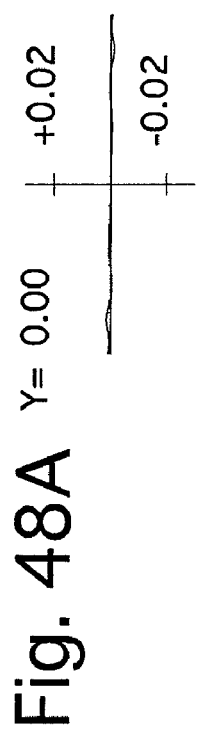
Fig. 48E  Y= 3.10
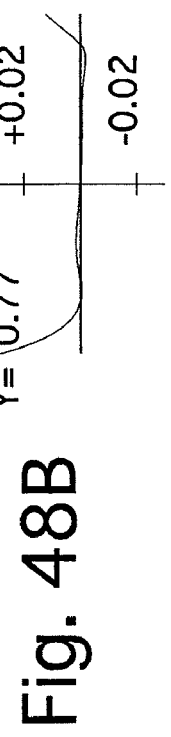
Fig. 48F  Y= 3.49
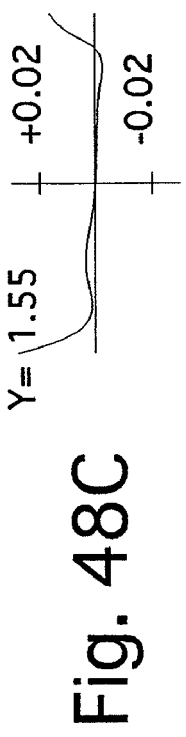
Fig. 48G  Y= 3.875  —— d Line
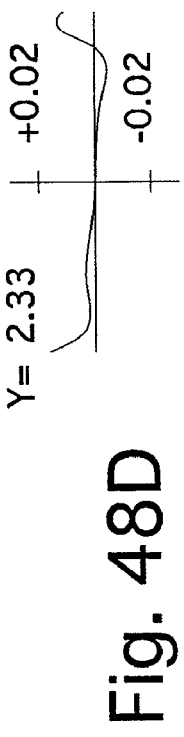
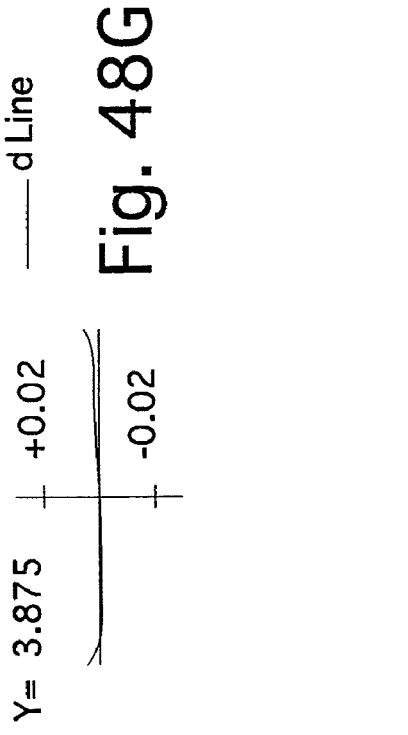

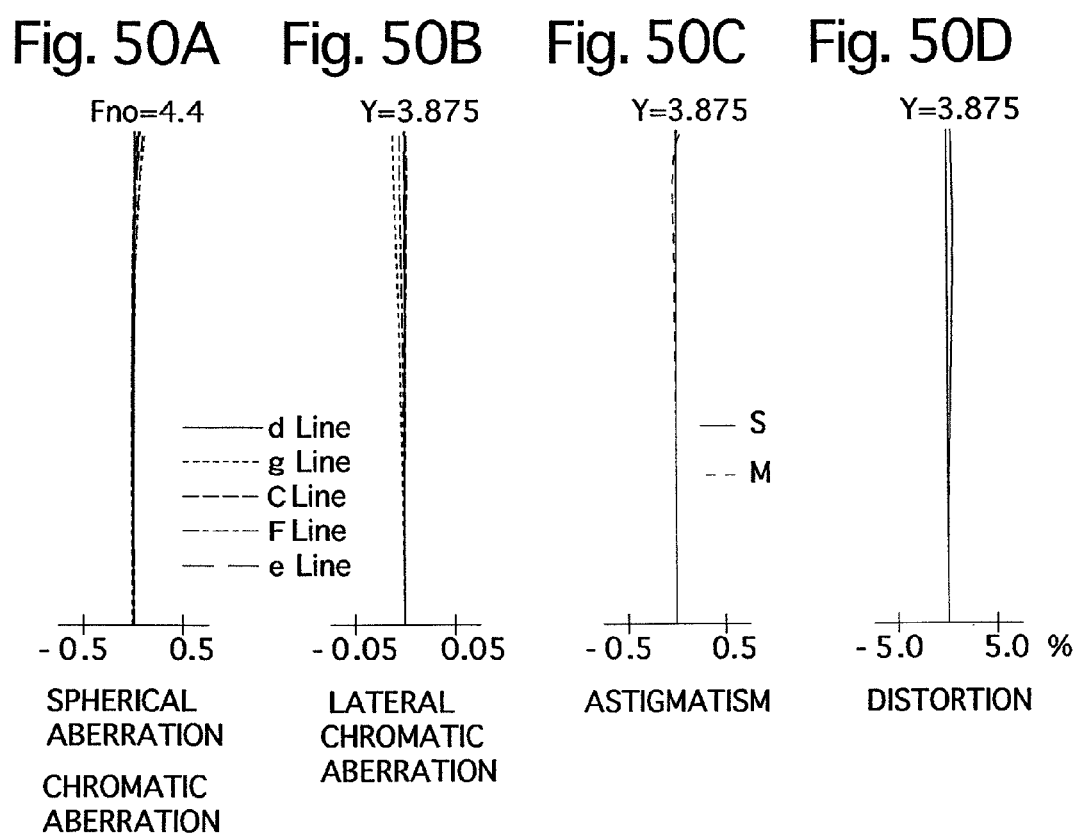

Fig. 51A Y= 0.00
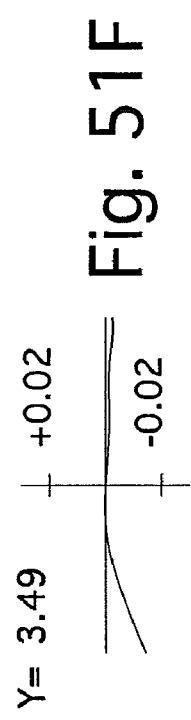
Fig. 51B Y= 0.77
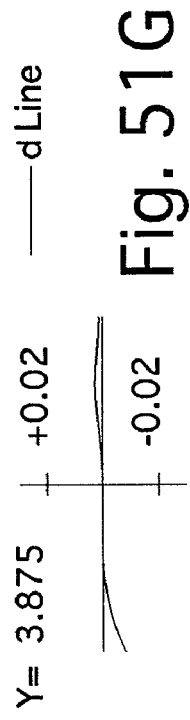
Fig. 51C Y= 1.55
Fig. 51D Y= 2.33
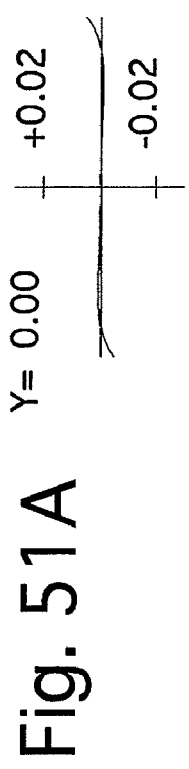
Fig. 51E Y= 3.10
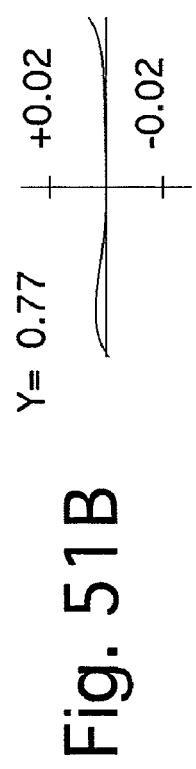
Fig. 51F Y= 3.49
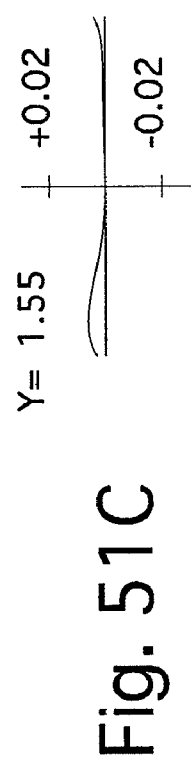
Fig. 51G Y= 3.875 —d Line
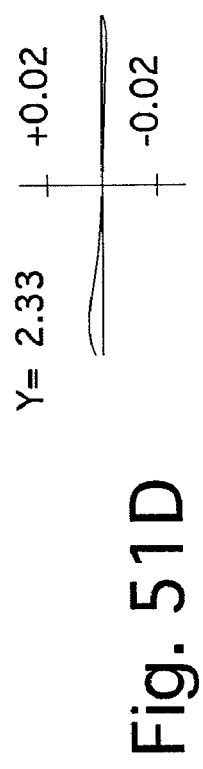

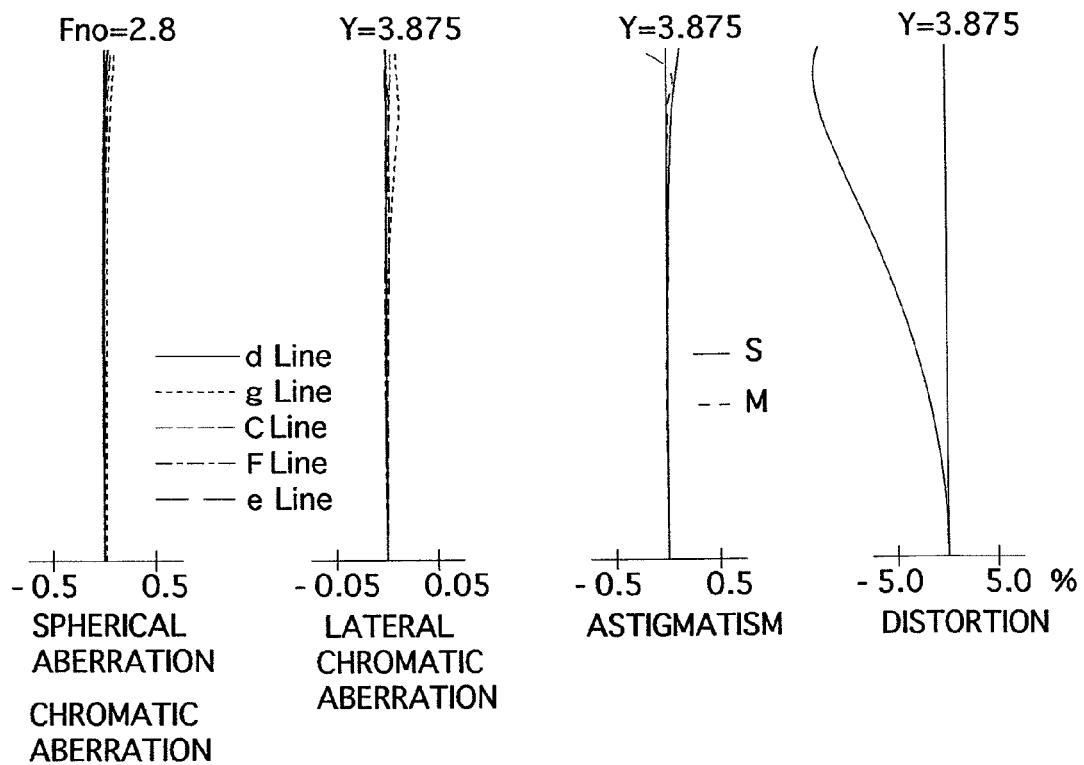

Fig. 54A  Y= 0.00
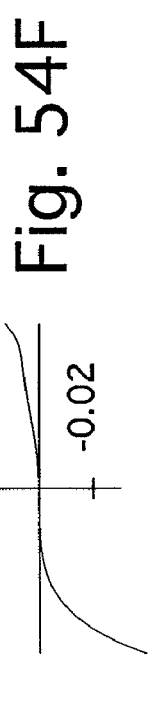
Fig. 54B  Y= 0.78
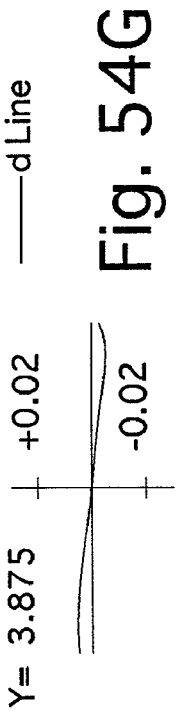
Fig. 54C  Y= 1.55
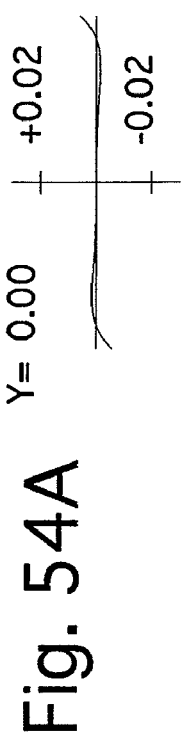
Fig. 54D  Y= 2.33
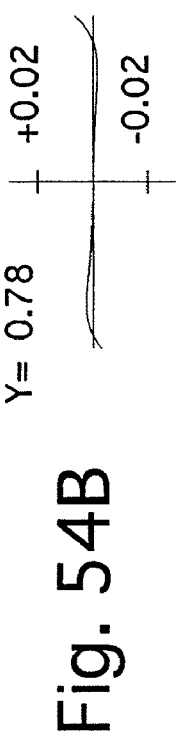
Fig. 54E  Y= 3.10
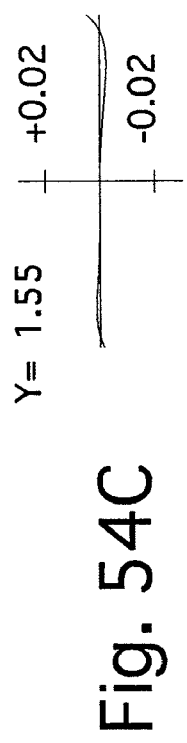
Fig. 54F  Y= 3.49
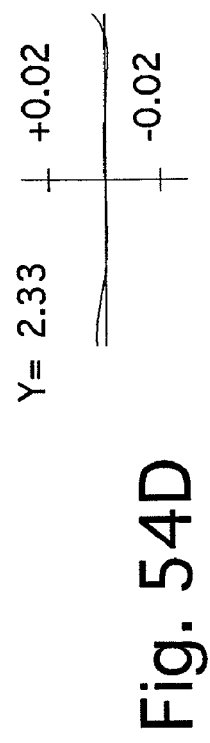
Fig. 54G  Y= 3.875  —d Line

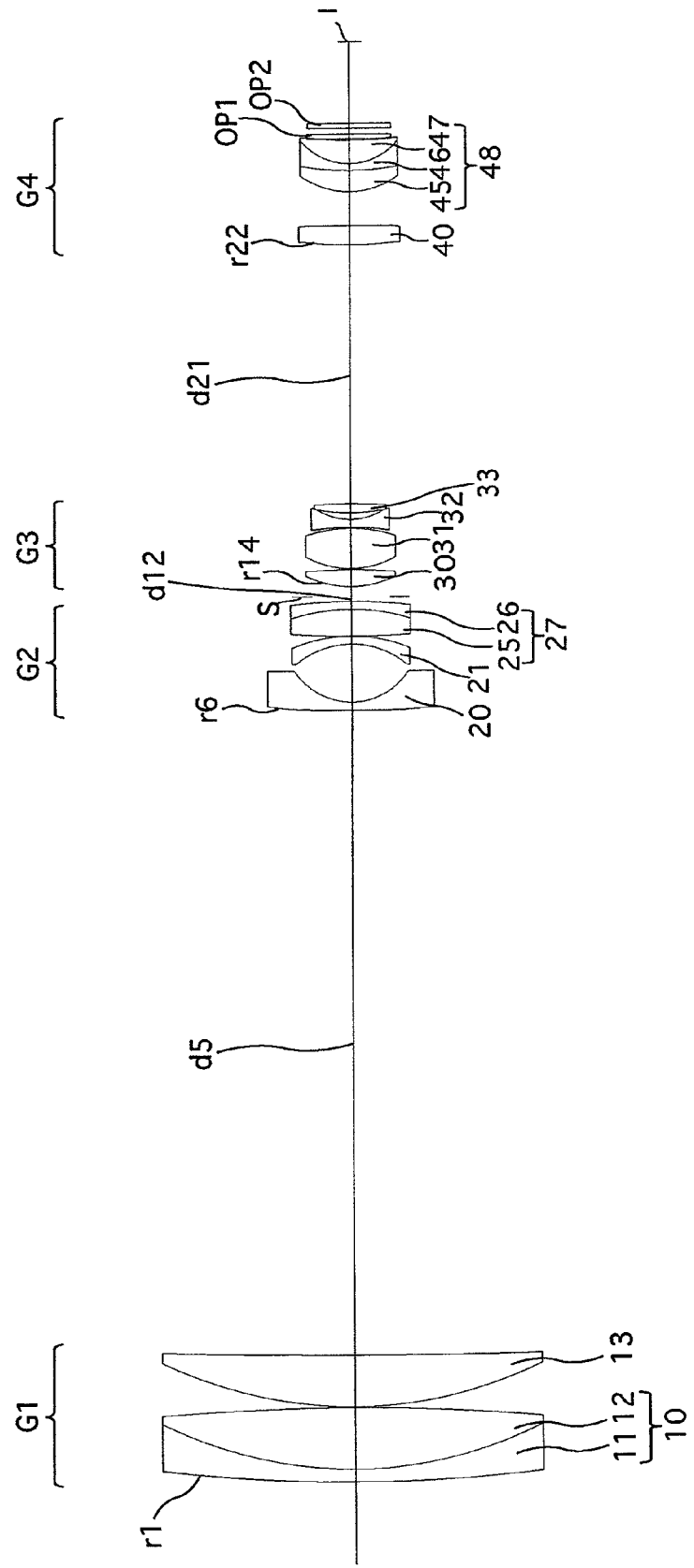

Fno=4.7 d Line
g Line
C Line
F Line
e Line

-0.5  0.5
SPHERICAL
ABERRATION
CHROMATIC
ABERRATION

Y=3.875

-0.05  0.05
LATERAL
CHROMATIC
ABERRATION

Y=3.875

— S
-- M

-0.5  0.5
ASTIGMATISM

Y=3.875

-5.0  5.0 %
DISTORTION

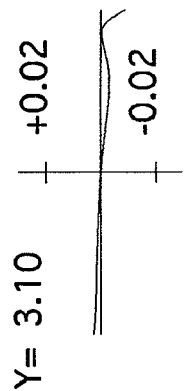
Fig. 57A  Y= 0.00
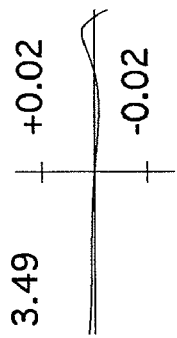
Fig. 57B  Y= 0.78
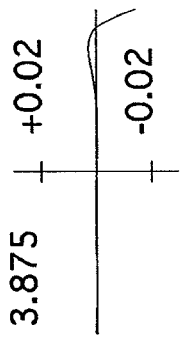
Fig. 57C  Y= 1.55
Fig. 57D  Y= 2.33
Fig. 57E  Y= 3.10
Fig. 57F  Y= 3.49
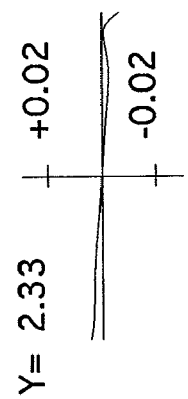
Fig. 57G  Y= 3.875  —d Line Fig. 59A  Fig. 59B  Fig. 59C  Fig. 59D
Fno=5.1  Y=3.875  Y=3.875  Y=3.875
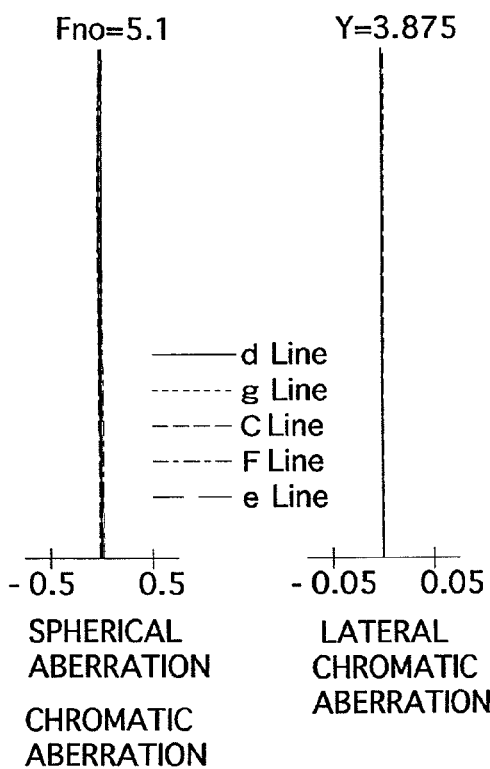
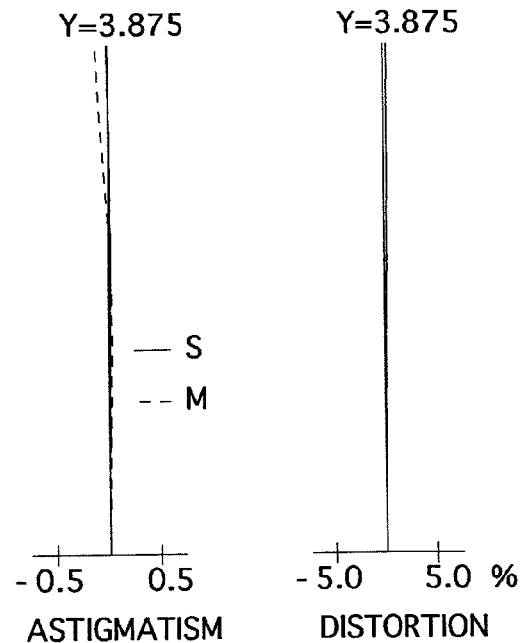
——— d Line
------- g Line
— — — C Line
— - — - F Line
— — e Line
— S
— — M
-0.5  0.5    -0.05  0.05    -0.5  0.5    -5.0  5.0 %
SPHERICAL   LATERAL      ASTIGMATISM   DISTORTION
ABERRATION  CHROMATIC
            ABERRATION
CHROMATIC
ABERRATION

Fig. 60A  Y= 0.00
Fig. 60B  Y= 0.78
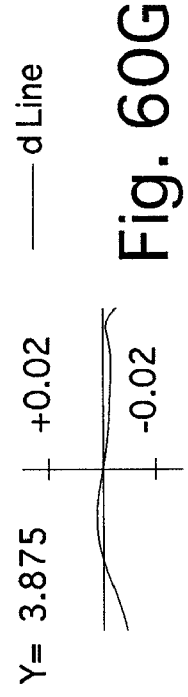
Fig. 60C  Y= 1.55
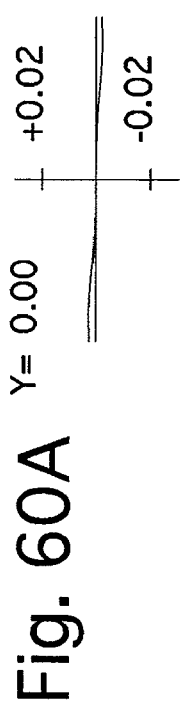
Fig. 60D  Y= 2.33
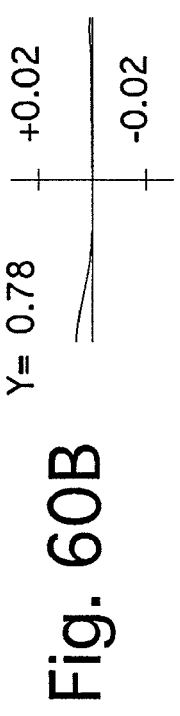
Fig. 60E  Y= 3.10
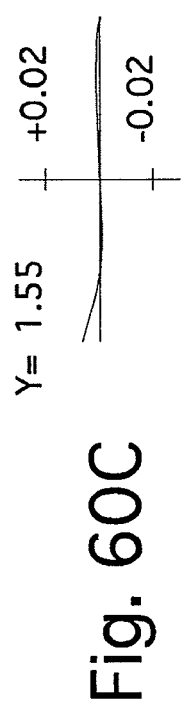
Fig. 60F  Y= 3.49
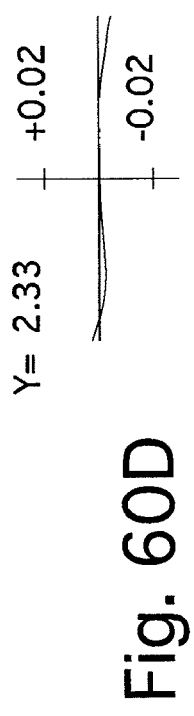
Fig. 60G  Y= 3.875  — d Line

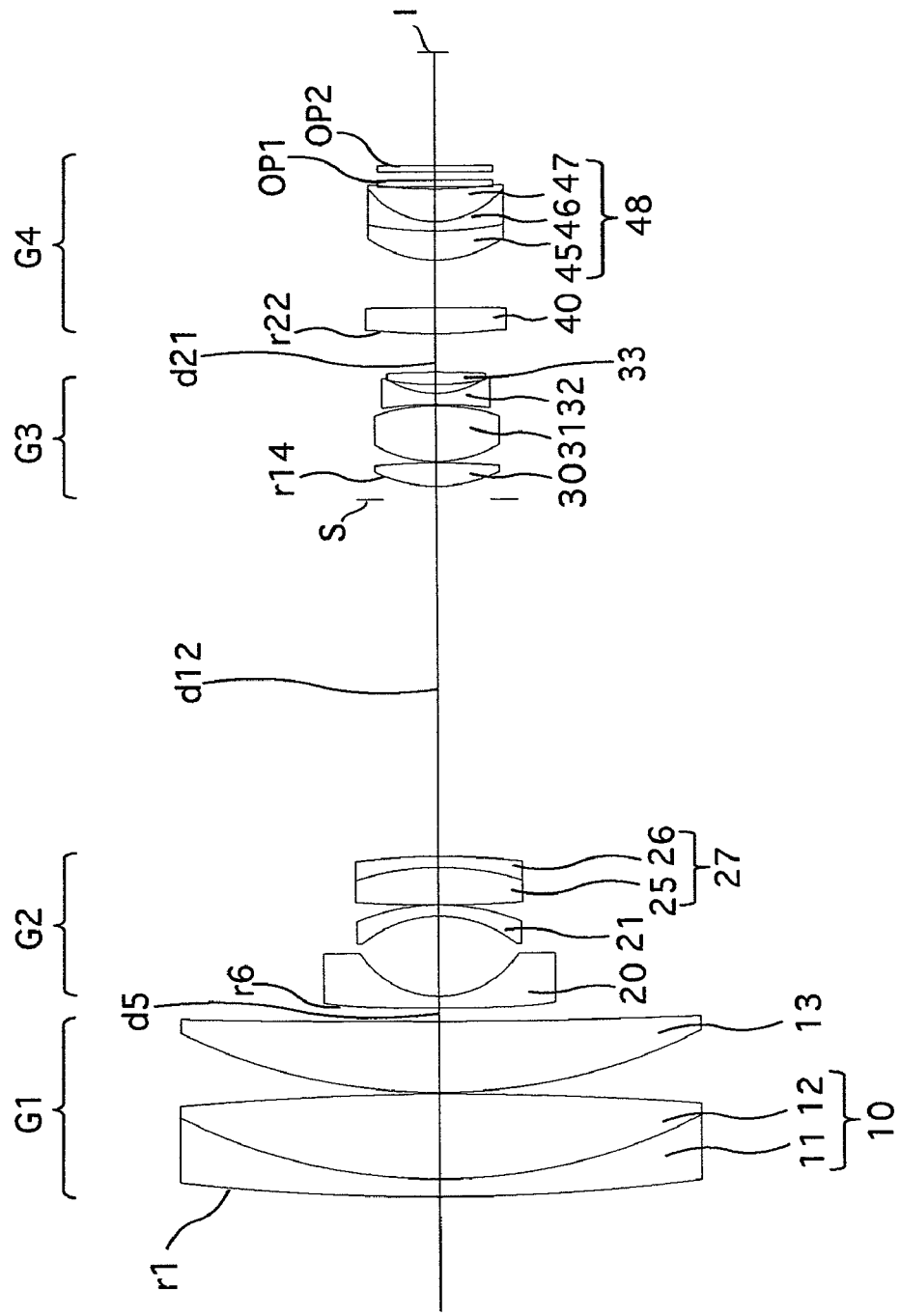

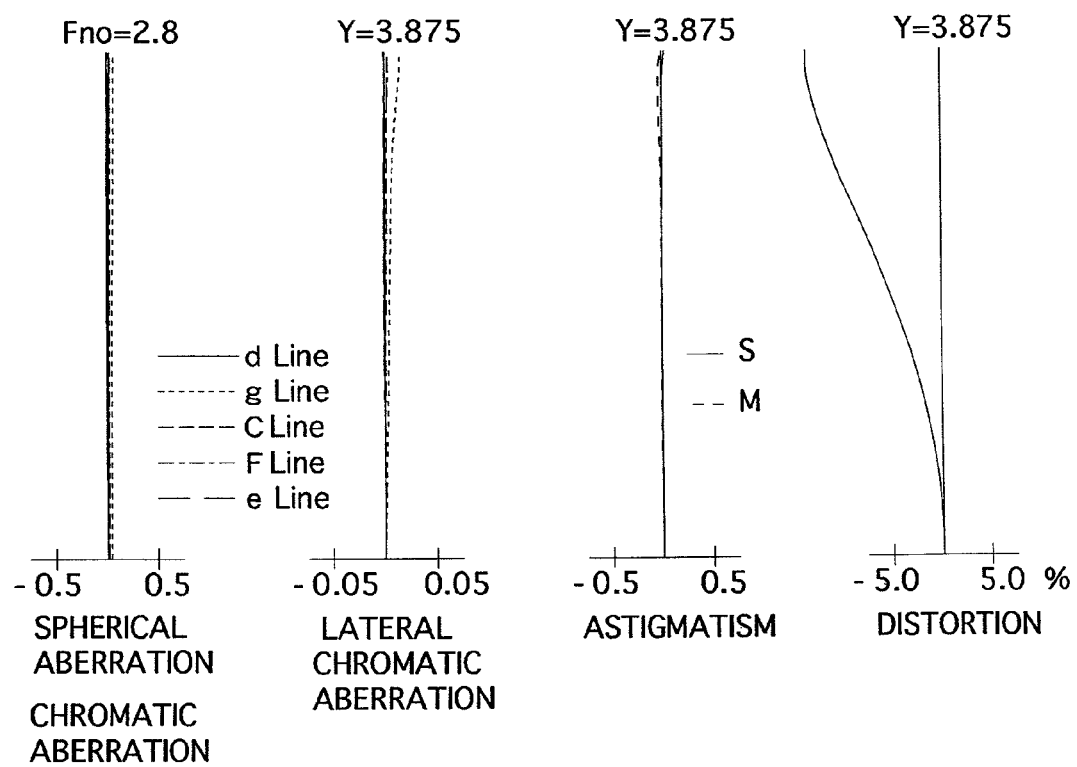

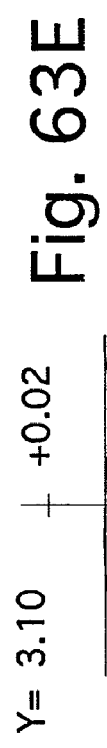
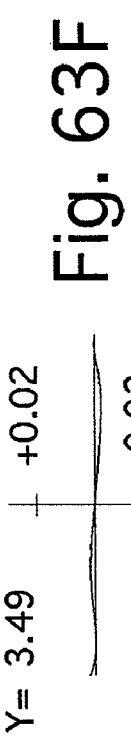
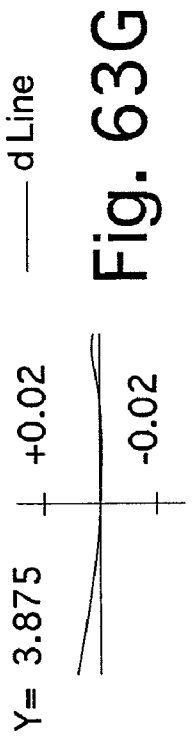
Fig. 63E  Y= 3.10
Fig. 63F  Y= 3.49
Fig. 63G  Y= 3.875   — d Line
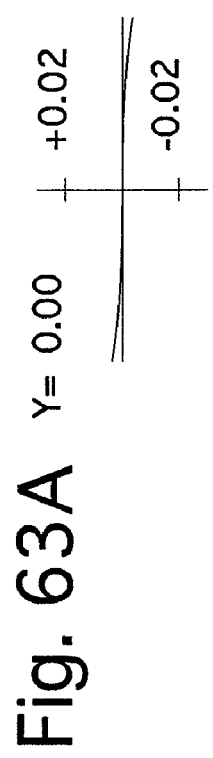
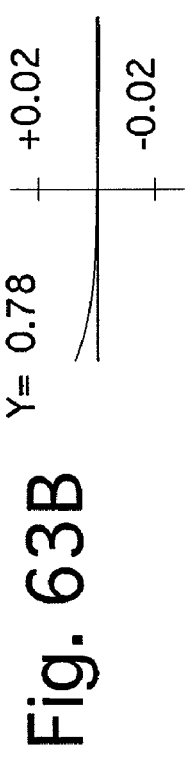
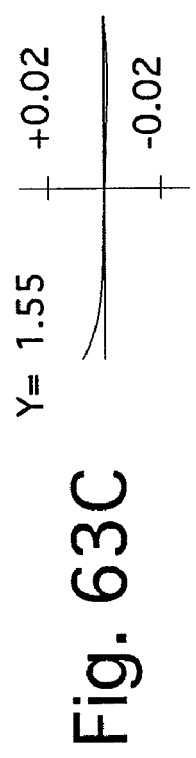
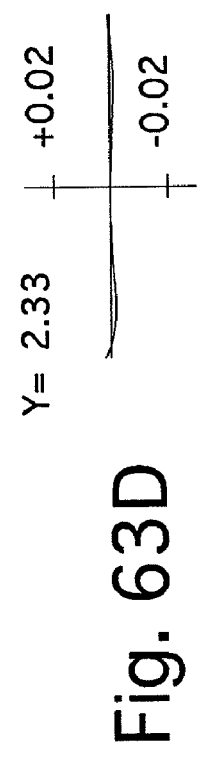
Fig. 63A  Y= 0.00
Fig. 63B  Y= 0.78
Fig. 63C  Y= 1.55
Fig. 63D  Y= 2.33

ZOOM LENS SYSTEM

BACKGROUND OF THE INVENTION

1. Field of the Invention

The present invention relates to a photographing lens system provided in a photographic camera, an electronic still camera or a video camera, and particularly relates to a zoom lens system of high zoom-ratio, which is miniaturized, and achieves superior optical quality over the entire zooming range.

2. Description of Related Art

In recent years, in the product-field of photographic cameras, electronic still cameras and video cameras, a zoom lens has been typically used; and, the zoom lens has been more strongly demanded to have higher optical quality, a higher zoom ratio, and to be more compact in size.

A well-known zoom lens system suitable for achieving high optical quality and a high zoom-ratio includes a first lens group having a positive refractive power (hereinafter, a positive first lens group), a second lens group having a negative refractive power (hereinafter, a negative second lens group), a third lens group having a positive refractive power (hereinafter, a positive third lens group), and a fourth lens group having a positive refractive power (hereinafter, a positive fourth lens group), in this order from the object. In the zoom lens system with the above lens arrangement, upon zooming from the short focal length extremity (wide-angle extremity) to the long focal length extremity (telephoto extremity), the distances between each of these lens groups vary.

Furthermore, typically in zoom lens systems having a large number of lens groups, if the refractive power of each lens group is made stronger, the traveling distance of each lens group along the optical axis upon zooming can be reduced, and hence, a compact zoom lens system can be achieved.

On the other hand, strengthening the refractive power of each lens group, however, increases aberration fluctuations of each lens group when zooming is performed, and tends to increase residual aberrations of each lens group. Accordingly, if the refractive power of each lens group is set inappropriately, such as being made stronger without being through suitable design-reviewing process, etc., it is very difficult to achieve a compact zoom lens system having a high zoom-ratio and a high optical quality.

Therefore in order to simultaneously achieve conflicting requirements, such as a higher zoom-ratio and higher optical quality, in a zoom lens system, it becomes important to determine the refractive power of each lens group appropriately so that the refractive power-balance can be well maintained over the lens groups.

For example, in the zoom lens system proposed in Japanese Unexamined Patent Publication No. 2006-171615, a lens arrangement of a positive lens group, a negative lens group, a positive lens group and a positive lens group in this order from the object, is employed. However, since the refractive power balance among the lens groups is inappropriately set, the Petzval sum is increased in the negative direction. Consequently, astigmatic difference and field curvature increase, and optical quality with respect to the off-axis region becomes insufficient.

The zoom lens system proposed in Japanese Unexamined Patent Publication No. 2008-225328 also employs a lens arrangement having a positive lens group, a negative lens group, a positive lens group and a positive lens group, in this order from the object. However, since the lens arrangement of the fourth lens group is inappropriate, lateral chromatic aberration is undercorrected, especially at the long focal length extremity, and color flare undesirably and largely occurs in the off-axis region.

The zoom lens system proposed in Japanese Unexamined Patent Publication No. 2008-268787, likewise, employs a lens arrangement having a positive lens group, a negative lens group, a positive lens group and a positive lens group, in this order from the object. However, since the refractive power of the second lens group is too strong, aberration fluctuations in this second lens group upon zooming become larger, and the correcting of chromatic aberration also becomes difficult. As a result, a large amount of lower light-ray color flare occurs, especially at the long focal length extremity.

Compactness and low-cost are generally pursued at the design stage of a zoom lens system having a large number of lens groups. Therefore if an attempt is made to strengthen the refractive power of each lens group, or to reduce the number of lens elements, the amount of residual aberrations at each lens group increases, and the amount of aberration fluctuation upon zooming increases. Consequently, it is extremely difficult to attain an optimum optical quality, compactness and low production cost at the same time.

SUMMARY OF THE INVENTION

The present invention provides a high zoom-ratio, high quality zoom lens system which is compact and in which the amount of aberration fluctuations upon zooming are reduced to a minimum.

According to an aspect of the present invention, there is provided a zoom lens system including a positive first lens group, a negative second lens group, a positive third lens group, and a positive fourth lens group, in this order from the object.

Upon zooming from the short focal length extremity to the long focal length extremity, the positive first lens group, the negative second lens group, the positive third lens group and the positive fourth lens group move along the optical axis of the zoom lens system so that the distance between the positive first lens group and the negative second lens group increases, the distance between the negative second lens group and the positive third lens group decreases, and the distance between the positive third lens group and the positive fourth lens group increases.

The zoom lens system satisfies the following condition:

$$13.50 < f1/fw < 19.50 \tag{1}$$

wherein f1 designates the focal length of the positive first lens group; and fw designates the focal length of the entire zoom lens system at the short focal length extremity.

The zoom lens system preferably satisfies the following condition:

$$7.00 < f4/fw < 9.20 \tag{2}$$

wherein f4 designates the focal length of the positive fourth lens group; and fw designates the focal length of the entire zoom lens system at the short focal length extremity.

The zoom lens system preferably satisfies the following conditions:

$$0.05 < |f2|/ft < 0.09 \tag{3}$$

$$2.50 < f1/(ft \cdot fw)^{1/2} < 3.60 \tag{4}$$

wherein f1 designates the focal length of the positive first lens group;

f2 designates the focal length of the negative second lens group;

ft designates the focal length of the entire zoom lens system at the long focal length extremity; and fw designates the focal length of the entire zoom lens system at the short focal length extremity.

The zoom lens system preferably satisfies the following conditions:

$$3.50 < f3/fw < 4.50 \quad (5)$$

$$0.10 < f3/ft < 0.16 \quad (6)$$

wherein f3 designates the focal length of the positive third lens group;

ft designates the focal length of the entire zoom lens system at the long focal length extremity; and fw designates the focal length of the entire zoom lens system at the short focal length extremity.

The zoom lens system preferably satisfies the following condition:

$$8.50 < f1/|f2| < 11.00 \quad (7)$$

wherein f1 designates the focal length of the positive first lens group;

and f2 designates the focal length of the negative second lens group.

The zoom lens system preferably satisfies the following conditions:

$$0.15 < |f2|/f4 < 0.30 \quad (8)$$

$$3.60 < f1/f3 < 5.50 \quad (9)$$

wherein f1 designates the focal length of the positive first lens group;

f2 designates the focal length of the negative second lens group;

f3 designates the focal length of the positive third lens group; and f4 designates the focal length of the positive fourth lens group.

The positive first lens group can be constituted by a cemented lens having a negative lens element and a positive lens element, and a positive lens element, in this order from the object. In the cemented lens, the negative lens element and the positive lens element are arranged in this order from the object.

The negative second lens group can be constituted by a negative lens element, a negative lens element, a positive lens element, a negative lens element and a positive lens element, in this order from the object. In this case, the third lens element from the most object-side lens element of the negative second lens group (i.e., the positive lens element) is preferably provided with at least one aspherical surface.

The negative second lens group can be constituted by a negative lens element, a negative lens element and a cemented lens in this order from the object. The cemented lens includes a positive lens element and a negative lens element, in this order from the object. In this case, the most object-side lens element of the negative second lens group (i.e., the negative lens element) is preferably made aspherical on both surfaces thereof.

The positive third lens group preferably includes a positive lens element, a positive lens element, a negative lens element and a positive lens element, in this order from the object.

The positive fourth lens group preferably includes a cemented lens having a positive lens element, a negative lens element and a positive lens element, in this order from the object.

The present disclosure relates to subject matter contained in Japanese Patent Application No. 2009-122023 (filed on May 20, 2009) which is expressly incorporated herein in its entirety.

BRIEF DESCRIPTION OF THE DRAWINGS

The present invention will be discussed below in detail with reference to the accompanying drawings, in which:

FIGS. 3A, 3B, 3C, 3D, 3E, 3F and 3G show transverse aberration occurred in the lens arrangement shown in FIG. 1;

FIG. 4 shows a lens arrangement of the zoom lens system, according to the first embodiment of the present invention, at an intermediate focal length position when an object at infinity is in an in-focus state;

FIGS. 5A, 5B, 5C and 5D show aberrations occurred in the lens arrangement shown in FIG. 4;

FIGS. 6A, 6B, 6C, 6D, 6E, 6F and 6G show transverse aberration of the lens arrangement shown in FIG. 4;

FIGS. 8A, 8B, 8C and 8D show aberrations occurred in the lens arrangement shown in FIG. 7;

FIGS. 9A, 9B, 9C, 9D, 9E, 9F and 9G show transverse aberration of the lens arrangement shown in FIG. 7;

FIGS. 14A, 14B, 14C and 14D show aberrations occurred in the lens arrangement shown in FIG. 13;

FIGS. 15A, 15B, 15C, 15D, 15E, 15F and 15G show transverse aberration of the lens arrangement shown in FIG. 13;

FIGS. 20A, 20B, 20C and 20D show aberrations occurred in the lens arrangement shown in FIG. 19;

FIGS. 21A, 21B, 21C, 21D, 21E, 21F and 21G show transverse aberration occurred in the lens arrangement shown in FIG. 19;

FIGS. 24A, 24B, 24C, 24D, 24E, 24F and 24G show transverse aberration of the lens arrangement shown in FIG. 22;

FIGS. 26A, 26B, 26C and 26D show aberrations occurred in the lens arrangement shown in FIG. 25;

FIGS. 27A, 27B, 27C, 27D, 27E, 27F and 27G show transverse aberration of the lens arrangement shown in FIG. 25;

FIGS. 29A, 29B, 29C and 29D show aberrations occurred in the lens arrangement shown in FIG. 28;

FIGS. 30A, 30B, 30C, 30D, 30E, 30F and 30G show transverse aberration occurred in the lens arrangement shown in FIG. 28;

FIGS. 36A, 36B, 36C, 36D, 36E, 36F and 36G show transverse aberration of the lens arrangement shown in FIG. 34;

FIGS. 38A, 38B, 38C and 38D show aberrations occurred in the lens arrangement shown in FIG. 37;

FIGS. 39A, 39B, 39C, 39D, 39E, 39F and 39G show transverse aberration occurred in the lens arrangement shown in FIG. 37;

FIG. 40 shows a lens arrangement of the zoom lens system, according to the fifth embodiment of the present invention, at an intermediate focal length position when an object at infinity is in an in-focus state;

FIGS. 41A, 41B, 41C and 41D show aberrations occurred in the lens arrangement shown in FIG. 40;

FIGS. 42A, 42B, 42C, 42D, 42E, 42F and 42G show transverse aberration of the lens arrangement shown in FIG. 40;

FIGS. 44A, 44B, 44C and 44D show aberrations occurred in the lens arrangement shown in FIG. 43;

FIGS. 45A, 45B, 45C, 45D, 45E, 45F and 45G show transverse aberration of the lens arrangement shown in FIG. 43;

FIGS. 47A, 47B, 47C and 47D show aberrations occurred in the lens arrangement shown in FIG. 46;

FIGS. 48A, 48B, 48C, 48D, 48E, 48F and 48G show transverse aberration occurred in the lens arrangement shown in FIG. 46;

FIGS. 50A, 50B, 50C and 50D show aberrations occurred in the lens arrangement shown in FIG. 49;

FIGS. 51A, 51B, 51C, 51D, 51E, 51F and 51G show transverse aberration of the lens arrangement shown in FIG. 49;

FIGS. 53A, 53B, 53C and 53D show aberrations occurred in the lens arrangement shown in FIG. 52;

FIGS. 54A, 54B, 54C, 54D, 54E, 54F and 54G show transverse aberration of the lens arrangement shown in FIG. 52;

FIG. 55 shows a lens arrangement of the zoom lens system, according to a seventh embodiment of the present invention, at the long focal length extremity when an object at infinity is in an in-focus state;

FIGS. 57A, 57B, 57C, 57D, 57E, 57F and 57G show transverse aberration occurred in the lens arrangement shown in FIG. 55;

FIGS. 59A, 59B, 59C and 59D show aberrations occurred in the lens arrangement shown in FIG. 58;

FIGS. 60A, 60B, 60C, 60D, 60E, 60F and 60G show transverse aberration of the lens arrangement shown in FIG. 58;

FIG. 61 shows a lens arrangement of the zoom lens system, according to the seventh embodiment of the present invention, at the short focal length extremity when an object at infinity is in an in-focus state;

FIGS. 62A, 62B, 62C and 62D show aberrations occurred in the lens arrangement shown in FIG. 61;

FIGS. 63A, 63B, 63C, 63D, 63E, 63F and 63G show transverse aberration of the lens arrangement shown in FIG. 61.

DESCRIPTION OF THE PREFERRED EMBODIMENTS

Figure 64:
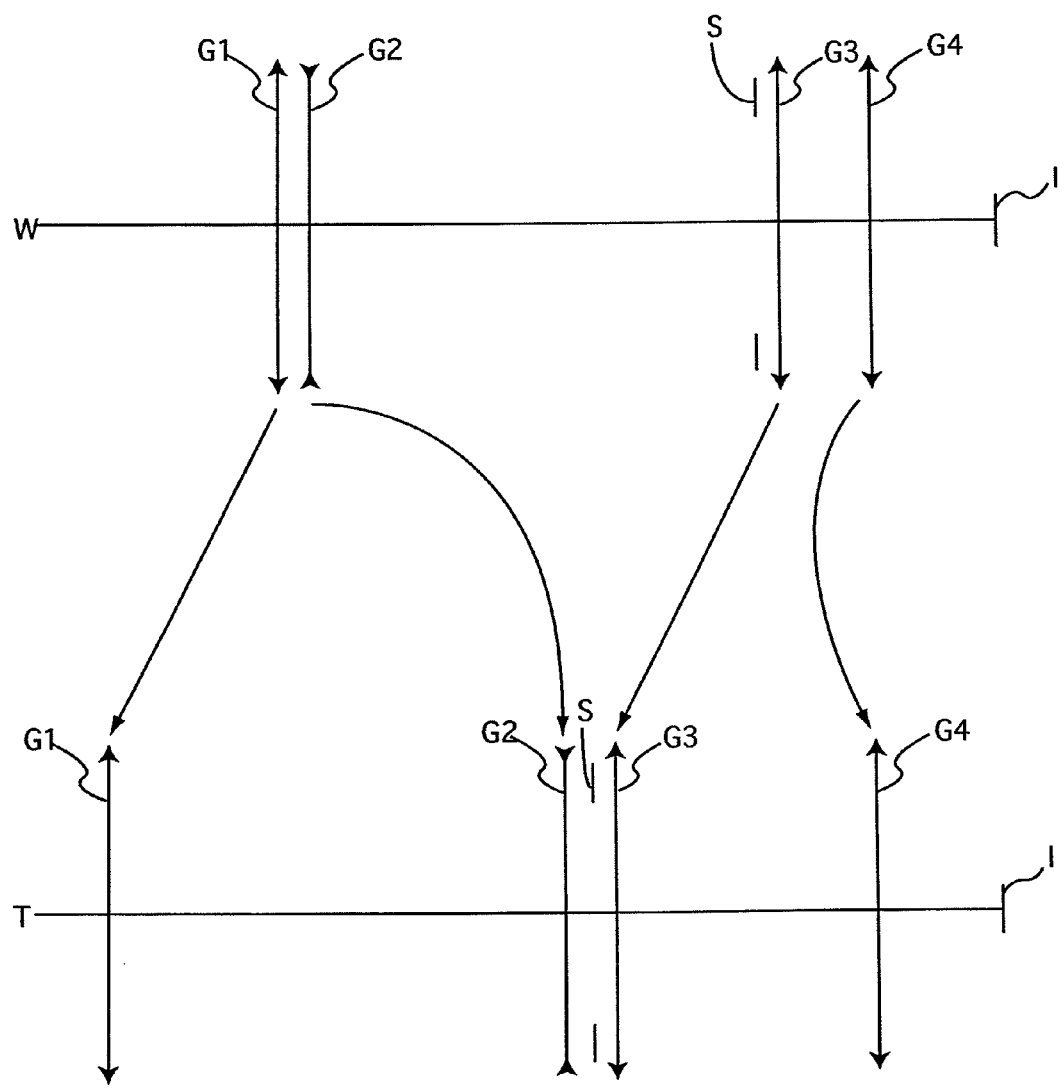
FIG. 64 shows lens-group moving paths of the zoom lens system according to the present invention.

The zoom lens system according to the present invention, as shown in the zoom path of FIG. 64, includes a positive first lens group G1, a negative second lens group G2, a positive third lens group G3, and a positive fourth lens group G4, in this order from the object.

A diaphragm S is provided in between the negative second lens group G2 and the positive third lens group G3, and moves integrally with the positive third lens group G3. 'I' designates the imaging plane.

Focusing is carried out by the fourth lens group G4.

Upon zooming from the short focal length extremity (W) to the long focal length extremity (T), the positive first lens group G1, the negative second lens group G2, the positive third lens group G3 and the positive fourth lens groups G4 move along the optical axis so that the distance between the positive first lens group G1 and the negative second lens group G2 increases, the distance between the negative second lens group G2 and the positive third lens group G3 decreases, and the distance between the positive third lens group G3 and the positive fourth lens group G4 increases.

More specifically, upon zooming from the short focal length extremity (W) to the long focal length extremity (T), the positive first lens group G1 moves monotonically toward the object, the second lens group G2 moves toward the image, the third lens group G3 moves monotonically toward the object, and the fourth lens group G4 first moves toward the object and thereafter moves toward the image.

The positive first lens group G1, as shown in the lens arrangements of the first through seventh embodiments, includes a cemented lens 10 having a negative lens element 11 and a positive lens element 12, and a positive lens element 13, in this order from the object. The negative lens element 11 is a negative meniscus lens element having the convex surface facing toward the object. The positive lens element 12 is a biconvex positive lens element. The positive lens element 13 is either a positive meniscus lens element having the convex surface facing toward the object or is a biconvex positive lens element.

The negative second lens group G2, as shown in each lens arrangement of the first through sixth embodiments, includes a negative lens element 20, a negative lens element 21, a positive lens element 22, a negative lens element 23 and a positive lens element 24, in this order from the object. The negative lens element 20 is a negative meniscus lens element having the convex surface facing toward the object, the negative lens element 21 is a negative meniscus lens element having the convex surface facing toward the object, the positive lens element 22 is a positive meniscus lens element having the convex surface facing toward the image, the negative lens element 23 is a negative meniscus lens element having the convex surface facing toward the image, and the positive lens element 24 is either a positive meniscus lens element having the convex surface facing toward the object or a biconvex positive lens element.

The positive lens element (positive meniscus lens element) 22 is provided with an aspherical surface either on the object-side surface or on both surfaces thereof.

Alternatively, the negative second lens group G2, as shown in lens arrangement of the seventh embodiment (FIGS. 55, 58 and 61), can include a biconcave negative lens element 20, a negative meniscus lens element 21 having the convex surface facing toward the image, and a cemented lens 27 having a biconvex positive lens element 25 and a negative meniscus lens element 26 having the convex surface facing toward the image, in this order from the object. In such a case, the biconcave negative lens element 20 can be formed as a resin lens element having aspherical surfaces on both surfaces thereof.

The positive third lens group G3, as shown in the lens arrangements of the second through seventh embodiments, includes a positive lens element 30, a positive lens element 31, a negative lens element 32 and a positive lens element 33, in this order from the object. The positive lens element 30 is a biconvex positive lens element, the positive lens element 31 is a biconvex positive lens element, the negative lens element 32 is a negative meniscus lens element having the convex surface facing toward the object or a biconcave negative lens element, and the positive lens element 33 is a biconvex positive lens element. The positive lens element (biconvex positive lens element) 30 is provided with an aspherical surface on the object-side surface thereof, or on both surfaces thereof.

Alternatively, the third lens group G3 can include, as shown in the lens arrangement of the first embodiment (FIGS. 1, 4 and 7), a positive lens element 30, a positive lens element 31 and a negative lens element 32, without the positive lens element 33.

The positive fourth lens group G4, as shown in the lens arrangement of the first embodiment (FIGS. 1, 4 and 7), includes a positive lens element 40, a positive lens element 41, a negative lens element 42 and a positive lens element 43, in this order from the object. The positive lens element 40 is a biconvex positive lens element, the positive lens element 41 is a biconvex positive lens element, the negative lens element 42 is a biconcave negative lens element, and the positive lens element 43 is a positive meniscus lens element having the convex surface facing toward the object. The positive lens element 40 is a resin lens element, and both surfaces thereof are aspherical surfaces.

Alternatively, the positive fourth lens group G4 can includes, as shown in the lens arrangements of the second and third embodiments (FIGS. 10, 13, 16, 19, 22 and 25), a positive lens element 40, a negative lens element 41 and a positive lens element 42, in this order from the object. In this case, the positive lens element 40 can include a biconvex positive lens element, the negative lens element 41 can include a negative meniscus lens element having the convex surface facing toward the object or a biconcave negative lens element, and the positive lens element 42 can include a positive meniscus lens element having the convex surface facing toward the object or a biconvex positive lens element. Furthermore, both surfaces of the biconvex positive lens element 40 are aspherical surfaces.

As a further alternative, the positive fourth lens group G4 can include, as shown in the lens arrangements of the fourth through seventh embodiments (FIGS. 28, 31, 34, 37, 40, 43, 46, 49, 52, 55, 58 and 61), a positive lens element 40, and a cemented lens 48, in this order from the object. The cemented lens 48 includes a positive lens element 45, a negative lens element 46 and a positive lens element 47, in this order from the object. In this case, the positive lens element 40 can include a biconvex positive lens element, the positive lens element 45 can include a biconvex positive lens element or a positive meniscus lens element having the convex surface facing toward the object, the negative lens element 46 can include a biconcave negative lens element or a negative meniscus lens element having the convex surface facing toward the object, and the positive lens element 47 can include a biconvex positive lens element or a positive meniscus lens element having the convex surface facing toward the object.

Furthermore, the biconvex positive lens element 40 can have an aspherical surface on both surfaces thereof, and the positive lens element 45 can have an aspherical surface on the object-side surface thereof.

Condition (1) specifies a desired focal length and a suitable range for the correcting of lateral chromatic aberration, mainly with respect to the short focal length extremity.

If f1/fw exceeds the lower limit of condition (1), lateral chromatic aberration largely occurs. Consequently, the correcting of lateral chromatic aberration at a rear lens group, particularly at the positive fourth lens group G4, becomes difficult.

If f1/fw exceeds the upper limit of condition (1), the refractive power of the positive first lens group G1 becomes weaker, so that the correcting of aberrations can be suitably done; however, the overall length of the zoom lens system increases. Moreover, the refractive power of the positive third lens group G3 or that of the positive fourth lens group G4 become relatively stronger, so that spherical aberration largely occurs. As a result, the correcting of lateral chromatic aberration is insufficient.

Condition (2) specifies a desired focal length and a suitable range for the correcting of lateral chromatic aberration, mainly with respect to the short focal length extremity.

If f4/fw exceeds the lower limit of condition (2), lateral chromatic aberration largely occurs, so that the optical quality of the zoom lens system deteriorates.

If f4/fw exceeds the upper limit of condition (2), the refractive power of the positive fourth lens group G4 becomes weaker. As a result, the refractive powers of the positive first lens group G1 or the positive third lens group G3 becomes relatively stronger, so that spherical aberration particularly deteriorates.

Condition (3) specifies a range for achieving both compactness of the zoom lens system and a higher zoom ratio.

If |f2|/ft exceeds the lower limit of condition (3), the refractive power of the negative second lens group G2 becomes stronger. Consequently, the traveling distance of the negative second lens group G2 upon zooming become shorter, which can contribute to miniaturizing the zoom lens system; however, aberrations, such as field curvature, astigmatic difference, and lateral chromatic aberration, largely occur, so that the correcting thereof becomes difficult.

If |f2|/ft exceeds the upper limit of condition (3), the refractive power of the negative second lens group G2 becomes weaker. Consequently, the correcting of aberrations can be done suitably; however, the overall length of the zoom lens system increases, which makes miniaturization of the zoom lens system difficult.

Condition (4) is provided for suitably achieving the correcting of spherical aberration at the long focal length extremity, and for specifying the overall length of the zoom lens system at the long focal length extremity in particular.

If $f1/(ft \cdot fw)^{1/2}$ exceeds the lower limit of condition (4), the refractive power of the positive first lens group G1 becomes stronger. Consequently, the correcting of spherical aberration and axial chromatic aberration becomes difficult especially at the long focal length extremity.

If $f1/(ft \cdot fw)^{1/2}$ exceeds the upper limit of condition (4), the correcting of aberrations can be suitably done; however, the overall length of the zoom lens system at the long focal length extremity becomes longer, which makes miniaturization of the zoom lens system difficult.

Conditions (5) and (6) specify a range for achieving a suitable balance of optical quality at the short focal length extremity and the long focal length extremity, respectively.

If f3/fw and f3/ft exceed the lower limits of conditions (5) and (6), the refractive power of the positive third lens group G3 becomes stronger. Consequently, spherical aberration over the entire zooming range from the short focal length extremity to the long focal length extremity deteriorates, so that the correcting thereof becomes difficult.

If f3/fw and f3/ft exceed the upper limit of conditions (5) and (6), the refractive power of the positive third lens group G3 becomes weaker. Consequently, the overall length of the zoom lens system increases, so that the compactness (miniaturization) of the zoom lens system is sacrificed.

Condition (7) specifies a range for achieving a suitable balance between compactness of a zoom lens system and aberrations (i.e., lateral chromatic aberration, spherical aberration and axial chromatic aberration at the long focal length extremity.

If f1/|f2| exceeds the upper limit of condition (7), the refractive power of the negative second lens group G2 becomes relatively stronger. As a result, compactness (miniaturization) of the zoom lens system is enhanced; however, the correcting of lateral chromatic aberration becomes difficult.

If f1/|f2| exceeds the lower limit of condition (7), the refractive power of the positive first lens group G1 becomes relatively stronger, so that the correcting of spherical aberration and axial chromatic aberration at the long focal length extremity becomes difficult.

Condition (8) specifies a range for achieving a suitable balance of compactness, field curvature, distortion and lateral chromatic aberration.

If |f2|/f4 exceeds the upper limit of condition (8), the refractive power of the negative second lens group G2 becomes relatively weaker, and the refractive power of the positive fourth lens group G4 becomes stronger. Consequently, compactness of the zoom lens system is sacrificed, and lateral chromatic aberration is overcorrected.

If |f2|/f4 exceeds the lower limit of condition (8), compactness of the zoom lens system can advantageously be achieved; however, the correcting of field curvature, distortion and the lateral chromatic aberration becomes difficult.

Condition (9) similarly specifies a range for achieving a suitable balance of compactness, spherical aberration and axial chromatic aberration, especially at the long focal length extremity.

If f1/f3 exceeds the upper limit of condition (9), the refractive power of the positive first lens group G1 becomes relatively weaker, and the refractive power of the positive third lens group G3 becomes stronger. Consequently, the traveling distance of the positive first lens group G1 along the optical axis becomes longer, so that compactness of the zoom lens system at the long focal length extremity is sacrificed.

If f1/f3 exceeds the lower limit of condition (9), the correcting of spherical aberration and axial chromatic aberration, especially at the long focal length extremity, becomes difficult.

Embodiments

Specific embodiments will be herein discussed. The following embodiments correspond to cases where the zoom lens system is used in, e.g., a photographic camera, an electronic still camera or video camera, and also to a bridge camera.

In the diagrams of chromatic aberration (axial chromatic aberration) represented by spherical aberration, the solid line and the four types of dotted lines respectively indicate spherical aberrations with respect to the d, g, C, F and e lines.

In the diagrams of lateral chromatic aberration, y designates the image height, the four types of dotted lines respectively indicate magnification with respect to the d, g, C, F and e lines; however, the d line as the base line coincides with the ordinate.

In the diagrams of astigmatism, Y designates the image height, S designates the sagittal image, and M designates the meridional image.

In the diagrams of distortion, Y designates the image height.

In the diagrams of transverse aberration, the solid line indicates spherical aberrations with respect to the d line.

In the tables, R designates the radius of curvature, d designates the lens-element thickness or a distance between lens elements (lens groups), Nd designates the refractive index of the d-line, and vd designates the Abbe number with respect to the d line, FNO. designates the F-number, f designates the focal length of the entire lens system, W designates the half angle-of-view (°), Y designates the image height, fB designates the back focal distance (the distance between the image-side surface of the most image-side cover glass to the imaging plane), L designates the length of the lens system (the distance from surface No. 1 to the imaging plane).

FNO., f, W, Y, fB, L and d (which changes according to zooming) are shown in the following order: "the short focal length extremity, an intermediate focal length, the long focal length extremity".

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 1:
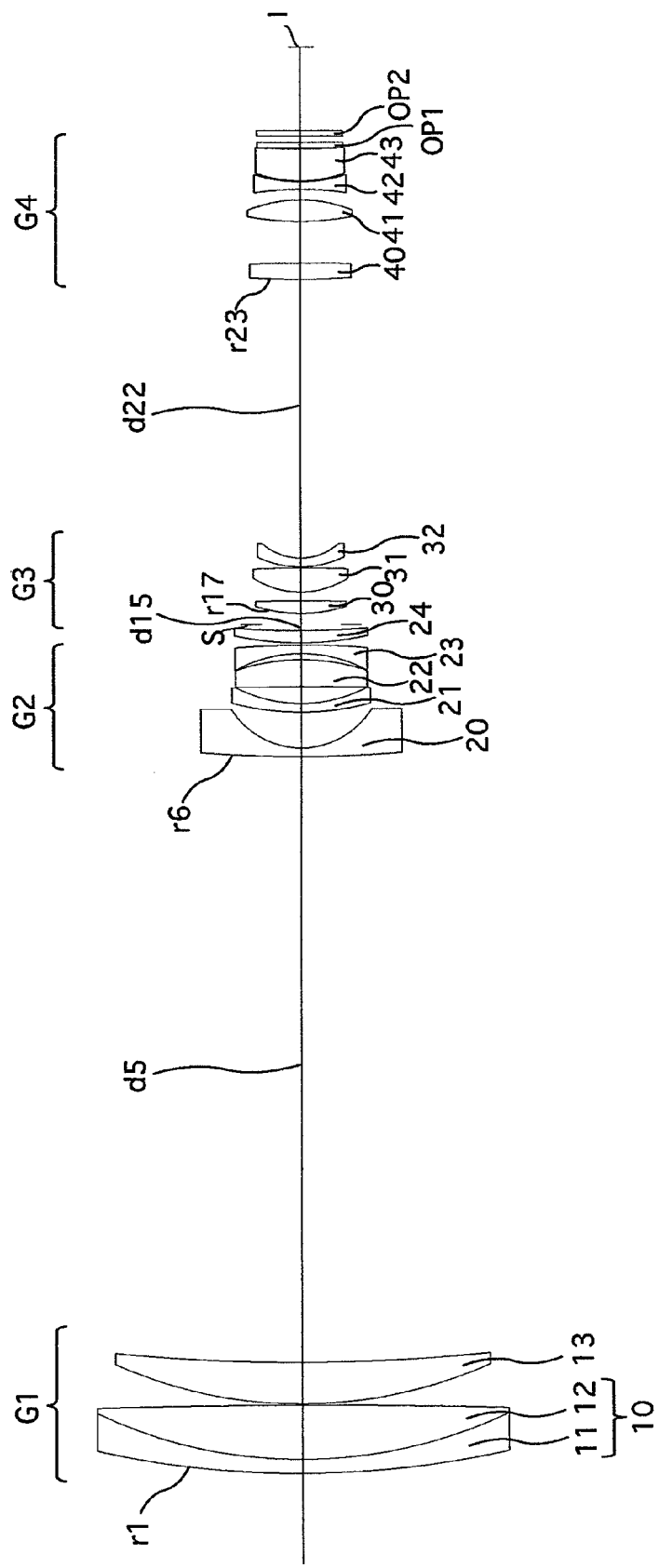
FIG. 1 shows a lens arrangement of a zoom lens system, according to a first embodiment of the present invention, at the long focal length extremity when an object at infinity is in an in-focus state.
Figure 2A:
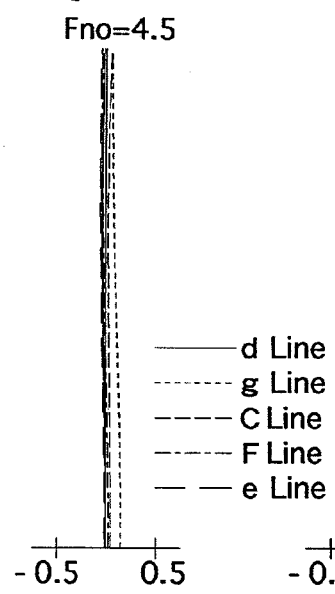
FIGS. 2A, 2B, 2C and 2D show aberrations occurred in the lens arrangement shown in FIG. 1.
Figure 2B:
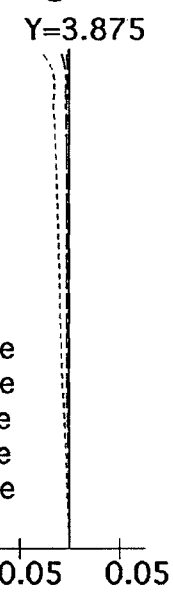
Figure 2C:
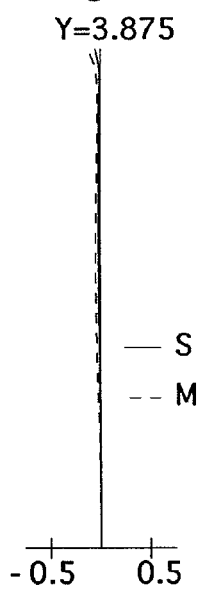
Figure 2D:
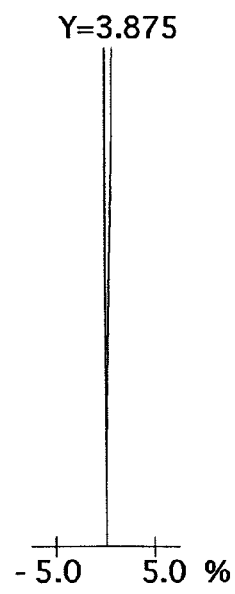

FIG. 1 shows the lens arrangement of a zoom lens system, according to the first embodiment of the present invention, at the long focal length extremity when an object at infinity is in an in-focus state. FIGS. 2A through 2D show aberrations occurred in the lens arrangement shown in FIG. 1. FIGS. 3A through 3G show transverse aberration occurred in the lens arrangement shown in FIG. 1.

FIG. 4 shows the lens arrangement of the zoom lens system, according to the first embodiment of the present invention, at an intermediate focal length position when an object at infinity is in an in-focus state.

FIGS. 5A through 5D show aberrations occurred in the lens arrangement shown in FIG. 4. FIGS. 6A through 6G show transverse aberration of the lens arrangement shown in FIG. 4.

Figure 7:
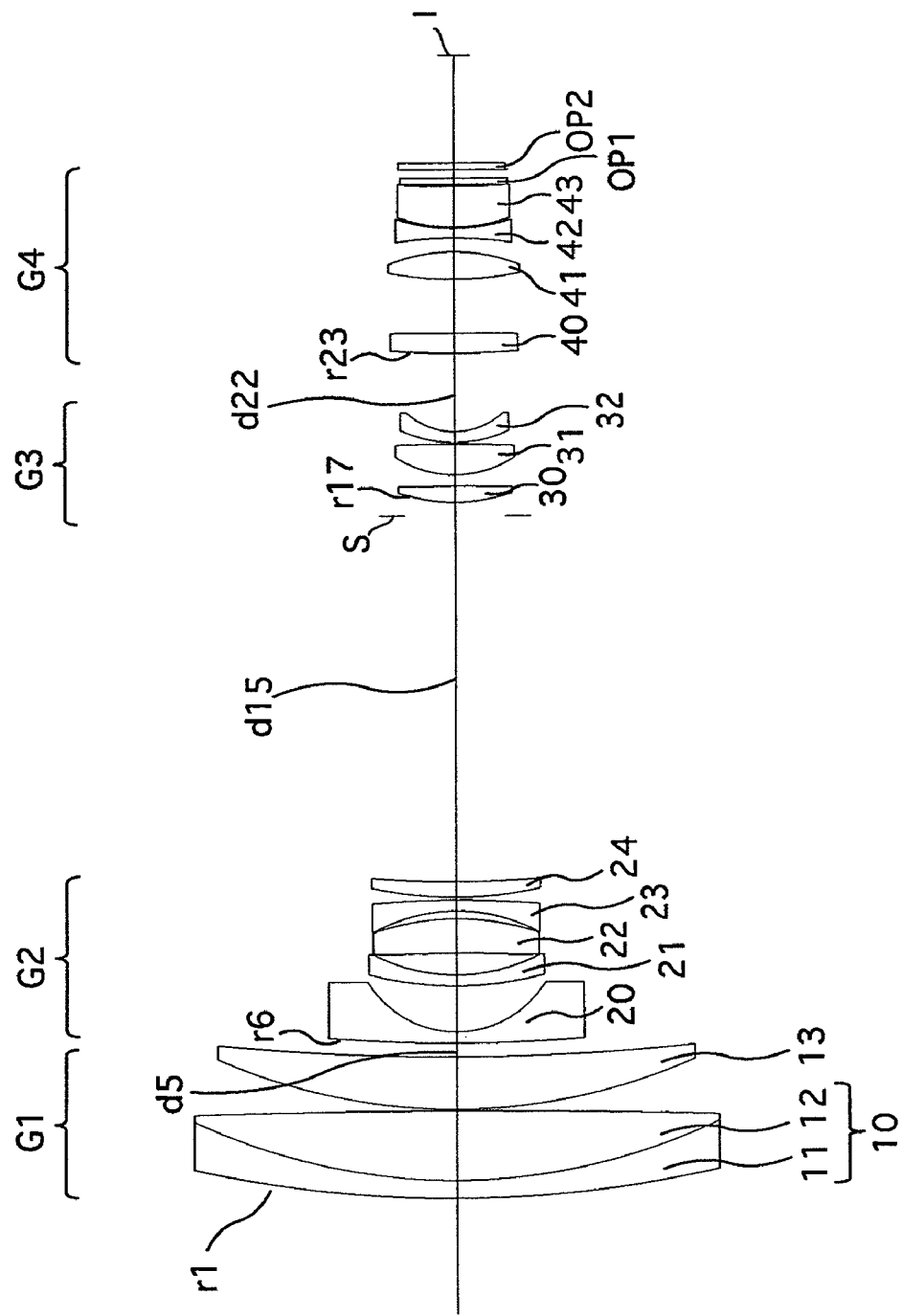
FIG. 7 shows a lens arrangement of the zoom lens system, according to the first embodiment of the present invention, at the short focal length extremity when an object at infinity is in an in-focus state.

FIG. 7 shows the lens arrangement of the zoom lens system, according to the first embodiment of the present invention, at the short focal length extremity when an object at infinity is in an in-focus state. FIGS. 8A through 8D show aberrations occurred in the lens arrangement shown in FIG. 7. FIGS. 9A through 9G show transverse aberration of the lens arrangement shown in FIG. 7.

Table 1 shows the lens data, Table 2 shows various zoom lens system data, and Table 3 shows the aspherical surface data of the first embodiment.

The zoom lens system of the first embodiment includes a positive first lens group G1, a negative second lens group G2, a positive third lens group G3 and a positive fourth lens group G4, in this order from the object.

The positive first lens group G1 (surface Nos. 1 through 5) includes a cemented lens 10 composed of a negative meniscus lens element 11 having the convex surface facing toward the object and a biconvex positive lens element 12, and a positive meniscus lens element 13 having the convex surface facing toward the object, in this order from the object.

The negative second lens group G2 (surface Nos. 6 through 15) includes a negative meniscus lens element 20 having the convex surface facing toward the object, a negative meniscus lens element 21 having the convex surface facing toward the object, a positive meniscus lens element 22 having the convex surface facing toward the image, a negative meniscus lens element 23 having the convex surface facing toward the image, and a positive meniscus lens element 24 having the convex surface facing toward the object, in this order from the object. The object-side surface of the positive meniscus lens element 22 is an aspherical surface. Furthermore, a diaphragm S (surface No. 16) is provided between the negative second lens group G2 and the positive third lens group G3, and integrally moves with the positive third lens group G3.

The positive third lens group G3 (surface Nos. 17 through 22) includes a biconvex positive lens element 30, a biconvex positive lens element 31 and a negative meniscus lens element 32 having the convex surface facing toward the object, in this order from the object. The object-side surface and the image-side surface of the biconvex positive lens element 30 are aspherical surfaces.

The positive fourth lens group G4 (surface Nos. 23 through 30) includes a biconvex positive lens element 40, a biconvex positive lens element 41, a biconcave negative lens element 42 and a positive meniscus lens element 43 having the convex surface facing toward the object, in this order from the object. The object-side surface and the image-side surface of the biconvex positive lens element 40 are aspherical surfaces. Two optical filters OP1 and OP2 (surface Nos. 31 through 34) are provided behind the fourth lens group G4 (lens element 43) (between the fourth lens group G4 and an imaging plane I).

In the first embodiment, the optical filters OP1 and OP2 are arranged to move together with the fourth lens group G4. On the other hand, even if the optical filters OP1 and OP2 are fixed, there is no adverse influence on the optical performance of the zoom lens system.

TABLE 1

| LENS SURFACE DATA | | | | |
|---|---|---|---|---|
| Surf.No. | R | d | Nd | vd |
| 1 | 88.234 | 1.300 | 1.80610 | 33.3 |
| 2 | 44.803 | 5.032 | 1.45650 | 90.3 |
| 3 | −591.548 | 0.100 | | |
| 4 | 43.128 | 3.802 | 1.61800 | 63.4 |
| 5 | 177.725 | Variable | | |
| 6 | 119.404 | 0.800 | 1.81600 | 46.6 |
| 7 | 7.823 | 3.323 | | |
| 8 | 25.530 | 0.800 | 1.80518 | 25.5 |
| 9 | 13.648 | 1.572 | | |
| 10* | −76.145 | 2.472 | 2.00178 | 19.3 |
| 11 | −19.124 | 0.570 | | |
| 12 | −12.801 | 0.800 | 1.80420 | 46.5 |

TABLE 1-continued

LENS SURFACE DATA

| Surf.No. | R | d | Nd | vd |
|---|---|---|---|---|
| 13 | −74.039 | 0.200 | | |
| 14 | 29.174 | 1.128 | 2.00178 | 19.3 |
| 15 | 75.522 | Variable | | |
| 16 (Diaphragm) | ∞ | 1.000 | | |
| 17* | 12.528 | 1.164 | 1.48749 | 70.4 |
| 18* | −1598.013 | 0.834 | | |
| 19 | 8.172 | 2.249 | 1.49700 | 81.6 |
| 20 | −105.068 | 0.100 | | |
| 21 | 9.522 | 0.800 | 1.84666 | 23.8 |
| 22 | 5.497 | Variable | | |
| 23* | 52.883 | 1.500 | 1.58313 | 59.5 |
| 24* | −184.799 | 3.928 | | |
| 25 | 26.570 | 2.000 | 1.56883 | 56.0 |
| 26 | −13.022 | 1.000 | | |
| 27 | −29.415 | 0.700 | 1.81600 | 46.6 |
| 28 | 13.754 | 0.100 | | |
| 29 | 12.477 | 3.000 | 1.45650 | 90.3 |
| 30 | 73.257 | 0.109 | | |
| 31 | ∞ | 0.500 | 1.51633 | 64.1 |
| 32 | ∞ | 0.600 | | |
| 33 | ∞ | 0.500 | 1.51633 | 64.1 |
| 34 | ∞ | — | | |

The symbol * designates the aspherical surface which is rotationally symmetrical with respect to the optical axis.

TABLE 2

ZOOM LENS SYSTEM DATA
Zoom Ratio 23.7

| Short Focal Length Extremity | |
|---|---|
| FNO. | 2.8 |
| f | 4.43 |
| W | 46.3 |
| Y | 3.875 |
| fB | 0.60 |
| L | 75.77 |
| d5 | 1.000 |
| d15 | 26.499 |
| d22 | 5.694 |
| Intermediate Focal Length | |
| FNO. | 4.5 |
| f | 30.03 |
| W | 7.5 |
| Y | 3.875 |
| fB | 10.31 |
| L | 102.21 |
| d5 | 37.564 |
| d15 | 3.872 |
| d22 | 8.475 |
| Long Focal Length Extremity | |
| FNO. | 4.5 |
| f | 105.00 |
| W | 2.2 |
| Y | 3.875 |
| fB | 0.60 |
| L | 124.96 |
| d5 | 55.829 |
| d15 | 0.589 |
| d22 | 25.964 |

TABLE 3

ASPHERICAL SURFACE DATA
The aspherical surface coefficients not indicated are zero (0.00)):

| Surf.No. | K | A4 | A6 | A8 |
|---|---|---|---|---|
| 10 | 0.000 | $0.9692 \times 10^{-4}$ | $-0.9781 \times 10^{-7}$ | $0.2289 \times 10^{-7}$ |
| 17 | 0.000 | $-0.1658 \times 10^{-3}$ | $-0.2822 \times 10^{-5}$ | $-0.6304 \times 10^{-7}$ |
| 18 | 0.000 | $0.1483 \times 10^{-4}$ | $-0.2307 \times 10^{-5}$ | $-0.4041 \times 10^{-7}$ |
| 23 | 0.000 | $0.1300 \times 10^{-4}$ | $-0.5280 \times 10^{-5}$ | $-0.5568 \times 10^{-7}$ |
| 24 | 0.000 | $0.1602 \times 10^{-3}$ | $-0.4940 \times 10^{-5}$ | $-0.3047 \times 10^{-7}$ |

Embodiment 2

Figure 10:
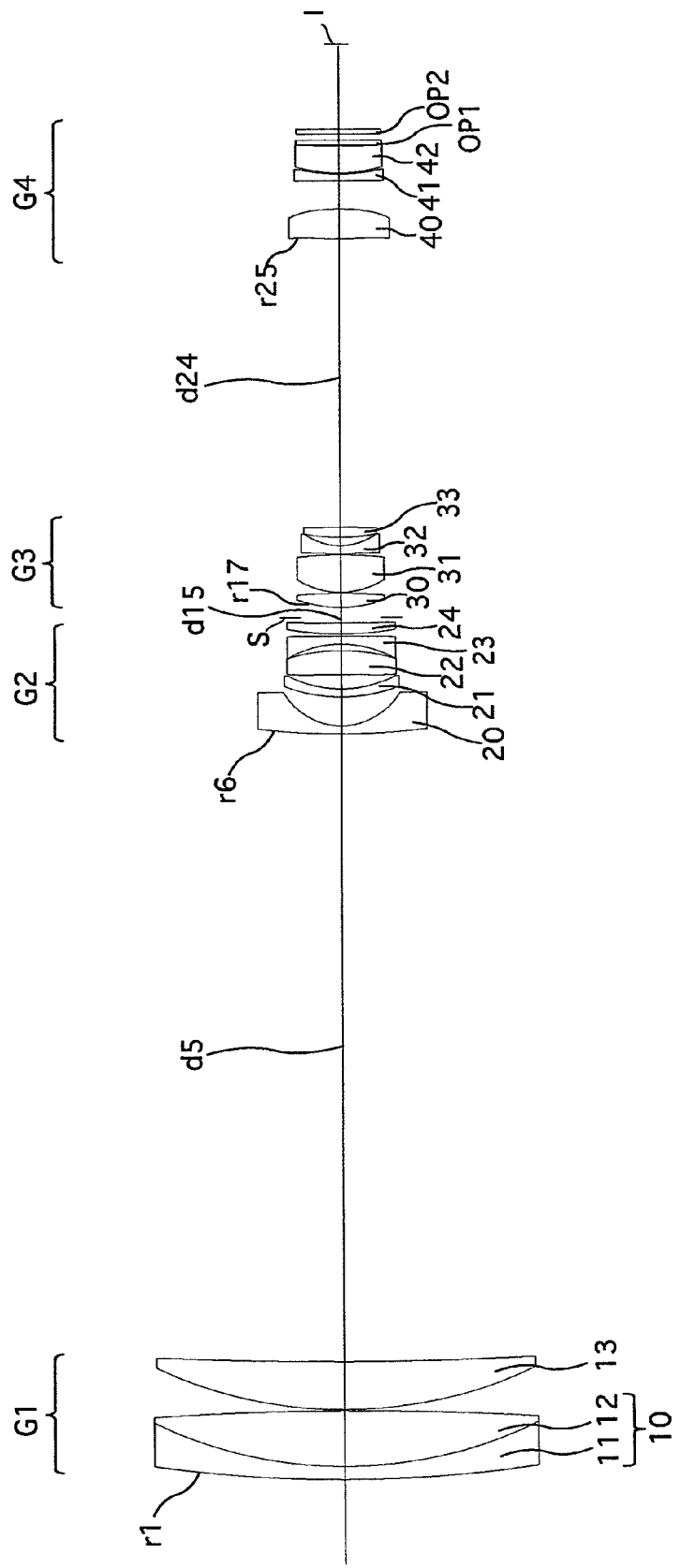
FIG. 10 shows a lens arrangement of the zoom lens system, according to a second embodiment of the present invention, at the long focal length extremity when an object at infinity is in an in-focus state.
Figure 11:
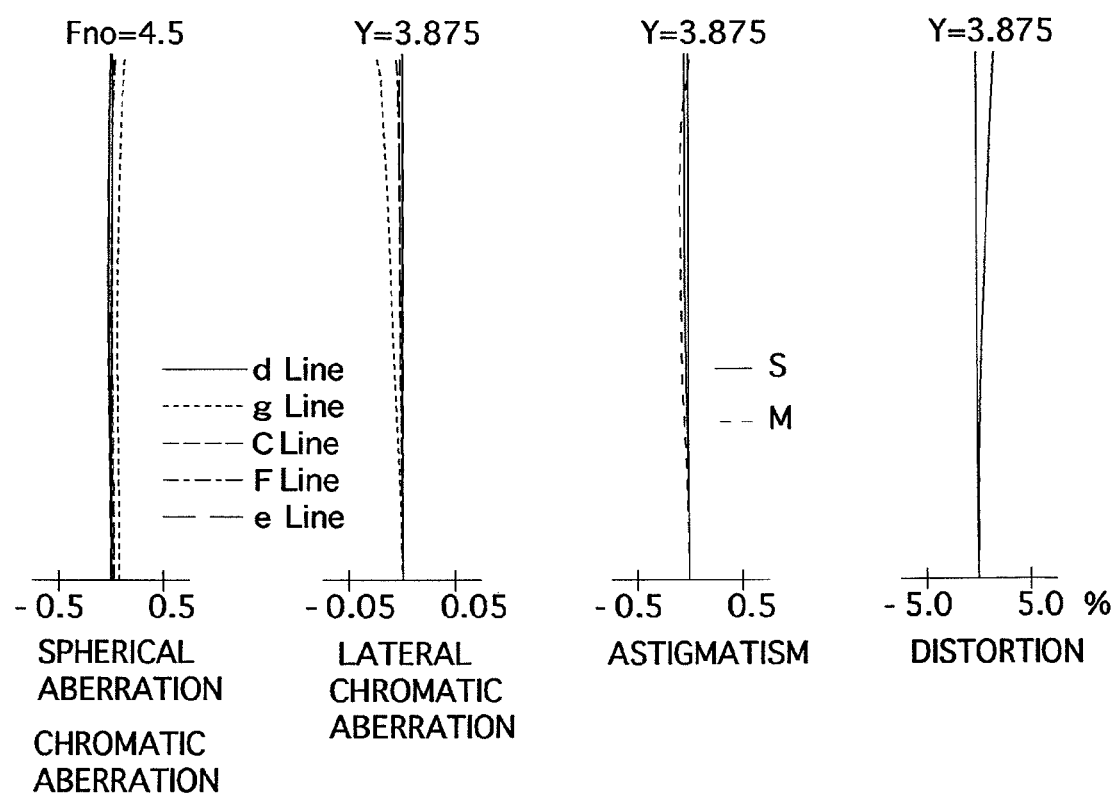
FIGS. 11A, 11B, 11C and 11D show aberrations occurred in the lens arrangement shown in FIG. 10.
Figure 12:
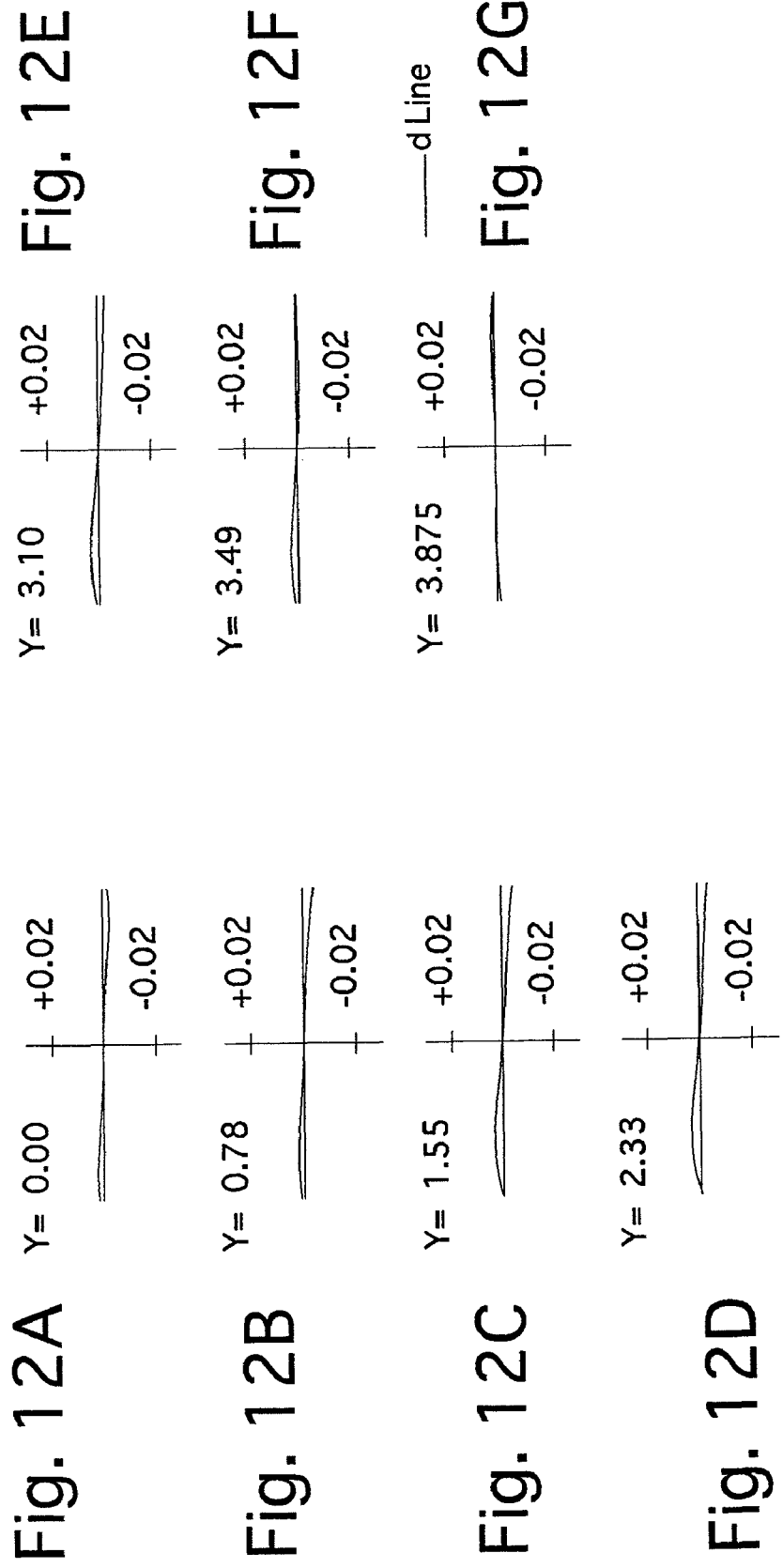
FIGS. 12A, 12B, 12C, 12D, 12E, 12F and 12G show transverse aberration occurred in the lens arrangement shown in FIG. 10.

FIG. 10 shows the lens arrangement of the zoom lens system, according to the second embodiment of the present invention, at the long focal length extremity when an object at infinity is in an in-focus state. FIGS. 11A through 11D show aberrations occurred in the lens arrangement shown in FIG. 10. FIGS. 12A through 12G show transverse aberration occurred in the lens arrangement shown in FIG. 10.

Figure 13:
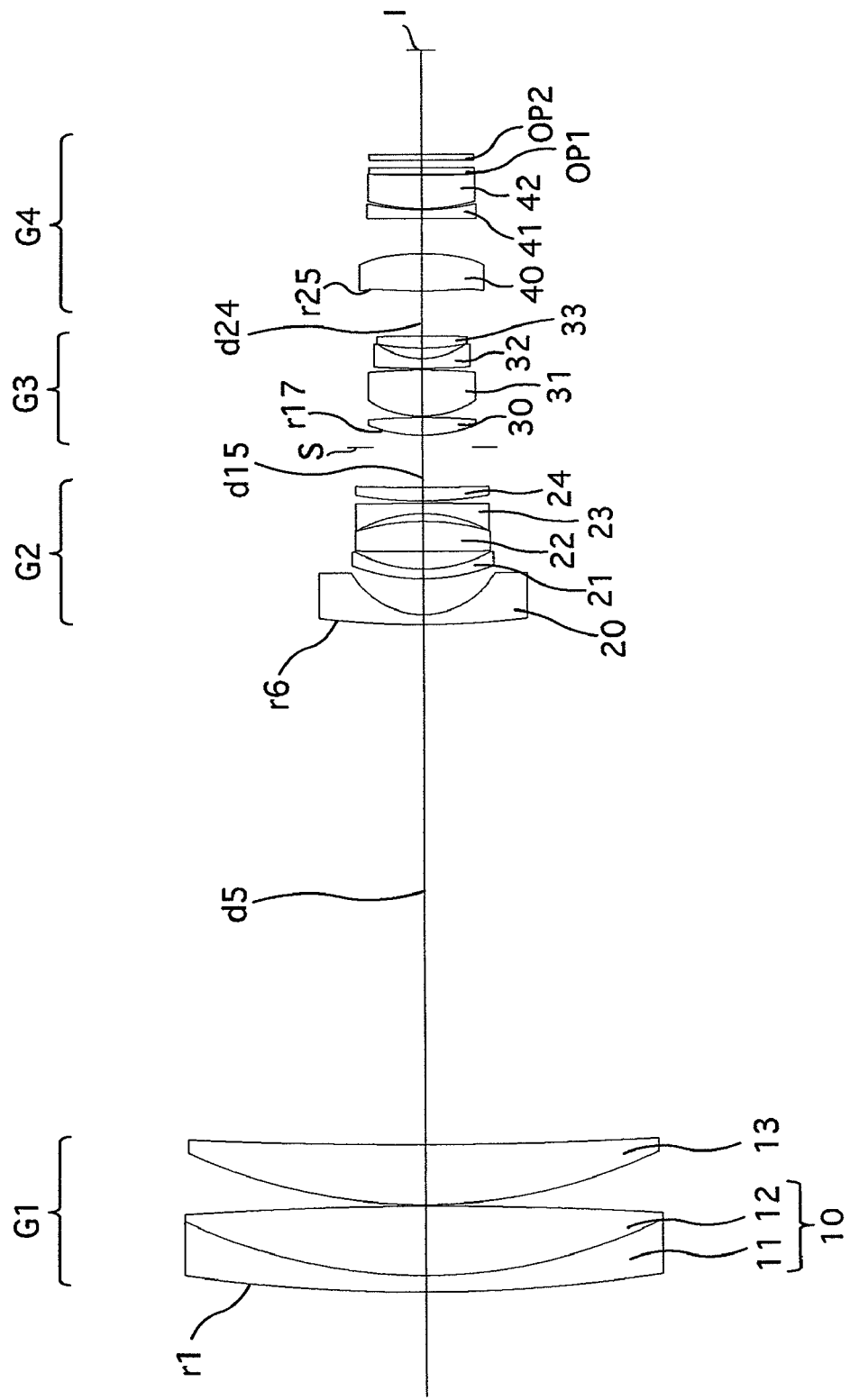
FIG. 13 shows a lens arrangement of the zoom lens system, according to the second embodiment of the present invention, at an intermediate focal length position when an object at infinity is in an in-focus state.

FIG. 13 shows the lens arrangement of the zoom lens system, according to the second embodiment of the present invention, at an intermediate focal length position when an object at infinity is in an in-focus state. FIGS. 14A through 14D show aberrations occurred in the lens arrangement shown in FIG. 13. FIGS. 15A through 15G show transverse aberration of the lens arrangement shown in FIG. 13.

Figure 16:
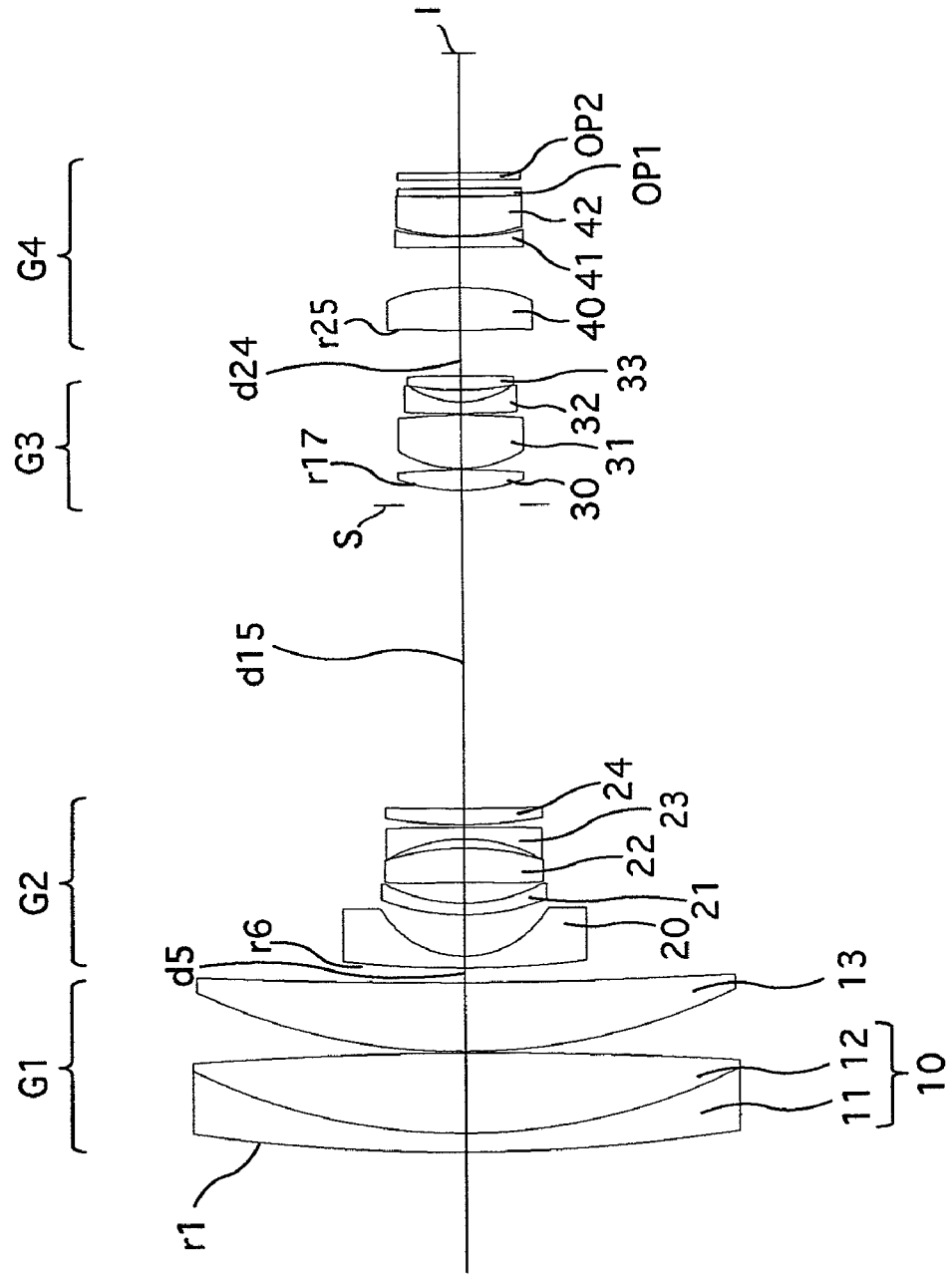
FIG. 16 shows a lens arrangement of the zoom lens system, according to the second embodiment of the present invention, at the short focal length extremity when an object at infinity is in an in-focus state.
Figure 17:
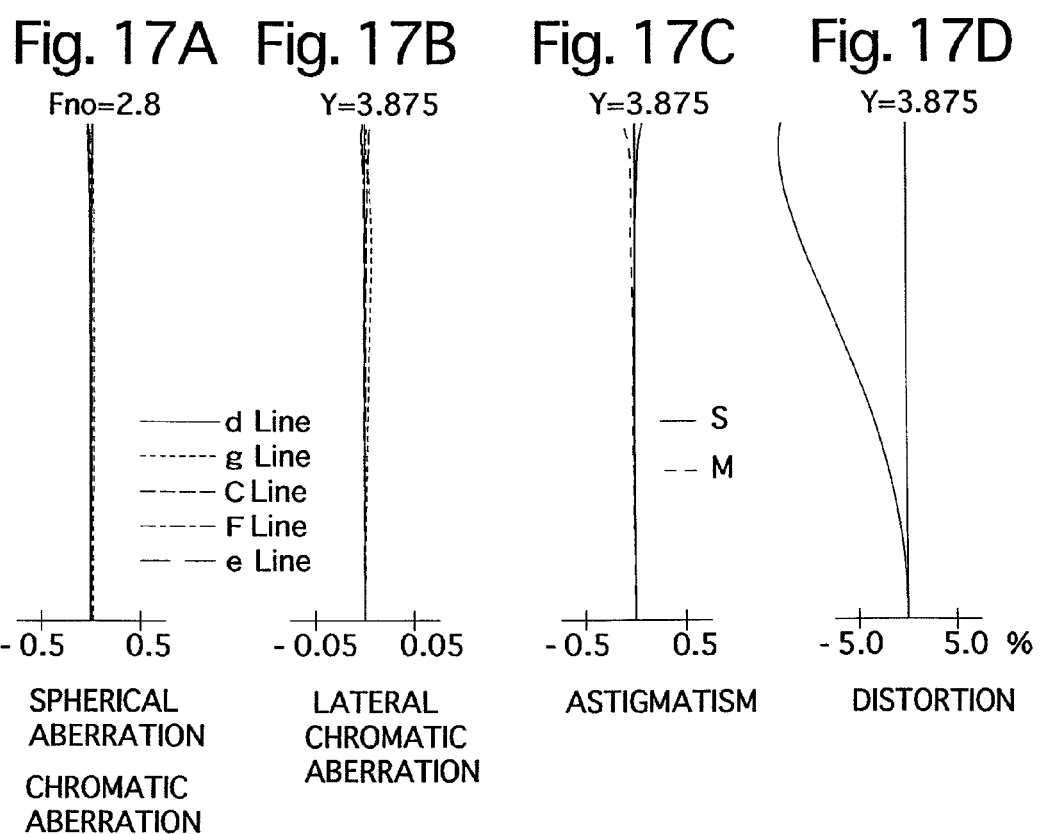
FIGS. 17A, 17B, 17C and 17D show aberrations occurred in the lens arrangement shown in FIG. 16.
Figure 18:
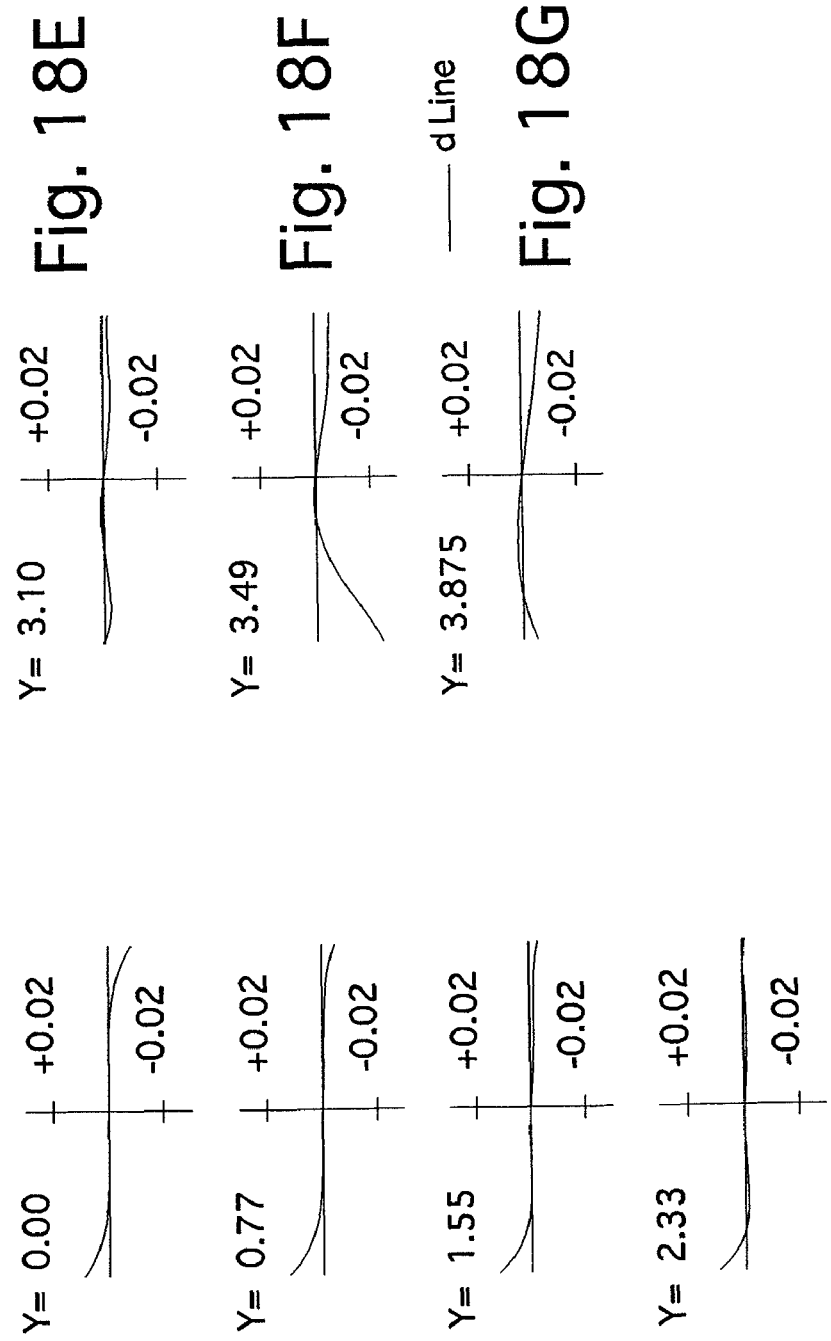
FIGS. 18A, 18B, 18C, 18D, 18E, 18F and 18G show transverse aberration of the lens arrangement shown in FIG. 16.

FIG. 16 shows the lens arrangement of the zoom lens system, according to the second embodiment of the present invention, at the short focal length extremity when an object at infinity is in an in-focus state. FIGS. 17A through 17D show aberrations occurred in the lens arrangement shown in FIG. 16.

FIGS. 18A through 18G show transverse aberration of the lens arrangement shown in FIG. 16.

Table 4 shows the lens data, Table 5 shows various zoom lens system data, and Table 6 shows the aspherical surface data of the second embodiment.

In the lens arrangements of the second embodiment, the positive third lens group G3 and the positive fourth lens group G4 differ from that of the first embodiment, and a detailed explanation thereof will be given hereinafter. The remaining lens arrangement is the same as that of the first embodiment, and hence, a detailed explanation thereof has been omitted herein.

The positive third lens group G3 (surface Nos. 17 through 24) includes a biconvex positive lens element 30, a biconvex positive lens element 31, a negative meniscus lens element 32 having the convex surface facing toward the object, and a biconvex positive lens element 33, in this order from the object. The object-side surface of the biconvex positive lens element 30 is an aspherical surface.

The positive fourth lens group G4 (surface Nos. 25 through 30) includes a biconvex positive lens element 40, a negative meniscus lens element 41 having the convex surface facing toward the object, and a positive meniscus lens element 42 having the convex surface facing toward the object, in this order from the object. The object-side surface and the image-side surface of the biconvex positive lens element 40 are aspherical surfaces.

TABLE 4

LENS SURFACE DATA

| Surf.No. | R | d | Nd | νd |
|---|---|---|---|---|
| 1 | 133.676 | 1.300 | 1.80450 | 39.6 |
| 2 | 43.661 | 5.529 | 1.45650 | 90.3 |
| 3 | −282.484 | 0.100 | | |
| 4 | 44.124 | 4.764 | 1.61800 | 63.4 |
| 5 | 409.152 | Variable | | |
| 6 | 70.207 | 0.800 | 1.80420 | 46.5 |
| 7 | 6.815 | 2.860 | | |
| 8 | 15.819 | 0.800 | 1.80518 | 25.5 |
| 9 | 11.871 | 1.419 | | |
| 10* | −103.663 | 2.388 | 2.00178 | 19.3 |
| 11 | −18.611 | 0.634 | | |
| 12 | −11.013 | 0.800 | 1.80420 | 46.5 |
| 13 | −314.764 | 0.200 | | |
| 14 | 31.741 | 1.099 | 1.92286 | 20.9 |
| 15 | 188.291 | Variable | | |
| 16 (Diaphragm) | ∞ | 1.000 | | |
| 17* | 11.842 | 1.420 | 1.49700 | 81.6 |
| 18 | −51.076 | 0.100 | | |
| 19 | 8.121 | 3.709 | 1.49700 | 81.6 |
| 20 | −45.421 | 0.127 | | |
| 21 | 62.278 | 0.800 | 1.80610 | 33.3 |
| 22 | 6.308 | 0.823 | | |
| 23 | 19.664 | 1.000 | 1.56384 | 60.8 |
| 24 | −109.359 | Variable | | |
| 25* | 35.170 | 3.000 | 1.58313 | 59.5 |
| 26* | −20.210 | 2.814 | | |
| 27 | 107679.053 | 0.700 | 1.80420 | 46.5 |
| 28 | 19.294 | 0.100 | | |
| 29 | 15.634 | 2.690 | 1.49700 | 81.6 |
| 30 | 85.714 | 0.107 | | |
| 31 | ∞ | 0.500 | 1.51633 | 64.1 |
| 32 | ∞ | 0.600 | | |
| 33 | ∞ | 0.500 | 1.51633 | 64.1 |
| 34 | ∞ | — | | |

The symbol * designates the aspherical surface which is rotationally symmetrical with respect to the optical axis.

TABLE 5

ZOOM LENS SYSTEM DATA
Zoom Ratio 29.5

Short Focal Length Extremity

| FNO. | 2.8 |
|---|---|
| f | 4.43 |
| W | 45.8 |
| Y | 3.875 |
| fB | 2.10 |
| L | 70.01 |
| d5 | 1.000 |
| d15 | 21.072 |
| d24 | 3.158 |

Intermediate Focal Length

| FNO. | 4.3 |
|---|---|
| f | 30.02 |
| W | 7.4 |
| Y | 3.875 |
| fB | 12.90 |
| L | 103.76 |
| d5 | 41.376 |
| d15 | 3.183 |
| d22 | 3.611 |

Long Focal Length Extremity

| FNO. | 4.5 |
|---|---|
| f | 130.99 |
| W | 1.7 |
| Y | 3.875 |
| fB | 1.00 |
| L | 135.00 |

TABLE 5-continued

ZOOM LENS SYSTEM DATA
Zoom Ratio 29.5

| d5 | 61.982 |
|---|---|
| d15 | 0.542 |
| d22 | 28.793 |

TABLE 6

ASPHERICAL SURFACE DATA
The aspherical surface coefficients not indicated are zero (0.00):

| Surf. No. | K | A4 | A6 | A8 | A10 |
|---|---|---|---|---|---|
| 10 | 0.000 | $0.1582 \times 10^{-3}$ | $-0.1665 \times 10^{-6}$ | $0.6544 \times 10^{-7}$ | |
| 17 | 0.000 | $-0.1808 \times 10^{-3}$ | $0.2988 \times 10^{-6}$ | $-0.2706 \times 10^{-7}$ | |
| 25 | 0.000 | $-0.2019 \times 10^{-3}$ | $-0.1482 \times 10^{-4}$ | $0.2996 \times 10^{-6}$ | $-0.1153 \times 10^{-7}$ |
| 26 | 0.000 | $-0.1748 \times 10^{-3}$ | $-0.1213 \times 10^{-4}$ | $0.1238 \times 10^{-6}$ | $-0.3702 \times 10^{-8}$ |

Embodiment 3

Figure 19:
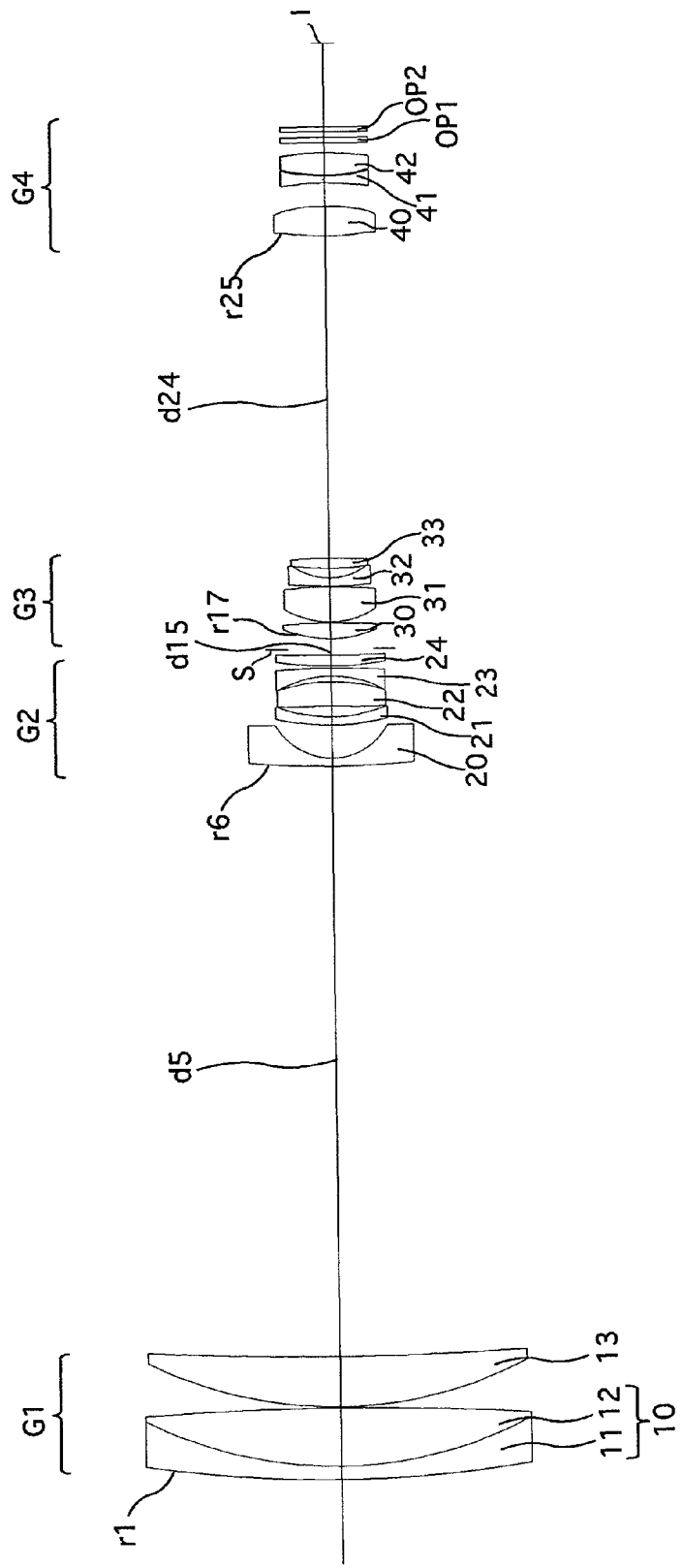
FIG. 19 shows a lens arrangement of the zoom lens system, according to a third embodiment of the present invention, at the long focal length extremity when an object at infinity is in an in-focus state.

FIG. 19 shows the lens arrangement of the zoom lens system, according to the third embodiment of the present invention, at the long focal length extremity when an object at infinity is in an in-focus state. FIGS. 20A through 20D show aberrations occurred in the lens arrangement shown in FIG. 19. FIGS. 21A through 21G show transverse aberration occurred in the lens arrangement shown in FIG. 19.

Figure 22:
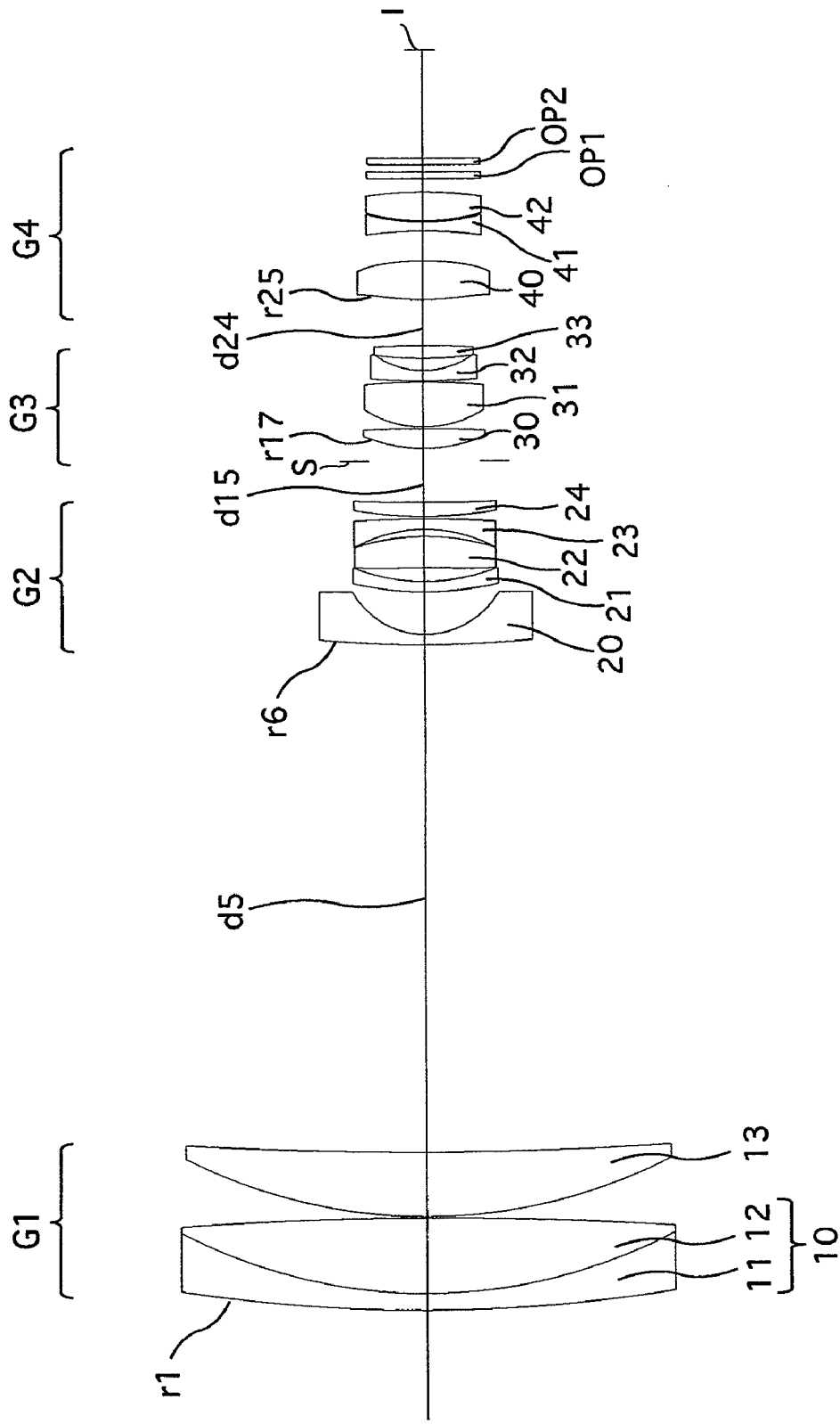
FIG. 22 shows a lens arrangement of the zoom lens system, according to the third embodiment of the present invention, at an intermediate focal length position when an object at infinity is in an in-focus state.
Figure 23A:
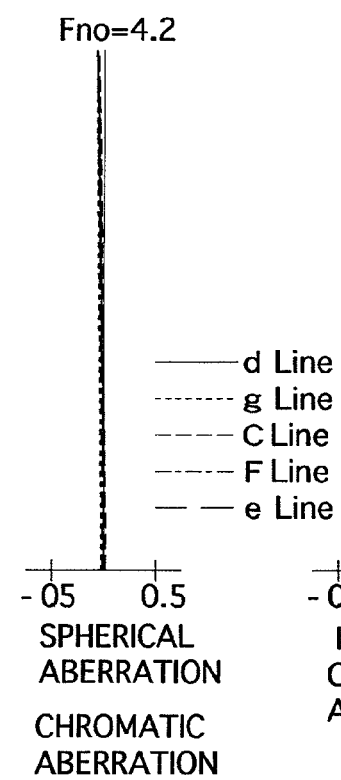
FIGS. 23A, 23B, 23C and 23D show aberrations occurred in the lens arrangement shown in FIG. 22.
Figure 23B:
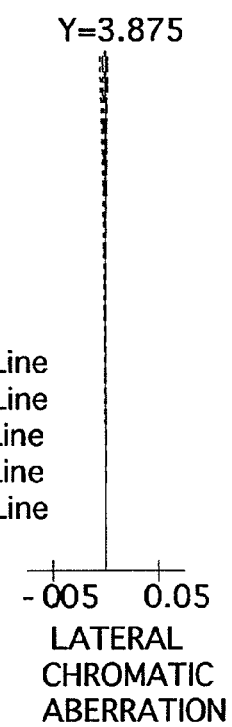
Figure 23C:
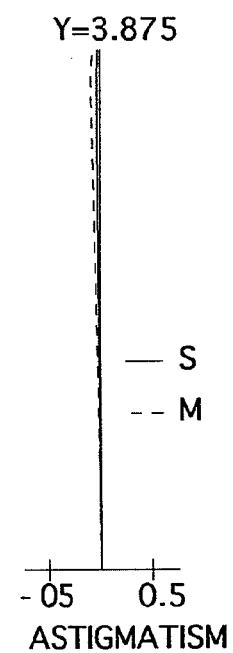
Figure 23D:
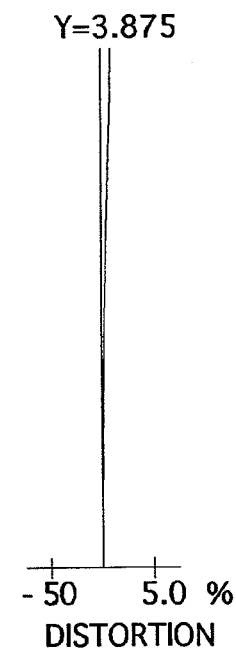

FIG. 22 shows the lens arrangement of the zoom lens system, according to the third embodiment of the present invention, at an intermediate focal length position when an object at infinity is in an in-focus state. FIGS. 23A through 23D show aberrations occurred in the lens arrangement shown in FIG. 22. FIGS. 24A through 24G show transverse aberration of the lens arrangement shown in FIG. 22.

Figure 25:
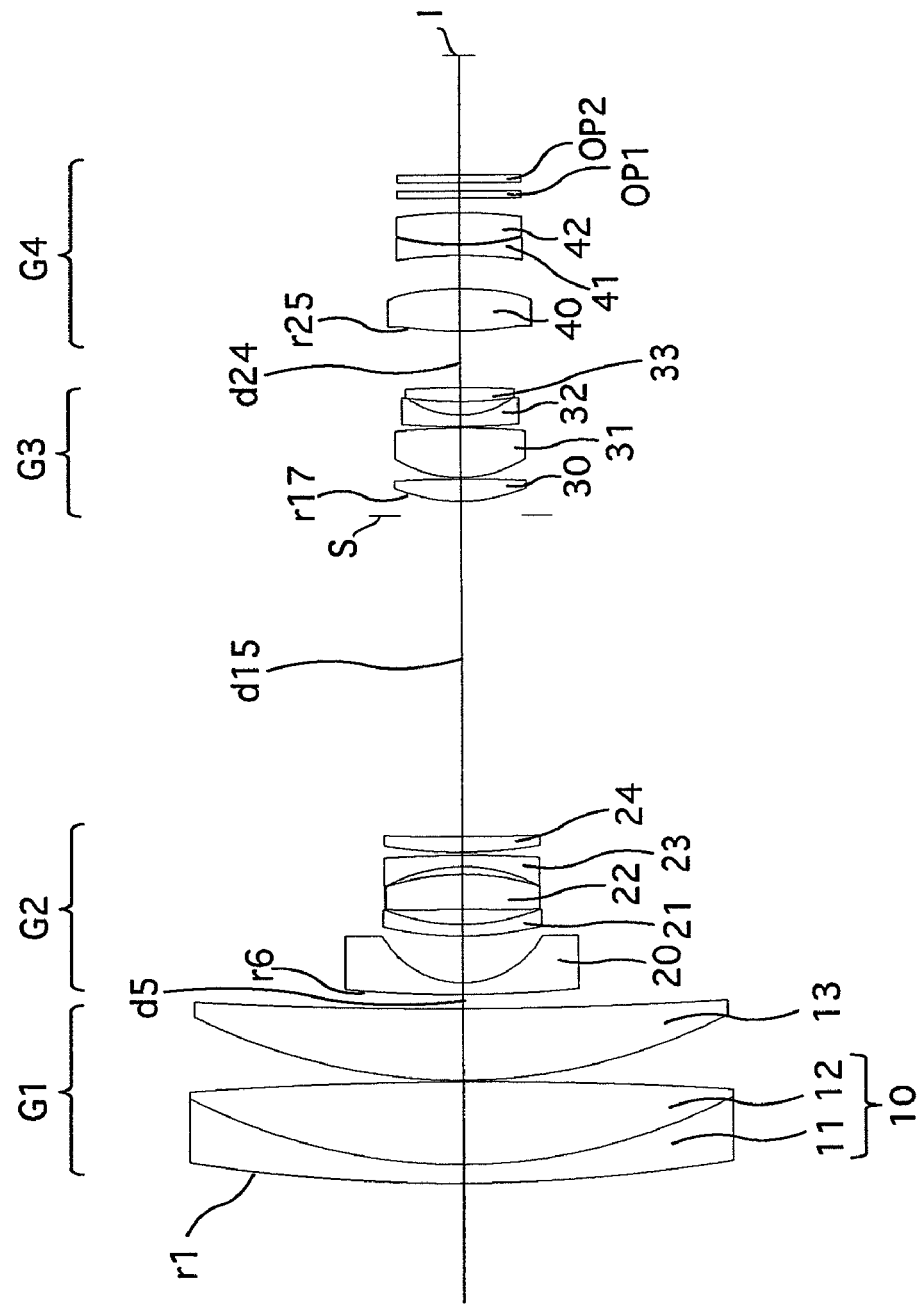
FIG. 25 shows a lens arrangement of the zoom lens system, according to the third embodiment of the present invention, at the short focal length extremity when an object at infinity is in an in-focus state.

FIG. 25 shows the lens arrangement of the zoom lens system, according to the third embodiment of the present invention, at the short focal length extremity when an object at infinity is in an in-focus state. FIGS. 26A through 26D show aberrations occurred in the lens arrangement shown in FIG. 25. FIGS. 27A through 27G show transverse aberration of the lens arrangement shown in FIG. 25.

Table 7 shows the lens data, Table 8 shows various zoom lens system data, and Table 9 shows the aspherical surface data of the third embodiment.

In the lens arrangements of the third embodiment, the positive third lens group G3 and the positive fourth lens group G4 differ from the first embodiment, and a detailed explanation thereof will be given hereinafter. The remaining lens arrangement is the same as that of the first embodiment, and hence, a detailed explanation thereof has been omitted herein.

The positive third lens group G3 (surface Nos. 17 through 24) includes a biconvex positive lens element 30, a biconvex positive lens element 31, a negative meniscus lens element 32 having the convex surface facing toward the object, and a biconvex positive lens element 33, in this order from the object. The object-side surface of the biconvex positive lens element 30 is an aspherical surface.

The positive fourth lens group G4 (surface Nos. 25 through 30) includes a biconvex positive lens element 40, a biconcave negative lens element 41, and a positive convex lens element 42. The object-side surface and the image-side surface of the biconvex positive lens element 40 are aspherical surfaces.

TABLE 7

LENS SURFACE DATA

| Surf.No. | R | d | Nd | vd |
|---|---|---|---|---|
| 1 | 124.001 | 1.300 | 1.80450 | 39.6 |
| 2 | 41.447 | 5.785 | 1.45650 | 90.3 |
| 3 | −272.702 | 0.100 | | |
| 4 | 41.521 | 4.948 | 1.61800 | 63.4 |
| 5 | 332.161 | Variable | | |
| 6 | 87.820 | 0.800 | 1.80420 | 46.5 |
| 7 | 6.561 | 3.295 | | |
| 8 | 25.123 | 0.800 | 1.80518 | 25.5 |
| 9 | 15.299 | 1.053 | | |
| 10* | −89.654 | 2.415 | 2.00178 | 19.3 |
| 11 | −17.971 | 0.549 | | |
| 12 | −11.447 | 0.800 | 1.80420 | 46.5 |
| 13 | −88.053 | 0.200 | | |
| 14 | 32.705 | 1.068 | 1.92286 | 20.9 |
| 15 | 140.940 | Variable | | |
| 16 (Diaphragm) | ∞ | 1.000 | | |
| 17* | 11.267 | 1.557 | 1.49700 | 81.6 |
| 18 | −80.643 | 0.100 | | |
| 19 | 8.555 | 3.485 | 1.49700 | 81.6 |
| 20 | −48.604 | 0.100 | | |
| 21 | 51.501 | 0.800 | 1.80610 | 33.3 |
| 22 | 6.599 | 0.939 | | |
| 23 | 27.194 | 1.000 | 1.56883 | 56.0 |
| 24 | −58.672 | Variable | | |
| 25* | 20.654 | 3.000 | 1.58313 | 59.5 |
| 26* | −22.931 | 2.330 | | |
| 27 | −31.630 | 0.700 | 1.80420 | 46.5 |
| 28 | 17.968 | 0.100 | | |
| 29 | 17.098 | 2.232 | 1.48749 | 70.4 |
| 30 | −29.566 | 1.023 | | |
| 31 | ∞ | 0.500 | 1.51633 | 64.1 |
| 32 | ∞ | 0.600 | | |
| 33 | ∞ | 0.500 | 1.51633 | 64.1 |
| 34 | ∞ | — | | |

The symbol * designates the aspherical surface which is rotationally symmetrical with respect to the optical axis.

TABLE 8

ZOOM LENS SYSTEM DATA
Zoom Ratio 29.5

| Short Focal Length Extremity | |
|---|---|
| FNO. | 2.8 |
| f | 4.43 |
| W | 45.8 |
| Y | 3.875 |
| fB | 2.10 |
| L | 72.64 |
| d5 | 1.000 |
| d15 | 22.487 |
| d24 | 3.975 |
| Intermediate Focal Length | |
| FNO. | 4.2 |
| f | 29.90 |
| W | 7.5 |
| Y | 3.875 |
| fB | 13.75 |
| L | 102.53 |
| d5 | 38.941 |
| d15 | 3.199 |
| d24 | 3.556 |
| Long Focal Length Extremity | |
| FNO. | 4.5 |
| f | 130.99 |

TABLE 8-continued

ZOOM LENS SYSTEM DATA
Zoom Ratio 29.5

| W | 1.7 |
|---|---|
| Y | 3.875 |
| fB | 1.0 |
| L | 135.00 |
| d5 | 58.163 |
| d15 | 0.656 |
| d24 | 32.102 |

TABLE 9

ASPHERICAL SURFACE DATA
The aspherical surface coefficients not indicated are zero (0.00):

| Surf. No. | K | A4 | A6 | A8 | A10 |
|---|---|---|---|---|---|
| 10 | 0.000 | 0.1623×10$^{-3}$ | −0.2307×10$^{-6}$ | 0.7594×10$^{-7}$ | |
| 17 | 0.000 | −0.1788×10$^{-3}$ | −0.8393×10$^{-7}$ | −0.1665×10$^{-7}$ | |
| 25 | 0.000 | −0.1700×10$^{-3}$ | −0.5534×10$^{-5}$ | −0.1341×10$^{-6}$ | −0.5669×10$^{-9}$ |
| 26 | 0.000 | −0.1551×10$^{-3}$ | −0.6259×10$^{-5}$ | −0.1138×10$^{-6}$ | 0.1389×10$^{-8}$ |

Embodiment 4

Figure 28:
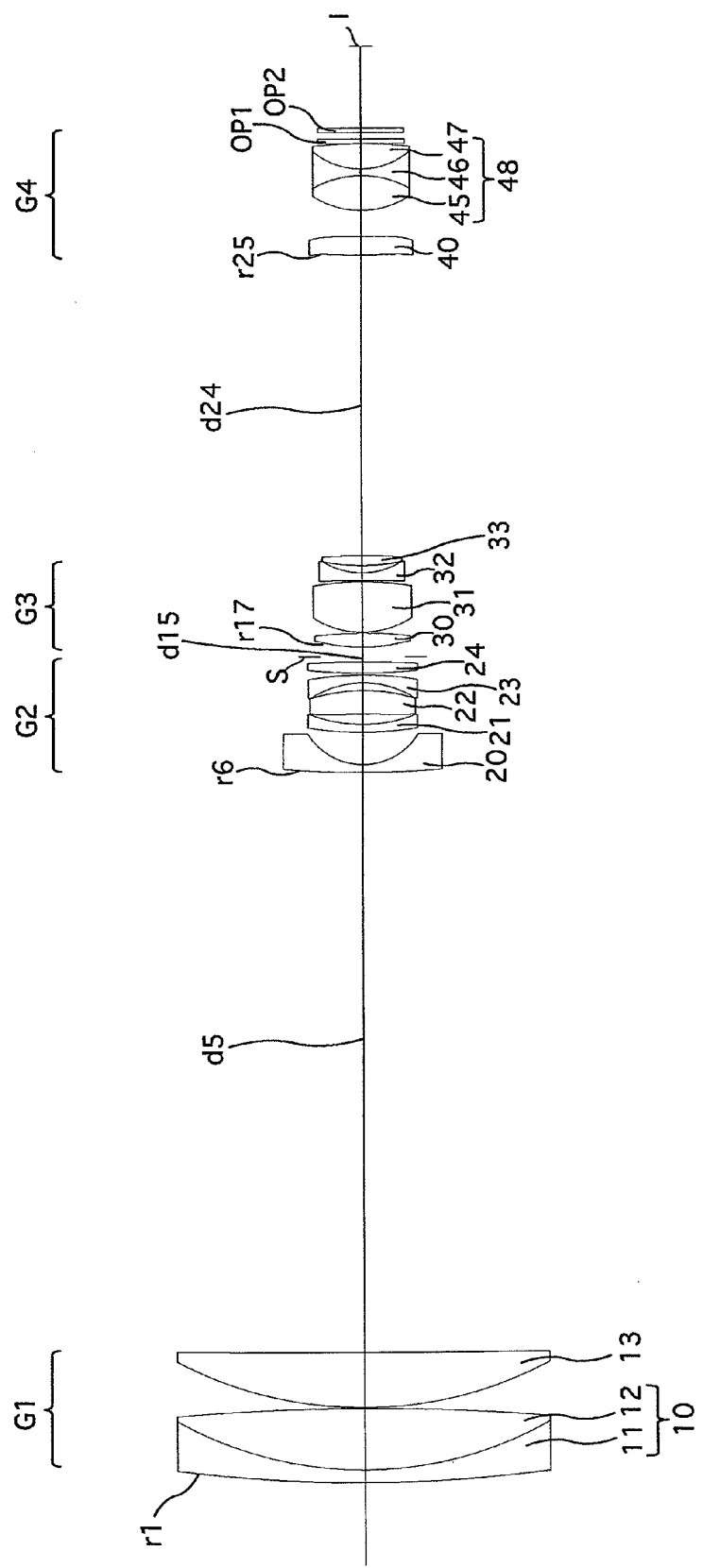
FIG. 28 shows a lens arrangement of the zoom lens system, according to a fourth embodiment of the present invention, at the long focal length extremity when an object at infinity is in an in-focus state.

FIG. 28 shows the lens arrangement of the zoom lens system, according to the fourth embodiment of the present invention, at the long focal length extremity when an object at infinity is in an in-focus state. FIGS. 29A through 29D show aberrations occurred in the lens arrangement shown in FIG. 28.

FIGS. 30A through 30G show transverse aberration occurred in the lens arrangement shown in FIG. 28.

Figure 31:
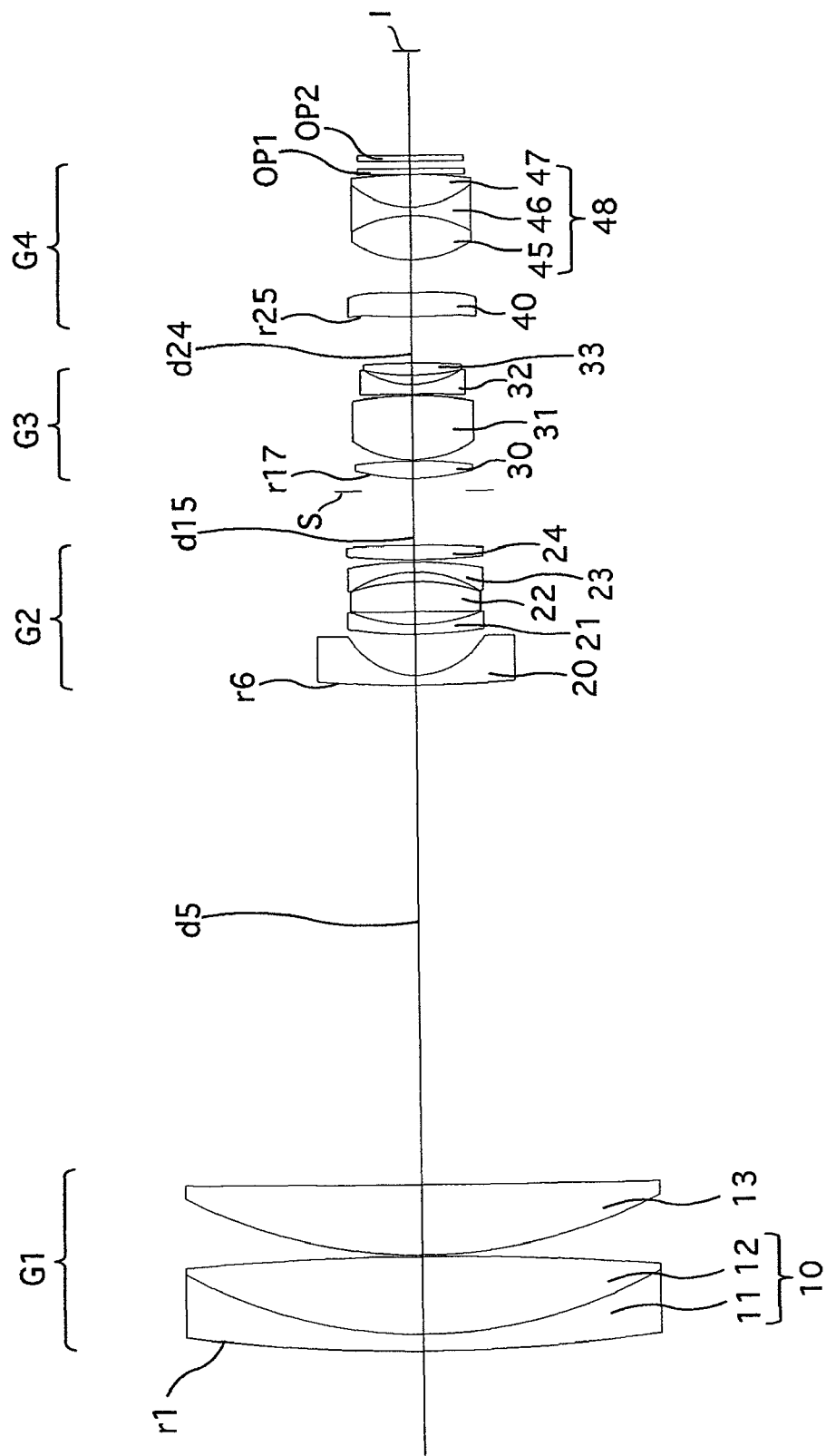
FIG. 31 shows a lens arrangement of the zoom lens system, according to the fourth embodiment of the present invention, at an intermediate focal length position when an object at infinity is in an in-focus state.
Figure 32:
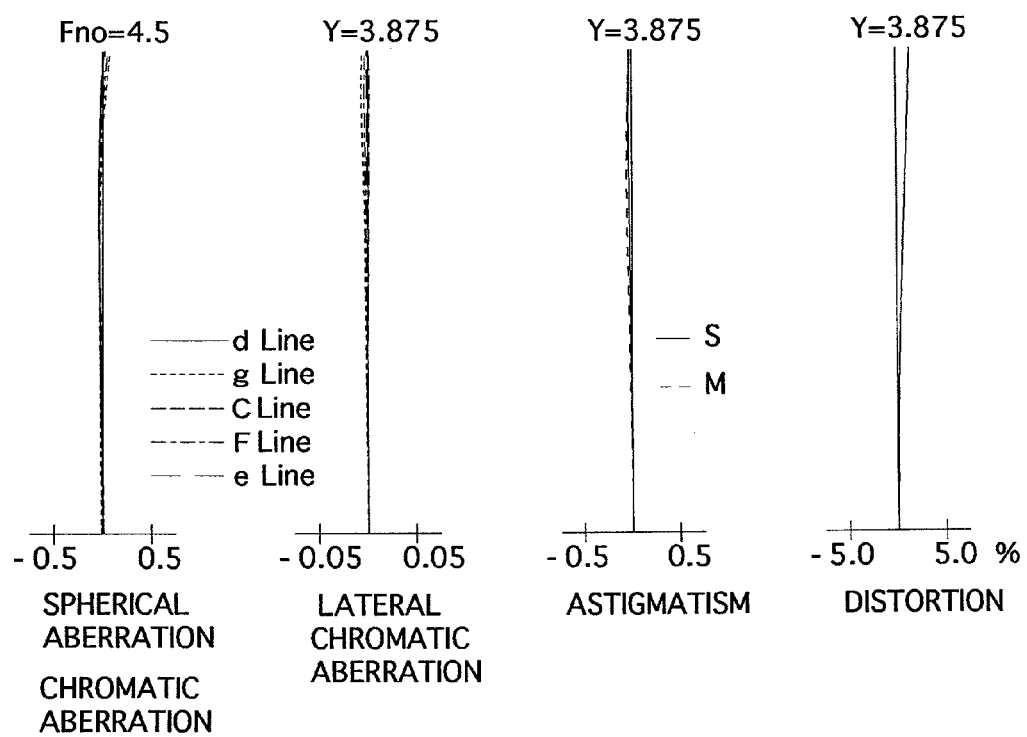
FIGS. 32A, 32B, 32C and 32D show aberrations occurred in the lens arrangement shown in FIG. 31.
Figure 33:
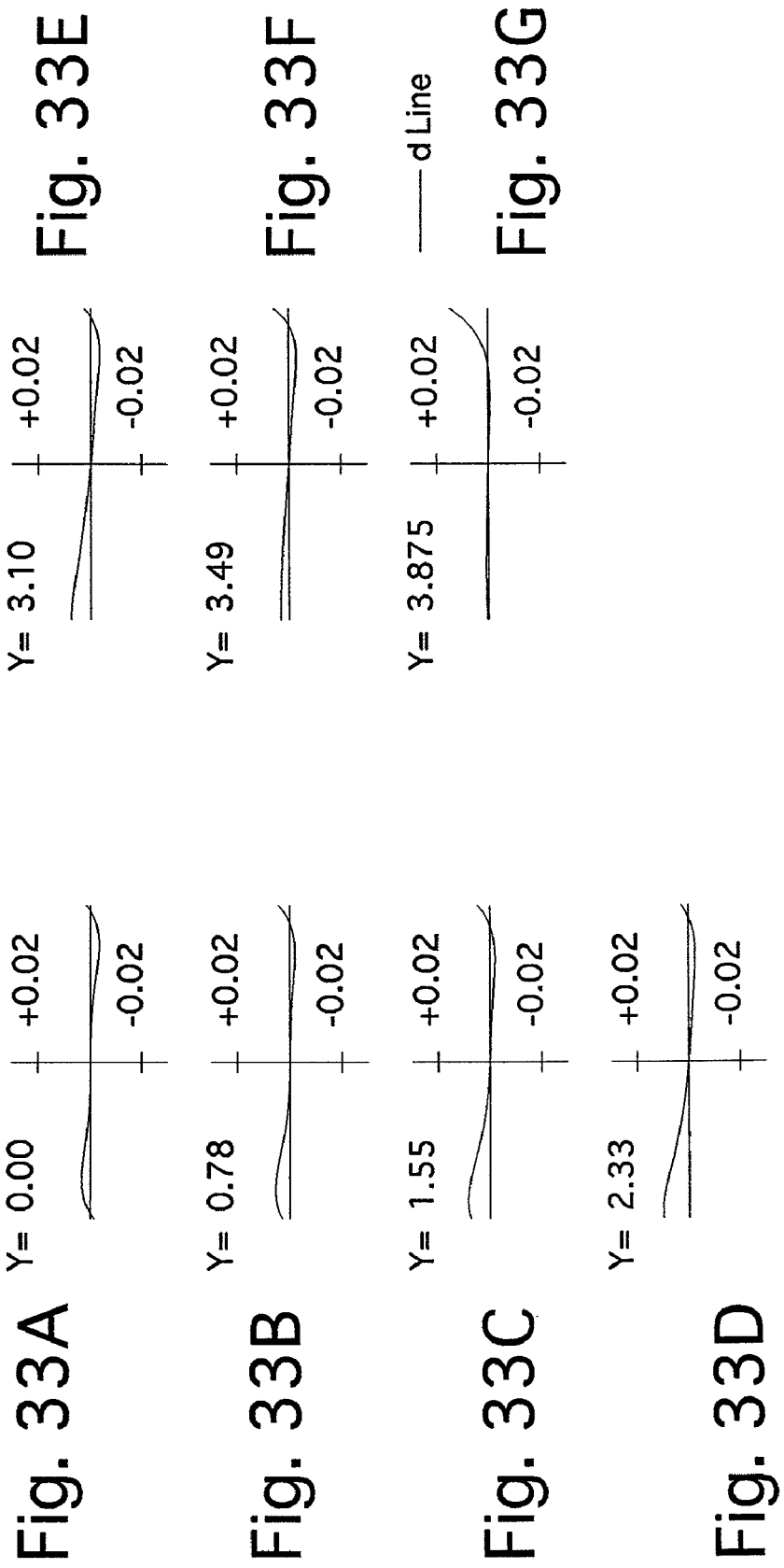
FIGS. 33A, 33B, 33C, 33D, 33E, 33F and 33G show transverse aberration of the lens arrangement shown in FIG. 31.

FIG. 31 shows the lens arrangement of the zoom lens system, according to the fourth embodiment of the present invention, at an intermediate focal length position when an object at infinity is in an in-focus state. FIGS. 32A through 32D show aberrations occurred in the lens arrangement shown in FIG. 31. FIGS. 33A through 33G show transverse aberration of the lens arrangement shown in FIG. 31.

Figure 34:
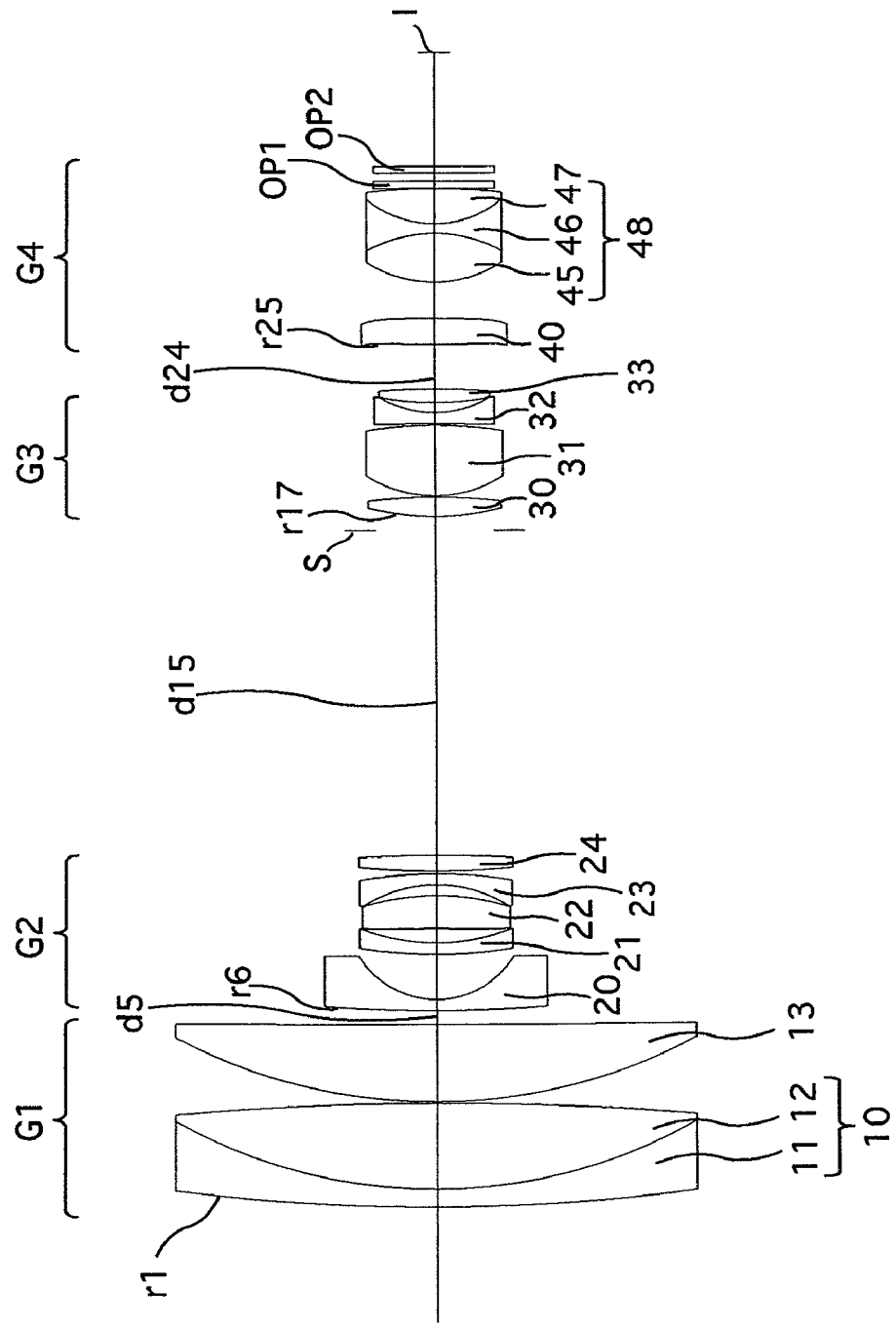
FIG. 34 shows a lens arrangement of the zoom lens system, according to the fourth embodiment of the present invention, at the short focal length extremity when an object at infinity is in an in-focus state.
Figure 35A:
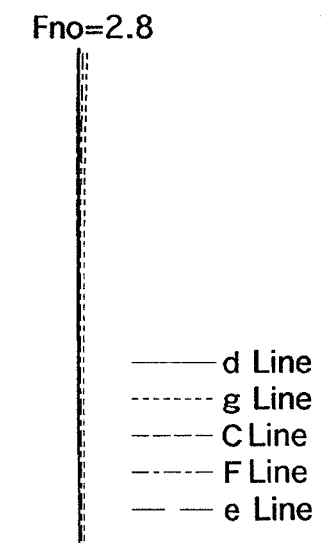
FIGS. 35A, 35B, 35C and 35D show aberrations occurred in the lens arrangement shown in FIG. 34.
Figure 35B:
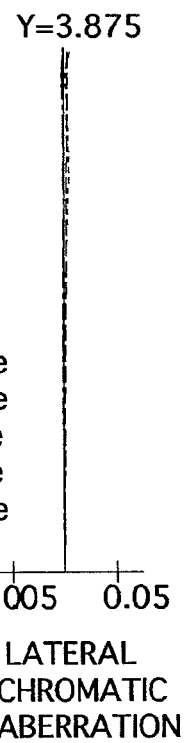
Figure 35C:
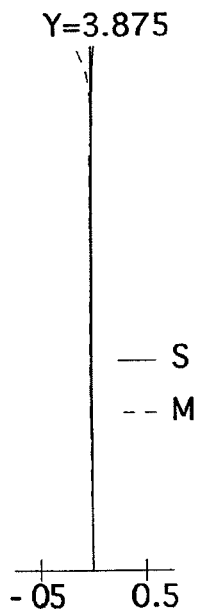
Figure 35D:
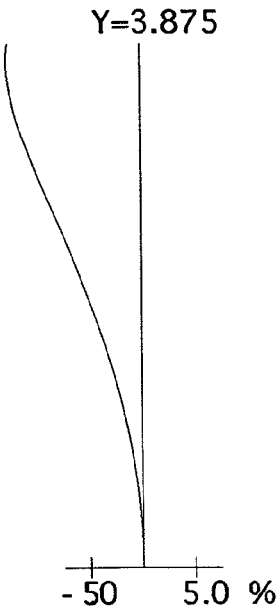

FIG. 34 shows the lens arrangement of the zoom lens system, according to the fourth embodiment of the present invention, at the short focal length extremity when an object at infinity is in an in-focus state. FIGS. 35A through 35D show aberrations occurred in the lens arrangement shown in FIG. 34. FIGS. 36A through 36G show transverse aberration of the lens arrangement shown in FIG. 34.

Table 10 shows the lens data, Table 11 shows various zoom lens system data, and Table 12 shows the aspherical surface data of the fourth embodiment.

In the lens arrangement of the fourth embodiment, the negative second lens group G2, the positive third lens group G3 and the positive fourth lens group G4 differ from the first embodiment, and a detailed explanation thereof will be given hereinafter. The remaining lens arrangement is the same as that of the first embodiment, and hence, a detailed explanation thereof has been omitted herein.

The negative second lens group G2 (surface Nos. 6 through 15) includes a negative meniscus lens element 20 having a convex surface facing toward the object, a negative meniscus lens element 21 having the convex surface facing toward the object, a positive meniscus lens element 22 having the convex surface facing toward the image, a negative meniscus lens element 23 having the convex surface facing toward the image, and a biconvex positive lens element 24, in this order from the object. The object-side surface and the image-side surface of the positive meniscus lens element 22 are aspherical surfaces.

The positive third lens group G3 (surface Nos. 17 through 24) includes a biconvex positive lens element 30, a biconvex positive lens element 31, a biconcave negative lens element 32, and a biconvex positive lens element 33, in this order from the object. The object-side surface of the biconvex positive lens element 30 is an aspherical surface.

The positive fourth lens group G4 (surface Nos. 25 through 30) includes a biconvex positive lens element 40, and a cemented lens 48 composed of a biconvex positive lens element 45, a biconcave negative lens element 46, and a biconvex positive lens element 47, in this order from the object. The biconvex positive lens element 40 is a resin lens element and has an aspherical surface on both surfaces.

TABLE 10

LENS SURFACE DATA

| Surf.No. | R | d | Nd | vd |
|---|---|---|---|---|
| 1 | 150.912 | 1.300 | 1.83481 | 42.7 |
| 2 | 39.206 | 6.232 | 1.45650 | 90.3 |
| 3 | −222.103 | 0.100 | | |
| 4 | 41.161 | 5.603 | 1.61800 | 63.4 |
| 5 | 2801.176 | Variable | | |
| 6 | 101.573 | 0.800 | 1.80420 | 46.5 |
| 7 | 6.650 | 3.291 | | |
| 8 | 36.002 | 0.800 | 1.80518 | 25.5 |
| 9 | 14.855 | 1.044 | | |
| 10* | −72.352 | 2.398 | 2.00178 | 19.3 |
| 11* | −17.447 | 0.779 | | |
| 12 | −9.862 | 0.800 | 1.80420 | 46.5 |
| 13 | −32.918 | 0.200 | | |
| 14 | 57.712 | 1.136 | 1.92286 | 20.9 |
| 15 | −100.480 | Variable | | |
| 16 (Diaphragm) | ∞ | 1.000 | | |
| 17* | 16.709 | 1.427 | 1.49700 | 81.6 |
| 18* | −40.870 | 0.100 | | |
| 19 | 9.203 | 5.157 | 1.49700 | 81.6 |
| 20 | −28.744 | 0.100 | | |
| 21 | −292.926 | 0.800 | 1.80610 | 33.3 |
| 22 | 7.518 | 0.763 | | |
| 23 | 20.518 | 1.000 | 1.56883 | 56.0 |
| 24 | −52.807 | Variable | | |
| 25* | 66.126 | 1.913 | 1.58313 | 59.5 |
| 26* | −197.420 | 2.681 | | |
| 27 | 9.067 | 3.559 | 1.51742 | 52.2 |
| 28 | −10.224 | 0.700 | 1.83481 | 42.7 |
| 29 | 7.699 | 2.616 | 1.56732 | 42.8 |
| 30 | −41.518 | 0.000 | | |
| 31 | ∞ | 0.500 | 1.51633 | 64.1 |
| 32 | ∞ | 0.600 | | |
| 33 | ∞ | 0.500 | 1.51633 | 64.1 |
| 34 | ∞ | — | | |

The symbol * designates the aspherical surface which is rotationally symmetrical with respect to the optical axis.

TABLE 11

ZOOM LENS SYSTEM DATA
Zoom Ratio 29.6

| Short Focal Length Extremity | |
|---|---|
| FNO. | 2.8 |
| f | 4.43 |
| W | 45.8 |
| Y | 3.875 |
| fB | 2.10 |
| L | 77.91 |
| d5 | 1.000 |

TABLE 11-continued

ZOOM LENS SYSTEM DATA
Zoom Ratio 29.6

| | |
|---|---|
| d15 | 23.668 |
| d24 | 3.244 |
| Intermediate Focal Length | |
| FNO. | 4.5 |
| f | 30.03 |
| W | 7.4 |
| Y | 3.875 |
| fB | 13.54 |
| L | 109.45 |
| d5 | 39.893 |
| d15 | 4.387 |
| d24 | 3.730 |
| Long Focal Length Extremity | |
| FNO. | 4.7 |
| f | 131.00 |
| W | 1.7 |
| Y | 3.875 |
| fB | 2.10 |
| L | 140.00 |
| d5 | 58.720 |
| d15 | 0.500 |
| d24 | 30.781 |

TABLE 12

ASPHERICAL SURFACE DATA
The aspherical surface coefficients not indicated are zero (0.00):

| Surf. No. | K | A4 | A6 | A8 | A10 |
|---|---|---|---|---|---|
| 10 | 0.000 | $0.2408 \times 10^{-3}$ | $0.4713 \times 10^{-6}$ | $0.1733 \times 10^{-7}$ | |
| 11 | 0.000 | $0.4472 \times 10^{-4}$ | $0.4503 \times 10^{-7}$ | $-0.3983 \times 10^{-7}$ | |
| 17 | 0.000 | $-0.8510 \times 10^{-4}$ | $-0.2476 \times 10^{-5}$ | $0.3441 \times 10^{-8}$ | |
| 18 | 0.000 | $0.2620 \times 10^{-4}$ | $-0.2184 \times 10^{-5}$ | $0.1132 \times 10^{-7}$ | |
| 25 | 0.000 | $0.6491 \times 10^{-4}$ | $-0.1056 \times 10^{-4}$ | $-0.2026 \times 10^{-6}$ | $0.2211 \times 10^{-8}$ |
| 26 | 0.000 | $-0.2725 \times 10^{-4}$ | $-0.1068 \times 10^{-4}$ | $-0.3218 \times 10^{-6}$ | $0.6036 \times 10^{-8}$ |

Embodiment 5

Figure 37:
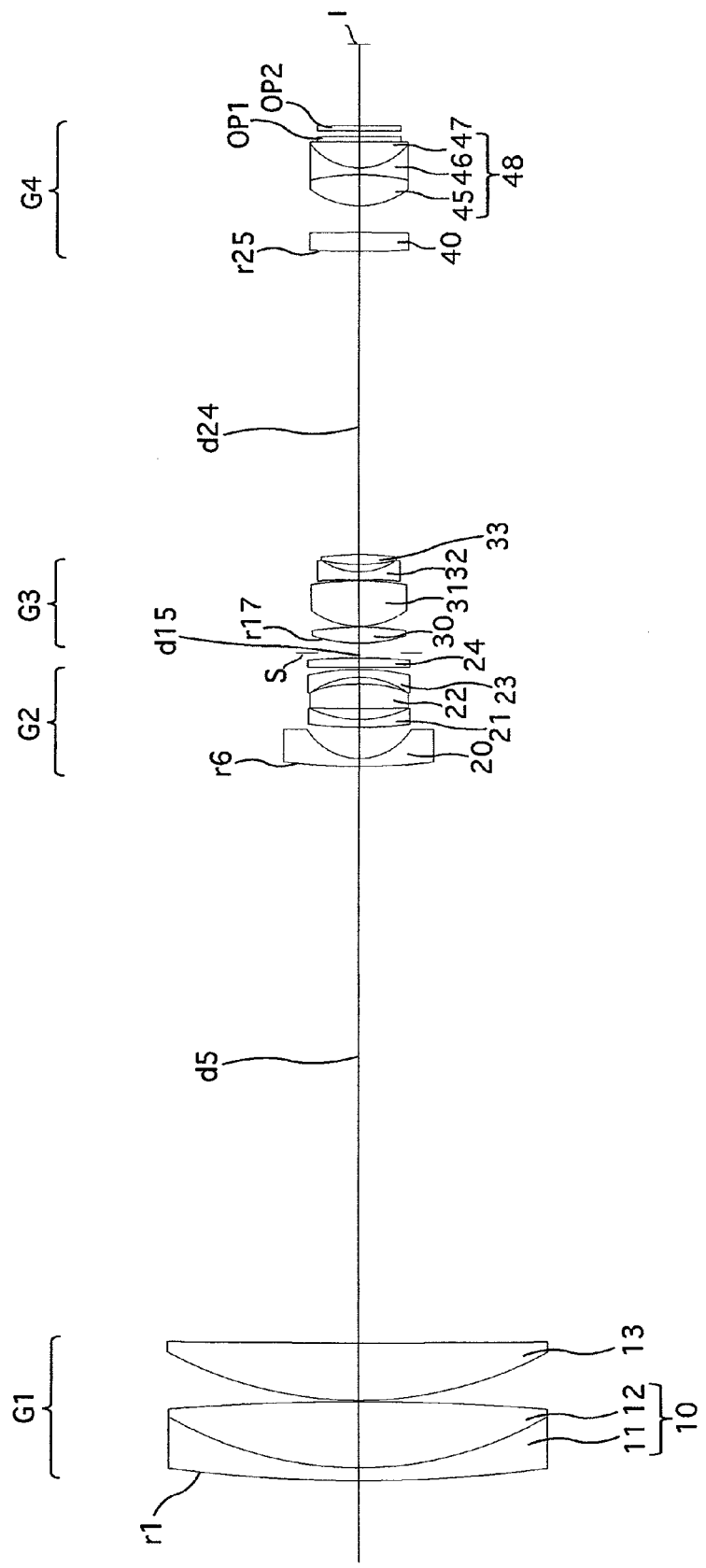
FIG. 37 shows a lens arrangement of the zoom lens system, according to a fifth embodiment of the present invention, at the long focal length extremity when an object at infinity is in an in-focus state.

FIG. 37 shows the lens arrangement of the zoom lens system, according to the fifth embodiment of the present invention, at the long focal length extremity when an object at infinity is in an in-focus state. FIGS. 38A through 38D show aberrations occurred in the lens arrangement shown in FIG. 37.

FIGS. 39A through 39G show transverse aberration occurred in the lens arrangement shown in FIG. 37.

FIG. 40 shows a lens arrangement of the zoom lens system, according to the fifth embodiment of the present invention, at an intermediate focal length position when an object at infinity is in an in-focus state. FIGS. 41A through 41D show aberrations occurred in the lens arrangement shown in FIG. 40. FIGS. 42A through 42G show transverse aberration of the lens arrangement shown in FIG. 40.

Figure 43:
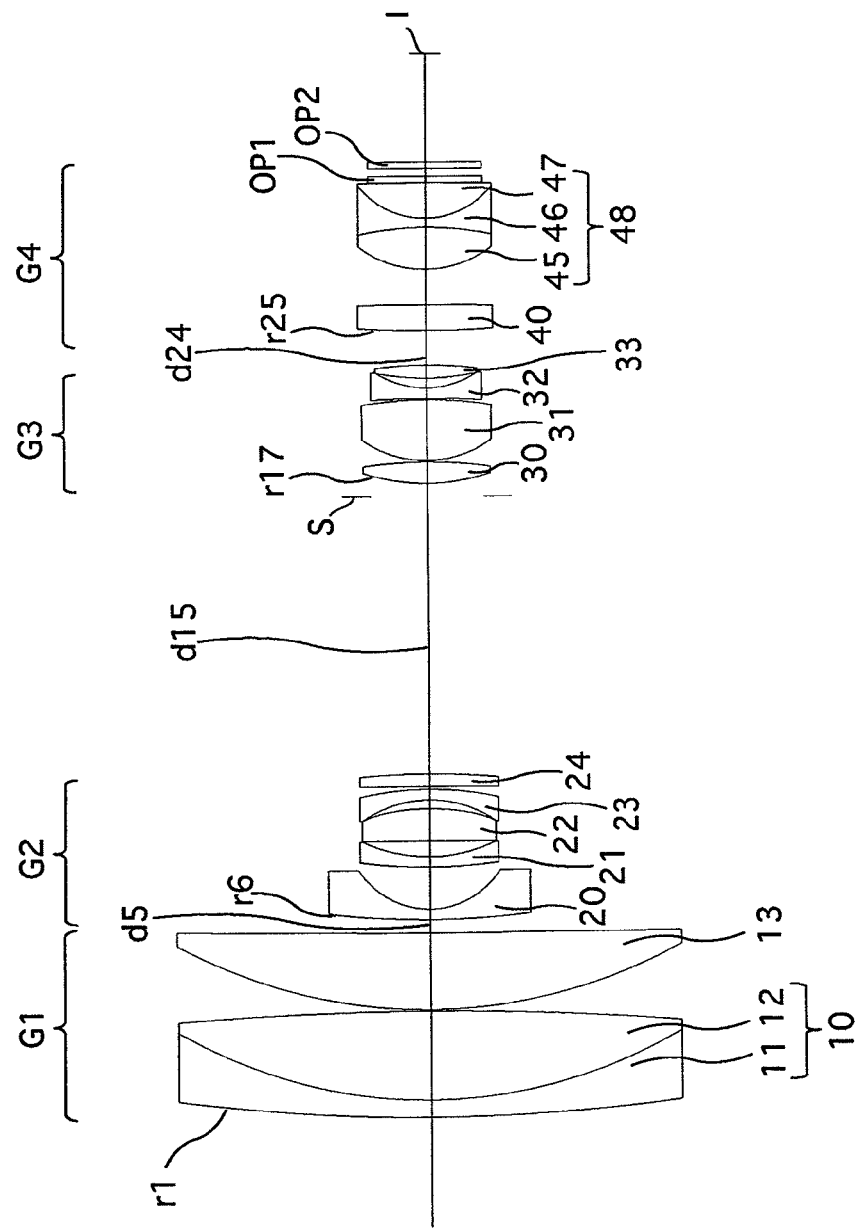
FIG. 43 shows a lens arrangement of the zoom lens system, according to the fifth embodiment of the present invention, at the short focal length extremity when an object at infinity is in an in-focus state.

FIG. 43 shows the lens arrangement of the zoom lens system, according to the fifth embodiment of the present invention, at the short focal length extremity when an object at infinity is in an in-focus state. FIGS. 44A through 44D show aberrations occurred in the lens arrangement shown in FIG. 43. FIGS. 45A through 45G show transverse aberration of the lens arrangement shown in FIG. 43.

Table 13 shows the lens data, Table 14 shows various zoom lens system data, and Table 15 shows the aspherical surface data of the fifth embodiment.

In the lens arrangements of the fifth embodiment, the negative second lens group G2, the positive third lens group G3 and the positive fourth lens group G4 differ from the first embodiment, and a detailed explanation thereof will be given hereinafter. The remaining lens arrangement is the same as that of the first embodiment, and hence, a detailed explanation thereof has been omitted herein.

The negative second lens group G2 (surface Nos. 6 through 15) includes a negative meniscus lens element 20 having the convex surface facing toward the object, a negative meniscus lens element 21 having the convex surface facing toward the object, a positive meniscus lens element 22 having the convex surface facing toward the image, a negative meniscus lens element 23 having the convex surface facing toward the image, and a biconvex positive lens element 24, in this order from the object. The object-side surface and the image-side surface of the positive meniscus lens element 22 are aspherical surfaces.

The positive third lens group G3 (surface Nos. 17 through 24) includes a biconvex positive lens element 30, a biconvex positive lens element 31, a biconcave negative lens element 32, and a biconvex positive lens element 33, in this order from the object. The object-side surface and the image-side surface of the biconvex positive lens element 30 are aspherical surfaces.

The positive fourth lens group G4 (surface Nos. 25 through 30) includes a biconvex positive lens element 40, and a cemented lens 48 composed of a biconvex positive lens element 45, a biconcave negative lens element 46, and a biconvex positive lens element 47, in this order from the object. The biconvex positive lens element 40 is a resin lens element and has an aspherical surface on both surfaces.

TABLE 13

| Surf.No. | LENS SURFACE DATA R | d | Nd | νd |
|---|---|---|---|---|
| 1 | 148.549 | 1.300 | 1.83481 | 42.7 |
| 2 | 38.289 | 6.756 | 1.45650 | 90.3 |
| 3 | −228.629 | 0.100 | | |
| 4 | 40.447 | 5.823 | 1.61800 | 63.4 |
| 5 | 2577.277 | Variable | | |
| 6 | 63.910 | 0.800 | 1.80420 | 46.5 |
| 7 | 6.464 | 3.169 | | |
| 8 | 38.886 | 0.800 | 1.80518 | 25.5 |
| 9 | 11.965 | 1.145 | | |
| 10* | −437.555 | 2.495 | 2.00178 | 19.3 |
| 11* | −16.817 | 0.665 | | |
| 12 | −8.954 | 0.800 | 1.80420 | 46.5 |
| 13 | −23.651 | 0.200 | | |
| 14 | 715.133 | 0.966 | 1.92286 | 20.9 |
| 15 | −57.384 | Variable | | |
| 16 (Diaphragm) | ∞ | 1.000 | | |
| 17* | 14.401 | 1.643 | 1.49700 | 81.6 |
| 18* | −31.796 | 0.100 | | |
| 19 | 8.333 | 4.647 | 1.49700 | 81.6 |
| 20 | −30.066 | 0.100 | | |
| 21 | −77.577 | 0.800 | 1.83400 | 37.3 |
| 22 | 7.021 | 0.761 | | |
| 23 | 18.877 | 1.000 | 1.48749 | 70.4 |
| 24 | −29.877 | Variable | | |
| 25* | 183.626 | 1.964 | 1.58313 | 59.5 |
| 26* | −105.192 | 2.723 | | |
| 27 | 8.399 | 3.209 | 1.49700 | 81.6 |
| 28 | −24.081 | 0.700 | 1.80420 | 46.5 |
| 29 | 6.587 | 2.720 | 1.56732 | 42.8 |
| 30 | −264.238 | 0.000 | | |
| 31 | ∞ | 0.500 | 1.51633 | 64.1 |
| 32 | ∞ | 0.600 | | |
| 33 | ∞ | 0.500 | 1.51633 | 64.1 |
| 34 | ∞ | — | | |

The symbol * designates the aspherical surface which is rotationally symmetrical with respect to the optical axis.

TABLE 14

ZOOM LENS SYSTEM DATA
Zoom Ratio 29.5

| Short Focal Length Extremity | |
|---|---|
| FNO. | 2.8 |
| f | 4.40 |
| W | 45.5 |
| Y | 3.875 |
| fB | 2.10 |
| L | 74.88 |
| d5 | 1.000 |
| d15 | 21.136 |
| d24 | 2.657 |
| Intermediate Focal Length | |
| FNO. | 4.4 |
| f | 30.15 |
| W | 7.4 |
| Y | 3.875 |
| fB | 13.20 |
| L | 109.64 |
| d5 | 39.712 |
| d15 | 3.597 |
| d24 | 5.145 |
| Long Focal Length Extremity | |
| FNO. | 4.7 |
| f | 130.00 |
| W | 1.7 |
| Y | 3.875 |
| fB | 2.09 |
| L | 140.00 |
| d5 | 58.376 |
| d15 | 0.500 |
| d24 | 31.048 |

TABLE 15

ASPHERICAL SURFACE DATA
The aspherical surface coefficients not indicated are zero (0.00):

| Surf. No. | K | A4 | A6 | A8 | A10 |
|---|---|---|---|---|---|
| 10 | 0.000 | $0.1501 \times 10^{-3}$ | $-0.3029 \times 10^{-5}$ | $0.6840 \times 10^{-7}$ | $-0.3807 \times 10^{-8}$ |
| 11 | 0.000 | $-0.8831 \times 10^{-4}$ | $-0.2379 \times 10^{-5}$ | $-0.8687 \times 10^{-7}$ | $-0.1028 \times 10^{-8}$ |
| 17 | 0.000 | $-0.1002 \times 10^{-3}$ | $0.4072 \times 10^{-6}$ | $-0.2808 \times 10^{-7}$ | |
| 18 | 0.000 | $0.2519 \times 10^{-4}$ | $0.2195 \times 10^{-6}$ | $-0.1237 \times 10^{-7}$ | |
| 25 | 0.000 | $0.3019 \times 10^{-3}$ | $-0.1497 \times 10^{-4}$ | $0.6921 \times 10^{-6}$ | $-0.1591 \times 10^{-7}$ |
| 26 | 0.000 | $0.3047 \times 10^{-3}$ | $-0.1533 \times 10^{-4}$ | $0.6669 \times 10^{-6}$ | $-0.1547 \times 10^{-7}$ |

Embodiment 6

Figure 46:
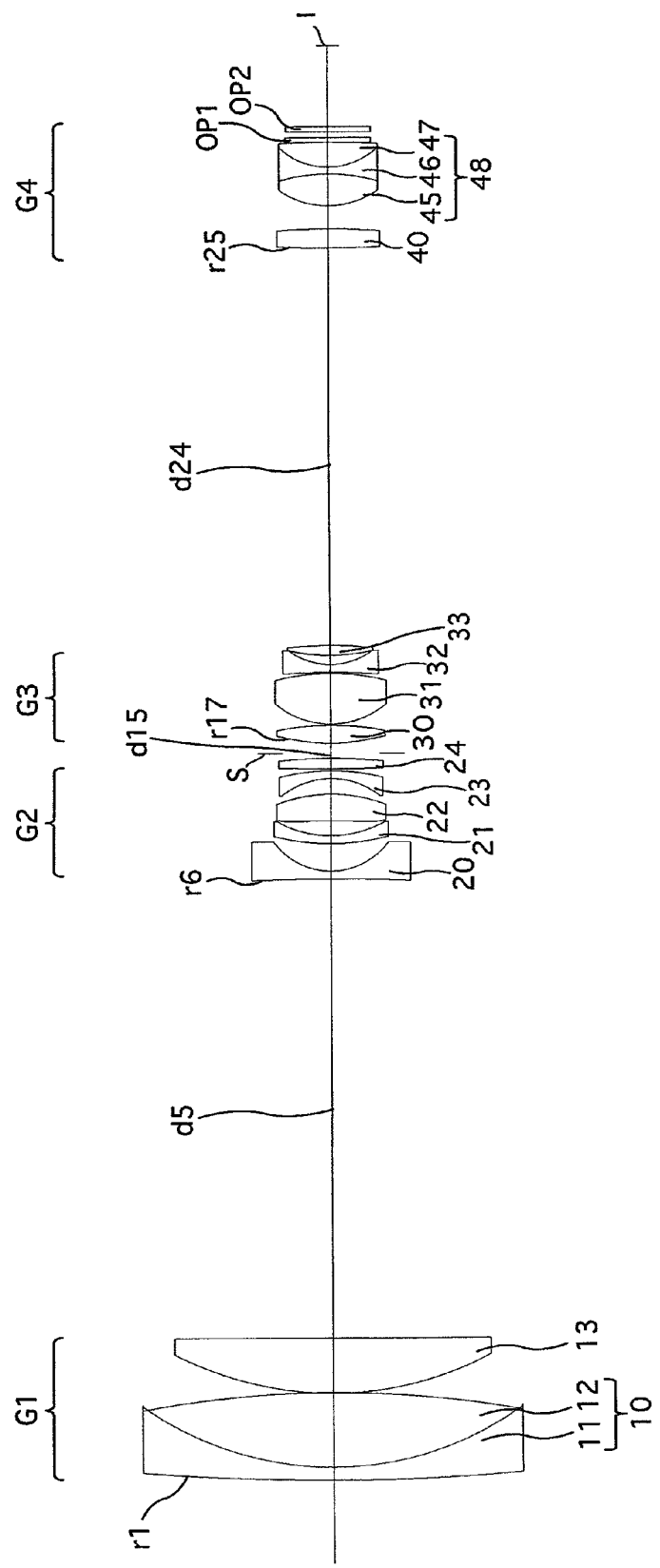
FIG. 46 shows a lens arrangement of the zoom lens system, according to a sixth embodiment of the present invention, at the long focal length extremity when an object at infinity is in an in-focus state.

FIG. 46 shows the lens arrangement of the zoom lens system, according to the sixth embodiment of the present invention, at the long focal length extremity when an object at infinity is in an in-focus state. FIGS. 47A through 47D show aberrations occurred in the lens arrangement shown in FIG. 46. FIGS. 48A through 48G show transverse aberration occurred in the lens arrangement shown in FIG. 46.

Figure 49:
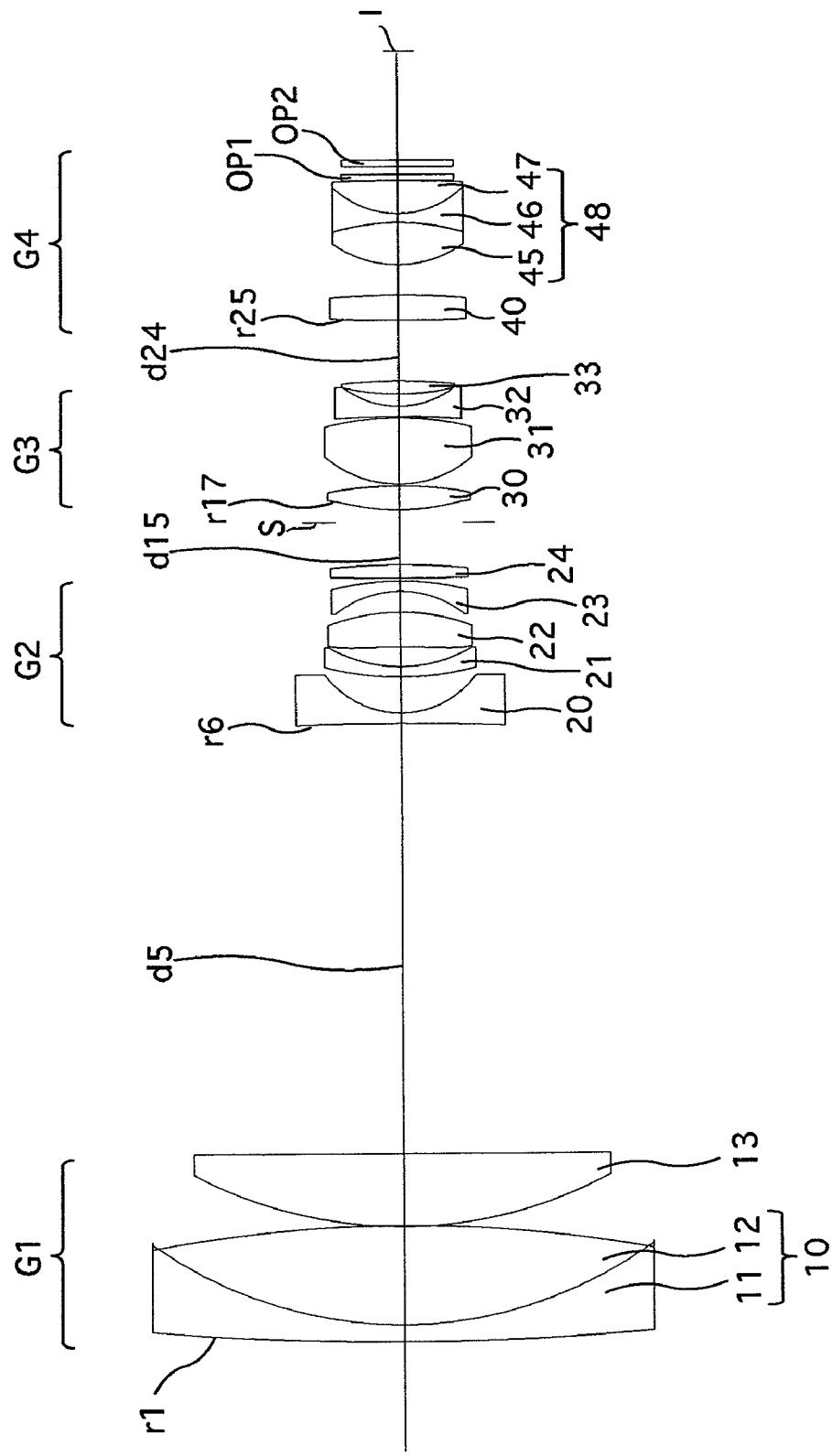
FIG. 49 shows a lens arrangement of the zoom lens system, according to the sixth embodiment of the present invention, at an intermediate focal length position when an object at infinity is in an in-focus state.

FIG. 49 shows the lens arrangement of the zoom lens system, according to the sixth embodiment of the present invention, at an intermediate focal length position when an object at infinity is in an in-focus state. FIGS. 50A through 50D show aberrations occurred in the lens arrangement shown in FIG. 49. FIGS. 51A through 51G show transverse aberration of the lens arrangement shown in FIG. 49.

Figure 52:
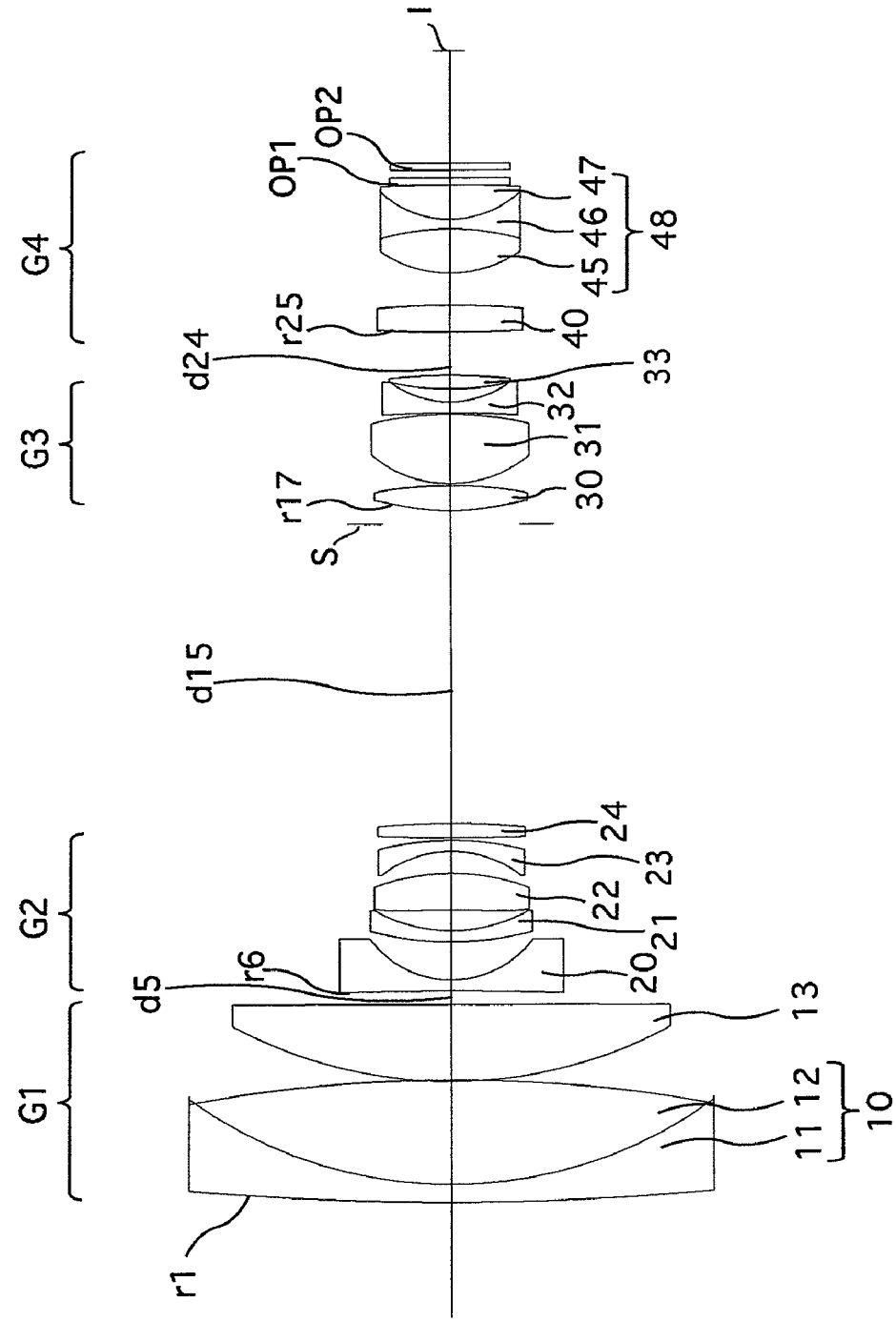
FIG. 52 shows a lens arrangement of the zoom lens system, according to the sixth embodiment of the present invention, at the short focal length extremity when an object at infinity is in an in-focus state.
Figure 56A:
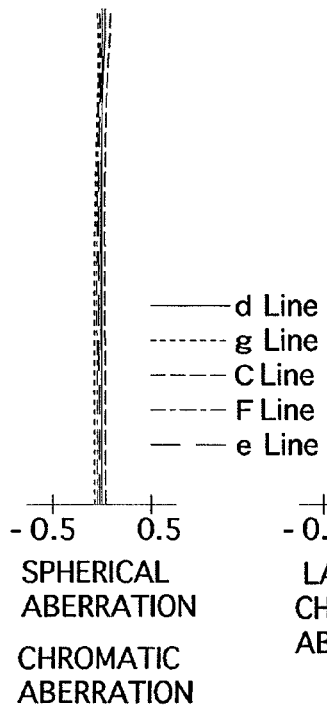
FIGS. 56A, 56B, 56C and 56D show aberrations occurred in the lens arrangement shown in FIG. 55.
Figure 56B:
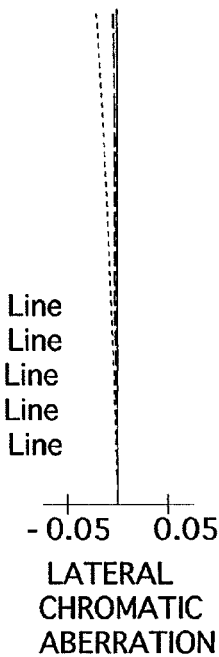
Figure 56C:
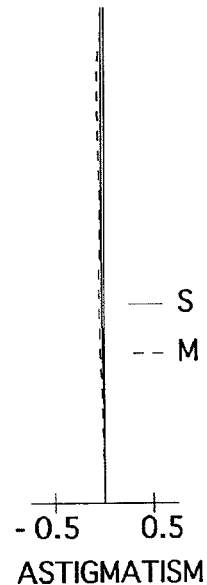
Figure 56D:
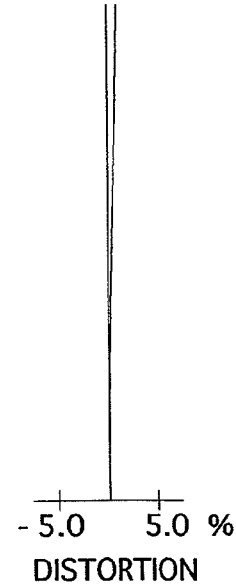

FIG. 52 shows the lens arrangement of the zoom lens system, according to the sixth embodiment of the present invention, at the short focal length extremity when an object at infinity is in an in-focus state. FIGS. 53A through 53D show aberrations occurred in the lens arrangement shown in FIG. 52. FIGS. 54A through 54G show transverse aberration of the lens arrangement shown in FIG. 52.

Table 16 shows the lens data, Table 17 shows various zoom lens system data, and Table 18 shows the aspherical surface data of the sixth embodiment.

In the lens arrangements of the sixth embodiment, the positive first lens group G1, the negative second lens group G2, the positive third lens group G3 and the positive fourth lens group G4 differ from the first embodiment, and a detailed explanation thereof will be given hereinafter. The remaining lens arrangement is the same as that of the first embodiment, and hence, a detailed explanation thereof has been omitted herein.

The positive first lens group G1 (surface Nos. 1 through 5) includes a cemented lens 10 composed of a negative meniscus lens element 11 having the convex surface facing toward the object and a biconvex positive lens element 12, in this order from the object, and a biconvex positive lens element 13, in this order from the object.

The negative second lens group G2 (surface Nos. 6 through 15) includes a biconcave negative lens element 20, a negative meniscus lens element 21 having the convex surface facing toward the object, a positive meniscus lens element 22 having the convex surface facing toward the image, a negative meniscus lens element 23 having the convex surface facing toward the image, and a biconvex positive lens element 24, in this order from the object. The positive meniscus lens element 22 is a resin lens and has an aspherical surface on both surfaces thereof.

The positive third lens group G3 (surface Nos. 17 through 24) includes a biconvex positive lens element 30, a biconvex positive lens element 31, a biconcave negative lens element 32, and a biconvex positive lens element 33, in this order from the object. The object-side surface and the image-side surface of the biconvex positive lens element 30 are aspherical surfaces.

The positive fourth lens group G4 (surface Nos. 25 through 30) includes a biconvex positive lens element 40, and a cemented lens 48 composed of a biconvex positive lens element 45, a biconcave negative lens element 46, and a biconvex positive lens element 47, in this order from the object. The object-side surface and the image-side surface of the biconvex positive lens element 40 are aspherical surfaces.

TABLE 16

LENS SURFACE DATA

| Surf.No. | R | d | Nd | vd |
|---|---|---|---|---|
| 1 | 232.137 | 1.300 | 1.83481 | 42.7 |
| 2 | 33.119 | 7.388 | 1.45650 | 90.3 |
| 3 | −103.677 | 0.100 | | |
| 4 | 34.335 | 5.568 | 1.64000 | 60.2 |
| 5 | −4852.672 | Variable | | |
| 6 | −212.628 | 0.800 | 1.80420 | 46.5 |
| 7 | 7.405 | 2.770 | | |
| 8 | 23.475 | 0.800 | 1.80518 | 25.5 |
| 9 | 11.423 | 1.523 | | |
| 10* | −41.883 | 2.670 | 2.00178 | 19.3 |
| 11* | −14.735 | 1.587 | | |
| 12 | −8.062 | 0.800 | 1.80420 | 46.5 |
| 13 | −20.849 | 0.200 | | |
| 14 | 163.519 | 1.049 | 1.92286 | 20.9 |
| 15 | −53.112 | Variable | | |
| 16 (Diaphragm) | ∞ | 1.000 | | |
| 17* | 16.974 | 1.831 | 1.49700 | 81.6 |
| 18* | −31.559 | 0.132 | | |
| 19 | 8.779 | 5.128 | 1.49700 | 81.6 |
| 20 | −23.151 | 0.100 | | |

TABLE 16-continued

LENS SURFACE DATA

| Surf.No. | R | d | Nd | vd |
|---|---|---|---|---|
| 21 | −70.123 | 0.800 | 1.83400 | 37.3 |
| 22 | 7.357 | 0.943 | | |
| 23 | 19.613 | 1.000 | 1.48749 | 70.4 |
| 24 | −41.757 | Variable | | |
| 25* | 507.070 | 1.964 | 1.58313 | 59.5 |
| 26* | −48.150 | 2.355 | | |
| 27 | 8.845 | 3.254 | 1.49700 | 81.6 |
| 28 | −18.000 | 0.700 | 1.80420 | 46.5 |
| 29 | 7.457 | 2.544 | 1.56732 | 42.8 |
| 30 | −110.814 | 0.000 | | |
| 31 | ∞ | 0.500 | 1.51633 | 64.1 |
| 32 | ∞ | 0.600 | | |
| 33 | ∞ | 0.500 | 1.51633 | 64.1 |
| 34 | ∞ | — | | |

The symbol * designates the aspherical surface which is rotationally symmetrical with respect to the optical axis.

TABLE 17

ZOOM LENS SYSTEM DATA
Zoom Ratio 29.5

| | Short Focal Length Extremity |
|---|---|
| FNO. | 2.8 |
| f | 4.40 |
| W | 46.0 |
| Y | 3.875 |
| fB | 3.04 |
| L | 79.02 |
| d5 | 1.000 |
| d15 | 21.862 |
| d24 | 3.206 |
| | Intermediate Focal Length |
| FNO. | 4.4 |
| f | 30.05 |
| W | 7.5 |
| Y | 3.875 |
| fB | 14.58 |
| L | 105.28 |
| d5 | 32.879 |
| d15 | 3.250 |
| d24 | 4.672 |
| | Long Focal Length Extremity |
| FNO. | 4.7 |
| f | 130.00 |
| W | 1.7 |
| Y | 3.875 |
| fB | 2.09 |
| L | 139.23 |
| d5 | 46.240 |
| d15 | 0.500 |
| d24 | 40.494 |

TABLE 18

ASPHERICAL SURFACE DATA
The aspherical surface coefficients not indicated are zero (0.00):

| Surf. No. | K | A4 | A6 | A8 | A10 |
|---|---|---|---|---|---|
| 10 | 0.000 | $0.3965 \times 10^{-3}$ | $0.1755 \times 10^{-5}$ | $-0.4962 \times 10^{-7}$ | $0.1008 \times 10^{-8}$ |
| 11 | 0.000 | $0.1058 \times 10^{-3}$ | $0.1433 \times 10^{-5}$ | $-0.1251 \times 10^{-6}$ | $0.7051 \times 10^{-9}$ |
| 17 | 0.000 | $-0.8962 \times 10^{-4}$ | $-0.1311 \times 10^{-5}$ | $-0.7633 \times 10^{-7}$ | |
| 18 | 0.000 | $0.2779 \times 10^{-4}$ | $-0.1025 \times 10^{-5}$ | $-0.5375 \times 10^{-7}$ | |
| 25 | 0.000 | $0.3034 \times 10^{-3}$ | $-0.1779 \times 10^{-4}$ | $0.7566 \times 10^{-6}$ | $-0.1393 \times 10^{-7}$ |
| 26 | 0.000 | $0.2813 \times 10^{-3}$ | $-0.1708 \times 10^{-4}$ | $0.6727 \times 10^{-6}$ | $-0.1239 \times 10^{-7}$ |

Embodiment 7

FIG. 55 shows the lens arrangement of the zoom lens system, according to the seventh embodiment of the present invention, at the long focal length extremity when an object at infinity is in an in-focus state.

FIGS. 56A through 56D show aberrations occurred in the lens arrangement shown in FIG. 55. FIGS. 57A through 57G show transverse aberration occurred in the lens arrangement shown in FIG. 55.

Figure 58:
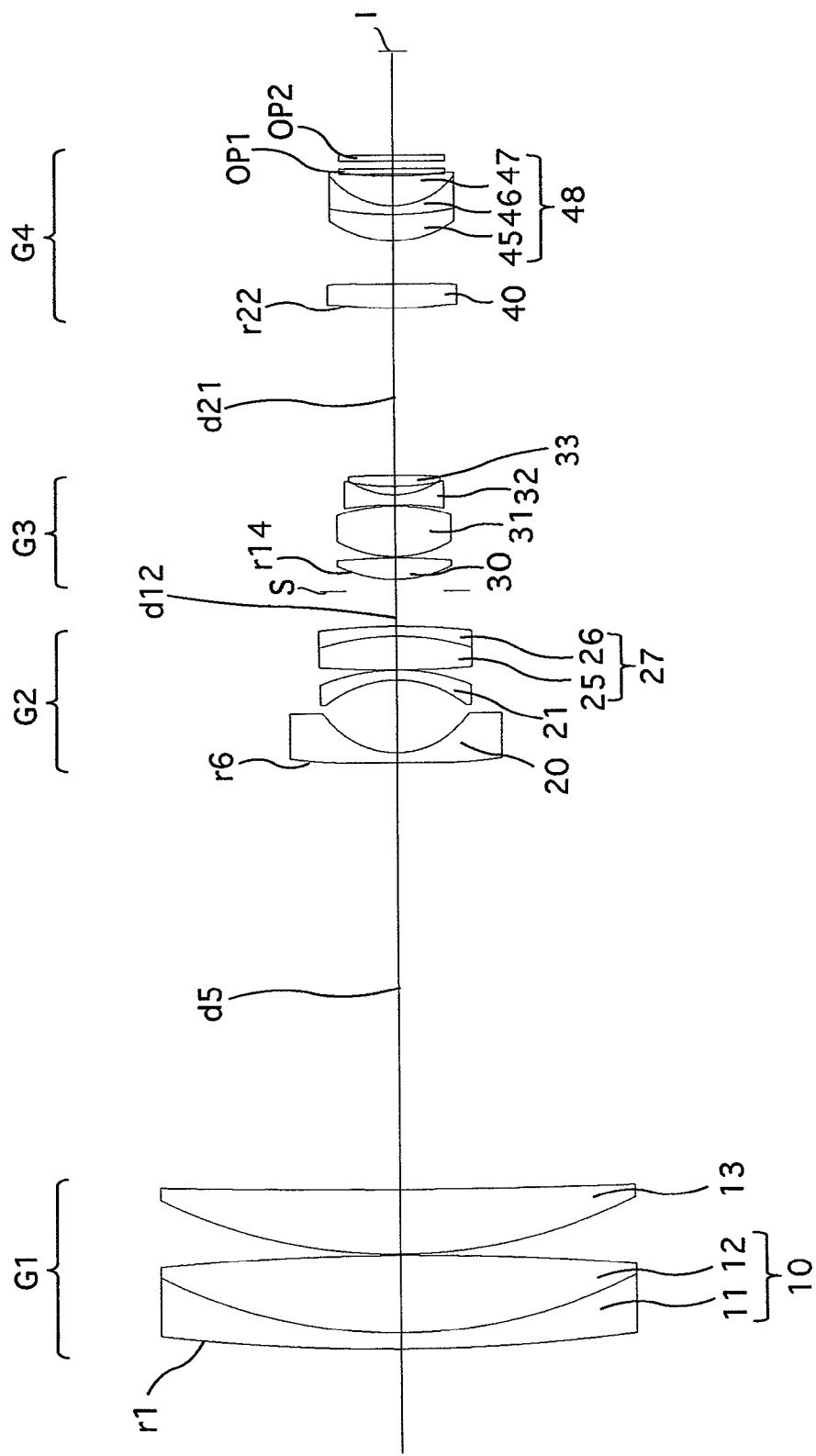
FIG. 58 shows a lens arrangement of the zoom lens system, according to the seventh embodiment of the present invention, at an intermediate focal length position when an object at infinity is in an in-focus state.

FIG. 58 shows the lens arrangement of the zoom lens system, according to the seventh embodiment of the present invention, at an intermediate focal length position when an object at infinity is in an in-focus state. FIGS. 59A through 59D show aberrations occurred in the lens arrangement shown in FIG. 58. FIGS. 60A through 60G show transverse aberration of the lens arrangement shown in FIG. 58.

FIG. 61 shows the lens arrangement of the zoom lens system, according to the seventh embodiment of the present invention, at the short focal length extremity when an object at infinity is in an in-focus state. FIGS. 62A through 62D show aberrations occurred in the lens arrangement shown in FIG. 61. FIGS. 63A through 63G show transverse aberration of the lens arrangement shown in FIG. 61.

Table 19 shows the lens data, Table 20 shows various zoom lens system data, and Table 21 shows the aspherical surface data of the seventh embodiment.

In the lens arrangements of the seventh embodiment, the negative second lens group G2, the positive third lens group G3 and the positive fourth lens group G4 differ from the first embodiment, and a detailed explanation thereof will be given hereinafter. The remaining lens arrangement is the same as that of the first embodiment, and hence, a detailed explanation thereof has been omitted herein.

The negative second lens group G2 (surface Nos. 6 through 12) includes a biconcave negative lens element 20, a negative meniscus lens element 21 having the convex surface facing toward the image, and a cemented lens 27 composed of a biconvex positive lens element 25 and a negative meniscus lens element 26 having the convex surface facing toward the image, in this order from the object. The object-side surface and the image-side surface of the biconcave negative lens element 20 are aspherical surfaces.

The positive third lens group G3 (surface Nos. 14 through 21) includes a biconvex positive lens element 30, a biconvex positive lens element 31, a biconcave negative lens element 32, and a biconvex positive lens element 33, in this order from the object. The object-side surface and the image-side surface of the biconvex positive lens element 30 are aspherical surfaces. Furthermore, the diaphragm S (surface No. 13) which is provided between the negative second lens group G2 and the positive third lens group G3 moves integrally with the positive third lens group G3.

The positive fourth lens group G4 (surface Nos. 22 through 27) includes a biconvex positive lens element 40, and a cemented lens 48 composed of a positive meniscus lens element 45 having the convex surface facing toward the object, a negative meniscus lens element 46 having the convex surface facing toward the object, and a positive meniscus lens element 47 having the convex surface facing toward the object, in this order from the object. The object-side surface and the image-side surface of the biconvex positive lens element 40 are aspherical surfaces. The object-side surface of the positive meniscus lens element 45 is an aspherical surface.

TABLE 19

LENS SURFACE DATA

| Surf.No. | R | d | Nd | vd |
|---|---|---|---|---|
| 1 | 165.365 | 1.300 | 1.83481 | 42.7 |
| 2 | 42.917 | 6.235 | 1.45650 | 90.3 |
| 3 | −215.866 | 0.100 | | |
| 4 | 43.876 | 5.221 | 1.61800 | 63.4 |
| 5 | 892.265 | Variable | | |
| 6* | −290.697 | 0.800 | 1.80139 | 45.5 |
| 7* | 7.049 | 5.886 | | |
| 8 | −9.121 | 0.800 | 1.83481 | 42.7 |
| 9 | −16.083 | 0.000 | | |
| 10 | 88.827 | 2.746 | 1.92286 | 20.9 |
| 11 | −20.964 | 0.800 | 1.80420 | 46.5 |
| 12 | −53.582 | Variable | | |
| 13 (Diaphragm) | ∞ | 1.000 | | |
| 14* | 10.102 | 1.729 | 1.49700 | 81.6 |
| 15* | −41.555 | 0.100 | | |
| 16 | 9.298 | 4.109 | 1.48749 | 70.4 |
| 17 | −14.789 | 0.100 | | |
| 18 | −28.632 | 0.800 | 1.83400 | 37.3 |
| 19 | 6.670 | 0.676 | | |
| 20 | 19.864 | 0.906 | 1.48749 | 70.4 |
| 21 | −63.982 | Variable | | |
| 22* | 40.268 | 1.964 | 1.58313 | 59.5 |
| 23* | −551.758 | 3.502 | | |
| 24* | 8.545 | 2.155 | 1.49700 | 81.6 |
| 25 | 27.415 | 0.700 | 1.83481 | 42.7 |
| 26 | 6.542 | 2.407 | 1.53172 | 48.8 |
| 27 | 32.169 | 0.150 | | |
| 28 | ∞ | 0.500 | 1.51633 | 64.1 |
| 29 | ∞ | 0.600 | | |
| 30 | ∞ | 0.500 | 1.51633 | 64.1 |
| 31 | ∞ | — | | |

The symbol * designates the aspherical surface which is rotationally symmetrical with respect to the optical axis.

TABLE 20

ZOOM LENS SYSTEM DATA
Zoom Ratio 29.5

| | Short Focal Length Extremity |
|---|---|
| FNO. | 2.8 |
| f | 4.40 |
| W | 46.2 |
| Y | 3.875 |
| fB | 2.10 |
| L | 77.94 |
| d5 | 1.000 |
| d12 | 26.219 |
| d21 | 2.838 |
| | Intermediate Focal Length |
| FNO. | 5.1 |
| f | 29.67 |
| W | 7.6 |
| Y | 3.875 |
| fB | 16.09 |
| L | 112.61 |
| d5 | 34.311 |
| d12 | 2.814 |
| d21 | 13.605 |
| | Long Focal Length Extremity |
| FNO. | 4.7 |
| f | 130.00 |
| W | 1.7 |
| Y | 3.875 |
| fB | 2.09 |
| L | 140.00 |
| d5 | 65.162 |
| d12 | 0.500 |
| d21 | 26.463 |

TABLE 21

ASPHERICAL SURFACE DATA
The aspherical surface coefficients not indicated are zero (0.00):

| Surf. No. | K | A4 | A6 | A8 | A10 |
|---|---|---|---|---|---|
| 6 | 0.000 | 0.1230×10⁻³ | −0.4099×10⁻⁶ | −0.3598×10⁻⁹ | |
| 7 | 0.000 | −0.8802×10⁻⁴ | 0.7147×10⁻⁶ | 0.3427×10⁻⁸ | |
| 14 | 0.000 | −0.7889×10⁻⁴ | −0.2554×10⁻⁵ | 0.7603×10⁻⁷ | |
| 15 | 0.000 | 0.1323×10⁻³ | −0.1765×10⁻⁵ | 0.1238×10⁻⁶ | |
| 22 | 0.000 | 0.2617×10⁻³ | −0.1997×10⁻⁴ | 0.6935×10⁻⁶ | |
| 23 | 0.000 | 0.2742×10⁻³ | −0.2029×10⁻⁴ | 0.5896×10⁻⁶ | −0.1423×10⁻⁷ |
| 24 | 0.000 | −0.1300×10⁻⁴ | −0.8044×10⁻⁶ | −0.3171×10⁻⁷ | −0.1167×10⁻⁷ |

The numerical values of each condition for each embodiment are shown in Table 22.

TABLE 22

|  | Embod.1 | Embod.2 | Embod.3 | Embod.4 |
|---|---|---|---|---|
| Cond.(1) | 17.343 | 18.344 | 17.416 | 17.338 |
| Cond.(2) | 8.159 | 7.066 | 7.252 | 9.169 |
| Cond.(3) | 0.082 | 0.059 | 0.059 | 0.059 |
| Cond.(4) | 3.563 | 3.375 | 3.204 | 3.190 |
| Cond.(5) | 3.741 | 3.377 | 3.577 | 3.685 |
| Cond.(6) | 0.158 | 0.114 | 0.121 | 0.125 |
| Cond.(7) | 8.950 | 10.571 | 10.044 | 9.957 |
| Cond.(8) | 0.238 | 0.246 | 0.239 | 0.190 |
| Cond.(9) | 4.636 | 5.432 | 4.869 | 4.705 |

|  | Embod.5 | Embod.6 | Embod.7 |
|---|---|---|---|
| Cond.(1) | 17.356 | 14.000 | 18.947 |
| Cond.(2) | 8.062 | 7.091 | 7.411 |
| Cond.(3) | 0.056 | 0.055 | 0.067 |
| Cond.(4) | 3.193 | 2.576 | 3.486 |
| Cond.(5) | 3.498 | 3.808 | 3.909 |
| Cond.(6) | 0.118 | 0.129 | 0.132 |
| Cond.(7) | 10.399 | 8.585 | 9.635 |
| Cond.(8) | 0.207 | 0.230 | 0.265 |
| Cond.(9) | 4.961 | 3.676 | 4.847 |

As can be understood from Table 22, the first through seventh embodiments satisfy conditions (1) through (9). Furthermore, as can be understood from the aberration diagrams, the various aberrations are suitably corrected.

According to the present invention, by optimizing the lens arrangement and refractive-power balance of the zoom lens system, a compact zoom lens system with a high zoom-ratio and high quality, in which the amount of aberration fluctuations upon zooming are reduced to a minimum, can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a positive first lens group, a negative second lens group, a positive third lens group, and a positive fourth lens group, in this order from an object,
wherein upon zooming from the short focal length extremity to the long focal length extremity, said positive first lens group, said negative second lens group, said positive third lens group and said positive fourth lens group move along the optical axis of said zoom lens system in a manner so that the distance between said positive first lens group and said negative second lens group increases, the distance between said negative second lens group and said positive third lens group decreases, and the distance between said positive third lens group and said positive fourth lens group increases; and
wherein said zoom lens system satisfies the following condition:

$$13.50 < f1/fw < 19.50$$

wherein f1 designates the focal length of said positive first lens group; and fw designates the focal length of the entire zoom lens system at the short focal length extremity.

2. The zoom lens system according to claim 1, further satisfies the following condition:

$$7.00 < f4/fw < 9.20$$

wherein f4 designates the focal length of said positive fourth lens group; and fw designates the focal length of the entire zoom lens system at the short focal length extremity.

3. The zoom lens system according to claim 1, further satisfies the following conditions:

$$0.05 < |f2|/ft < 0.09$$

$$2.50 < f1/(ft \cdot fw)^{1/2} < 3.60$$

wherein f1 designates the focal length of said positive first lens group;

f2 designates the focal length of said negative second lens group;

ft designates the focal length of the entire zoom lens system at the long focal length extremity; and fw designates the focal length of the entire zoom lens system at the short focal length extremity.

4. The zoom lens system according to claim 1, further satisfies the following conditions:

$$3.50 < f3/fw < 4.50$$

$$0.10 < f3/ft < 0.16$$

wherein f3 designates the focal length of said positive third lens group;

ft designates the focal length of the entire zoom lens system at the long focal length extremity; and fw designates the focal length of the entire zoom lens system at the short focal length extremity.

5. The zoom lens system according to claim 1, further satisfies the following condition:

$$8.50 < f1/|f2| < 11.00$$

wherein f1 designates the focal length of said positive first lens group; and f2 designates the focal length of said negative second lens group.

6. The zoom lens system according to claim 1, further satisfies the following conditions:

$$0.15 < |f2|/f4 < 0.30$$

$$3.60 < f1/f3 < 5.50$$

wherein f1 designates the focal length of said positive first lens group;

f2 designates the focal length of said negative second lens group;

f3 designates the focal length of said positive third lens group; and f4 designates the focal length of said positive fourth lens group.

7. The zoom lens system according to claim 1, wherein said positive first lens group comprises a cemented lens comprising a negative lens element and a positive lens element, and a positive lens element, in this order from the object.

8. The zoom lens system according to claim 1, wherein said negative second lens group comprises a negative lens element, a negative lens element, a positive lens element, a negative lens element and a positive lens element, in this order from the object.

9. The zoom lens system according to claim 8, wherein said positive lens element that is the third lens element from the most object-side lens element of said negative second lens group is provided with at least one aspherical surface.

10. The zoom lens system according to claim 1, wherein said negative second lens group comprises a negative lens element, a negative lens element and a cemented lens in this order from the object; and wherein said cemented lens comprises a positive lens element and a negative lens element, in this order from the object.

11. The zoom lens system according to claim 10, wherein the most object-side negative lens element of the negative second lens group is provided with aspherical surfaces made on both surfaces thereof.

12. The zoom lens system according to claim 1, wherein said positive third lens group comprises a positive lens element, a positive lens element, a negative lens element and a positive lens element, in this order from the object.

13. The zoom lens system according to claim 1, wherein said positive fourth lens group comprises a cemented lens comprising a positive lens element, a negative lens element and a positive lens element, in this order from the object.

* * * * *